United States Patent
Takahashi et al.

(10) Patent No.: US 11,023,474 B2
(45) Date of Patent: Jun. 1, 2021

(54) SEARCH METHOD AND SEARCH DEVICE

(71) Applicant: FUJITSU LIMITED, Kawasaki (JP)

(72) Inventors: Jun Takahashi, Kawasaki (JP); Junya Saito, Kawasaki (JP); Akinori Taguchi, Kawasaki (JP); Takuya Kamimura, Kobe (JP); Kentaro Murase, Yokohama (JP); Seiji Okura, Meguro (JP); Shinji Kikuchi, Yokohama (JP); Akira Nakagawa, Sagamihara (JP); Toshiyuki Fukuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 314 days.

(21) Appl. No.: 16/157,636

(22) Filed: Oct. 11, 2018

(65) Prior Publication Data

US 2019/0114328 A1  Apr. 18, 2019

(30) Foreign Application Priority Data

Oct. 13, 2017 (JP) .............................. JP2017-199753
Jan. 11, 2018 (JP) .............................. JP2018-002822
May 10, 2018 (JP) .............................. JP2018-091663

(51) Int. Cl.
*G06F 16/2457* (2019.01)
*G06F 16/93* (2019.01)
*G06F 16/248* (2019.01)
*G06Q 30/02* (2012.01)
*G06F 16/338* (2019.01)

(52) U.S. Cl.
CPC ...... *G06F 16/24578* (2019.01); *G06F 16/248* (2019.01); *G06F 16/338* (2019.01); *G06F 16/93* (2019.01); *G06Q 30/0201* (2013.01)

(58) Field of Classification Search
CPC ................................................ G06F 16/24578
See application file for complete search history.

(56) References Cited

U.S. PATENT DOCUMENTS

2017/0300538 A1\* 10/2017 Seuss .................. G06F 16/2272

FOREIGN PATENT DOCUMENTS

JP  2008-003869  1/2008

\* cited by examiner

*Primary Examiner* — Hau H Hoang
(74) *Attorney, Agent, or Firm* — Fujitsu Patent Center

(57) ABSTRACT

An apparatus receives, via an input device, query input data including a word or a phrase, and acquires search result set data using the query input data. The apparatus acquires, for a value indicating a strength of a relationship between each impression word included in an impression word group and each word included in the query input data, and extracts the first feature word group according to the value indicating the strength of the relationship with each word, from the impression word group. The apparatus displays the search result set data using the first feature word group as an item.

19 Claims, 45 Drawing Sheets

FIG. 5A                                        210

| WORD | DOCUMENT ID1 | DOCUMENT ID2 | DOCUMENT ID3 | ... | DOCUMENT IDN |
|---|---|---|---|---|---|
| THIS | 1 | 1 | 0 | ... | 1 |
| PEN | 1 | 0 | 0 | ... | 0 |
| APPLE | 0 | 1 | 0 | ... | 0 |
| ... | ... | ... | ... | ... | ... |

| KEY | NUMBER OF MATCH DOCUMENTS | ARRAY OF DOCUMENTS |
|---|---|---|
| THIS | 239 | 1, 2, ..., N |
| PEN | 103 | 1, ... |
| APPLE | 59 | 2, ... |
| ... | ... | ... |

| IMPRESSION WORD / WORD | PREMIER | LIVELY | HIDEAWAY | QUIET | HEALTHY | CALM | FANCY | PLENTIFUL | CHEAP | FEELING OF FREEDOM | ... |
|---|---|---|---|---|---|---|---|---|---|---|---|
| DATE | 9.21 | 3.23 | 9.38 | 9.02 | 8.33 | 8.59 | 9.83 | 5.23 | 2.38 | 5.39 | ... |
| VEGETABLE | 8.38 | 0.28 | 0.31 | 0.12 | 9.53 | 3.23 | 8.93 | 3.28 | 2.87 | 0.33 | ... |
| YEAR-END PARTY | 7.43 | 9.41 | 0.13 | 0.04 | 5.53 | 0.06 | 3.27 | 7.38 | 7.38 | 7.48 | ... |
| LIVELY | 4.34 | 10 | 0.11 | 0.04 | 4.38 | 0.07 | 6.71 | 8.22 | 8.02 | 8.21 | ... |
| DELICIOUS | 9.38 | 6.03 | 5.23 | 2.53 | 8.76 | 7.39 | 8.85 | 8.34 | 4.38 | 6.32 | ... |
| HEALTHY | 9.81 | 4.48 | 2.35 | 0.76 | 10 | 6.31 | 8.31 | 4.69 | 3.38 | 5.23 | ... |
| ... | ... | ... | ... | ... | ... | ... | ... | ... | ... | ... | ... |

| DOCUMENT ID \ IMPRESSION WORD | PREMIER | LIVELY | HIDEAWAY | QUIET | HEALTHY | CALM | FANCY | PLENTIFUL | CHEAP | FEELING OF FREEDOM | ... |
|---|---|---|---|---|---|---|---|---|---|---|---|
| 1 | 9.0 | 3.23 | 9.2 | 9.02 | 7.0 | 2.5 | 9.83 | 3.0 | 2.38 | 5.39 | ... |
| 2 | 8.38 | 0.28 | 0.31 | 0.12 | 9.53 | 3.23 | 8.93 | 3.28 | 2.87 | 0.33 | ... |
| 3 | ... | ... | ... | ... | ... | ... | ... | ... | ... | ... | ... |
| 4 | ... | ... | ... | ... | ... | ... | ... | ... | ... | ... | ... |
| 5 | 9.38 | 6.03 | 5.23 | 2.53 | 8.76 | 7.39 | 8.85 | 8.34 | 4.38 | 6.32 | ... |
| 6 | 9.81 | 4.48 | 2.35 | 0.76 | 10 | 6.31 | 8.31 | 4.69 | 3.38 | 5.23 | ... |
| ... | ... | ... | ... | ... | ... | ... | ... | ... | ... | ... | ... |

QUERY: "QUIET PREMIER RESTAURANT"

Rank 1: AA RESTAURANT

Rank 1: AA RESTAURANT

FIG. 20

| IMPRESSION WORD / WORD | LIVELY | DELICIOUS | HEALTHY | SMELL NICE | STUFFED | STOMACH-FRIENDLY |
|---|---|---|---|---|---|---|
| RESTAURANT | 1.6±0.5 | 3.4±0.2 | 3±0.5 | 2.1±0.5 | 3.1±1.7 | 2.8±0.7 |
| VEGETABLE | 0.2±0.1 | 3.7±0.3 | 4.2±0.3 | 2.5±1.4 | 2.2±0.8 | 2.1±0.2 |
| NATURAL | 0.3±0.2 | 3.8±0.7 | 3.1±1.2 | 3.2±1.2 | 1.2±0.8 | 1.3±0.7 |
| MATERIAL | 0.1±0.1 | 3.2±0.5 | 3±0.7 | 2.5±1.3 | 1.1±1.0 | 1.6±0.8 |

| DOCUMENT ID | STORE INFORMATION | | IMPRESSION WORD SCORE | | | | |
|---|---|---|---|---|---|---|---|
| | STORE NAME | TEXT | DELICIOUS | HEALTHY | SMELL NICE | STUFFED | STOMACH-FRIENDLY |
| 0001 | CHINESE CUISINE AA | DELICIOUS CHINESE CUISINE … | 4.1 | 2.9 | 2.1 | 3.9 | 2.2 |
| 0002 | JAPANESE STYLE PUB CC | LIVELY ENJOYABLE … | 3.5 | 2.1 | 2.1 | 3.8 | 2.2 |
| 0003 | KYOTO CUISINE BB | USING SEASONAL VEGETABLES … | 4.3 | 4.5 | 3.5 | 3.2 | 4.5 |
| … | | | … | … | … | … | … |

| USER ID | SEARCH WORD GROUP | CHANGE POINT (IMPRESSION WORD, SCORE CORRECTION) | |
|---|---|---|---|
| 0001 | NATURAL, MATERIAL, VEGETABLE, RESTAURANT | (SMELL NICE, −0.1) | |
| 0002 | PLENTIFUL, CHINESE | (STUFFED, +0.1) | |
| 0003 | SEASONAL, INGREDIENTS | (SMELL NICE, +0.1) | |
| ... | ... | ... | |

| SCORE \ SLIDER VALUE | 0 | 1 | 2 | 3 | 4 | 5 |
|---|---|---|---|---|---|---|
| PREMIER | 0.0 TO 3.5 | 3.5 TO 3.8 | 3.8 TO 4.6 | 4.6 TO 6.2 | 6.2 TO 10.0 | 10.0 |
| HIDEAWAY | 0.0 TO 2.8 | 2.8 TO 3.6 | 3.6 TO 4.2 | 4.2 TO 7.6 | 7.6 TO 10.0 | 10.0 |
| HEALTHY | 0.0 TO 2.9 | 2.9 TO 3.2 | 3.2 TO 5.5 | 5.5 TO 8.5 | 8.5 TO 10.0 | 10.0 |

410

SEARCH METHOD AND SEARCH DEVICE

CROSS-REFERENCE TO RELATED APPLICATIONS

This application is based upon and claims the benefit of priority of the prior Japanese Patent Application No. 2018-91663, filed on May 10, 2018, the Japanese Patent Application No. 2017-199753, filed on Oct. 13, 2017, and the Japanese Patent Application No. 2018-2822, filed on Jan. 11, 2018, the entire contents of which are incorporated herein by reference.

FIELD

The embodiments discussed herein are related to a search method and a search device.

BACKGROUND

A system that displays search results based on a query input by a user on a radar chart is known in the related art. In the system of the related art, for example, when the radar chart is displayed, it is known that axis items (word) are extracted from a set of search results based on the query input by the user.

Japanese Laid-open Patent Publication No. 2008-003869 is an example of the related art.

SUMMARY

According to an aspect of the embodiments, an apparatus receives, via an input device, query input data including a word or a phrase, and acquires search result set data using the query input data. The apparatus acquires, for a value indicating a strength of a relationship between each impression word included in an impression word group and each word included in the query input data, and extracts the first feature word group according to the value indicating the strength of the relationship with each word, from the impression word group. The apparatus displays the search result set data using the first feature word group as an item.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are example tables of index information generated by the index generation unit;

FIG. 6 is an example table of an impression word map of the first embodiment;

FIG. 8 is an example table of an impression word score list of the first embodiment;

FIG. 12 is a first diagram illustrating a display example of a radar chart of the first embodiment;

FIG. 20 is a table illustrating an example of the impression word map of the third embodiment;

FIG. 21 is an example table of an impression word score list of the third embodiment;

FIG. 32 is a diagram illustrating an example of a correction list of the fifth embodiment;

FIG. 41 is an example correspondence table of the sixth embodiment;

DESCRIPTION OF EMBODIMENTS

In the related art, since the axis words of the radar chart are extracted from the set of search results, there may be a situation in which the correspondence between the query and axes is not clear despite the fact that the radar chart is displayed with appropriate axes, depending on the query input by a user. In such a situation, it is difficult for the user to promptly evaluate whether or not the search results meet the intention of the user.

It is desirable to properly evaluate search results.

First Embodiment

Figure 1:
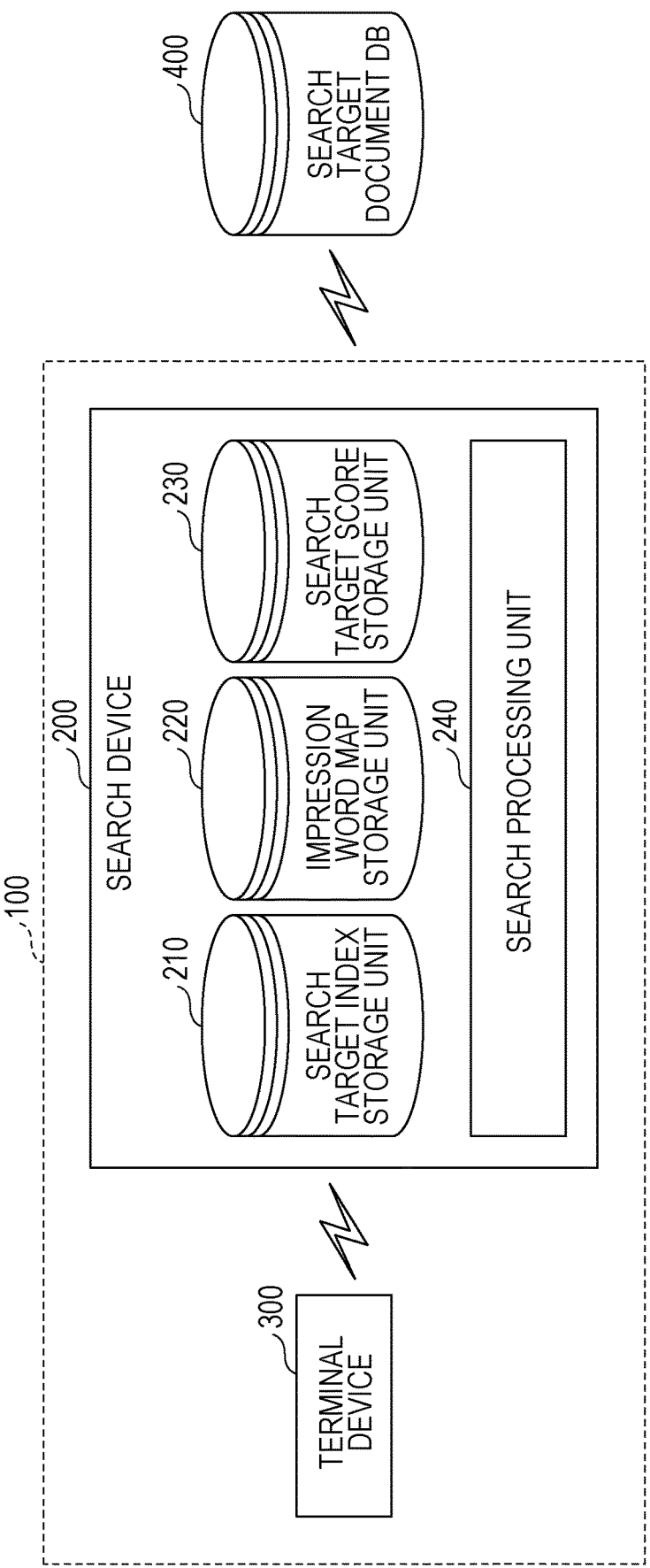
FIG. 1 is a diagram that illustrates an example of a system configuration of a search system of a first embodiment.

Hereinafter, the first embodiment will be described with reference to the drawings. FIG. 1 is a diagram that illustrates an example of a system configuration of a search system of a first embodiment.

A search system 100 of the present embodiment includes a search device 200 and a terminal device 300. The search device 200 and the terminal device 300 are connected via a network. The search device 200 of the present embodiment communicates with a search target document database 400 in which information to be searched by the search device 200 is stored. The information stored in the search target document database 400 of the present embodiment is, for example, text data such as document data.

The search target document database 400 of the present embodiment may include, for example, a plurality of databases. The search target document database 400 of the present embodiment may be included in the search system 100.

When a query is input by a user in the terminal device 300, the search device 200 of the present embodiment searches the search target document database 400 based on the input query. The search device 200 causes the terminal device 300 to display the search result acquired as a result of the search processing by a radar chart. The query indicates, for example, a word or a phrase (compound word) input when the user of the terminal device 300 or the search device 200 performs a search request.

At this time, the search device 200 of the present embodiment displays a radar chart with words extracted based on the query input from the terminal device 300 as axes.

In the present embodiment, it is possible to make the correspondence between the query and the axis of the radar chart clear by using the words extracted based on the query input by the user as axes of the radar chart. Therefore, in the present embodiment, it is possible to allow the user to easily evaluate whether or not the search result matches the intention of the user. According to the present embodiment, it is possible to properly evaluate the search result.

The search device 200 of the present embodiment includes a search target index storage unit 210, an impression word map storage unit 220, a search target score storage unit 230, and a search processing unit 240.

The search target index storage unit 210 stores index information in which each document data stored in the search target document database 400 is associated with words included in each document data. The impression word map storage unit 220 stores an impression word map indicating a relationship between a word and an impression word. The search target score storage unit 230 stores an impression word score list indicating the relationship between the words and impression words included in each document data on the document data included in the search target document database 400. Details of each storage unit will be described later.

When the search processing unit 240 receives input of a query from the terminal device 300, the search processing unit 240 searches the search target document database 400 with reference to the search target index storage unit 210, and acquires document data as a search result. In the following description, the search result acquired by the search processing of the search processing unit 240 is referred to as search result set data.

The search processing unit 240 selects impression words each having a strong relationship with the content of the query as the axes of the radar chart with reference to the impression word map storage unit 220, and causes the terminal device 300 to display the radar chart for each search result set data.

In the example of FIG. 1, the query is input from the terminal device 300 to the search device 200, and the radar chart is displayed on the terminal device 300, but not limited thereto. The query may be input by an input device of the search device 200, and the radar chart may be displayed on an output device (display) or the like of the search device 200.

Figure 2:
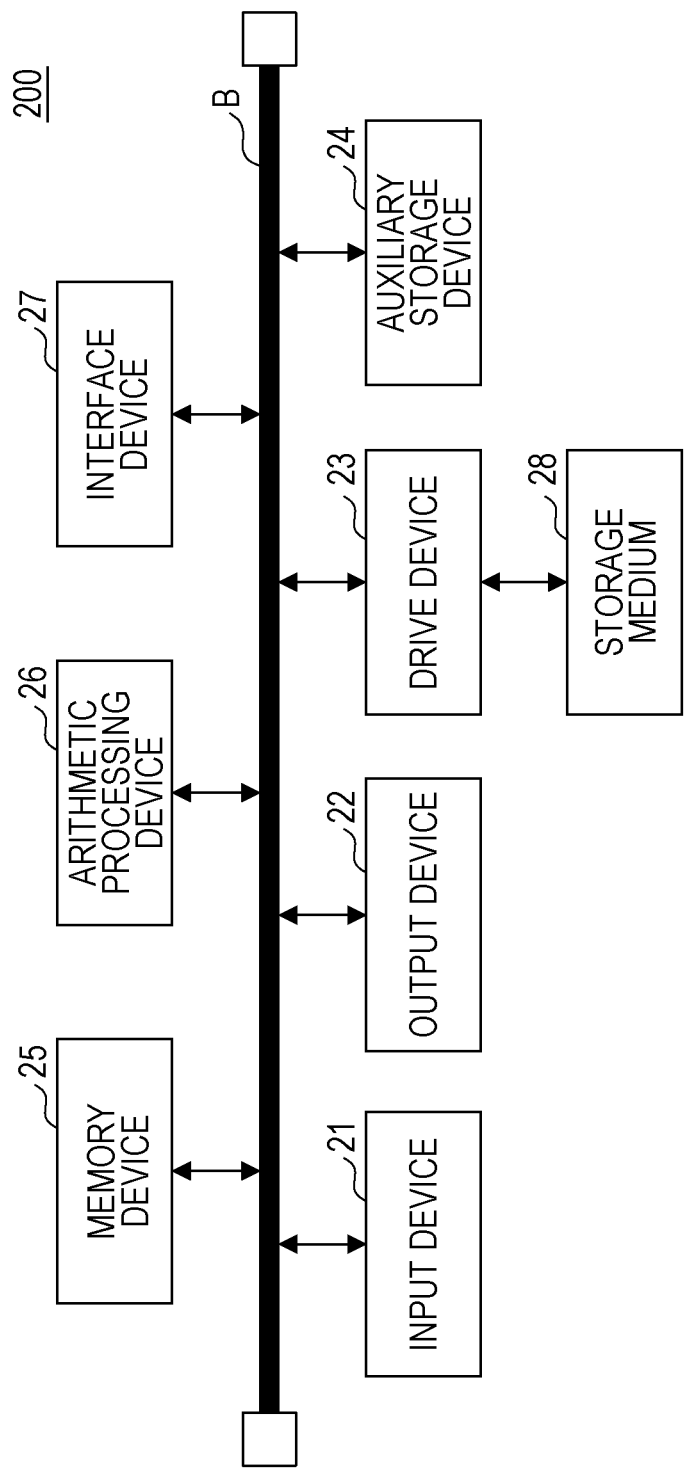
FIG. 2 is a diagram that illustrates an example of a hardware configuration of a search device of the first embodiment.

Hereinafter, the search device 200 of the present embodiment will be described. FIG. 2 is a diagram that illustrates an example of a hardware configuration of a search device of the first embodiment.

The search device 200 of the present embodiment is an information processing device including an input device 21, an output device 22, a drive device 23, an auxiliary storage device 24, a memory device 25, an arithmetic processing device 26, and an interface device 27 mutually connected via a bus B.

The input device 21 is a device to input various kinds of information, and is realized by, for example, a keyboard, a pointing device, or the like. The output device 22 is a device to output various kinds of information, and is realized by, for example, a display or the like. The interface device 27 includes a LAN card or the like, and is used to be connected to a network.

A search program is at least a part of various programs that control the search device 200. The search program is provided by, for example, distribution of a storage medium 28, download from a network, or the like. Various types of storage media may be used as the storage medium 28 in which the search program is recorded; a storage medium that optically, electrically, or magnetically records information, such as a CD-ROM, a flexible disk, or a magneto-optical disk, a semiconductor memory that electrically records information, such as a ROM or a flash memory, or the like.

When the storage medium 28 in which the search program is recorded is set in the drive device 23, the search program is installed from the storage medium 28 to the auxiliary storage device 24 via the drive device 23. The search program downloaded from the network is installed in the auxiliary storage device 24 via the interface device 27.

The auxiliary storage device 24 stores significant files, data, and the like while storing the installed search program. The memory device 25 reads and stores the search program from the auxiliary storage device 24 when the search device 200 is activated. The arithmetic processing device 26 realizes various types of processing as described later according to the search program stored in the memory device 25.

The hardware configuration of the terminal device 300 of the present embodiment is the same as that of the search device 200, and description thereof is omitted. The terminal device 300 may be, for example, a tablet type terminal device, a smart phone, or the like, and may have a display operation device realized by a touch panel or the like instead of the input device 21 and the output device 22.

Figure 3:
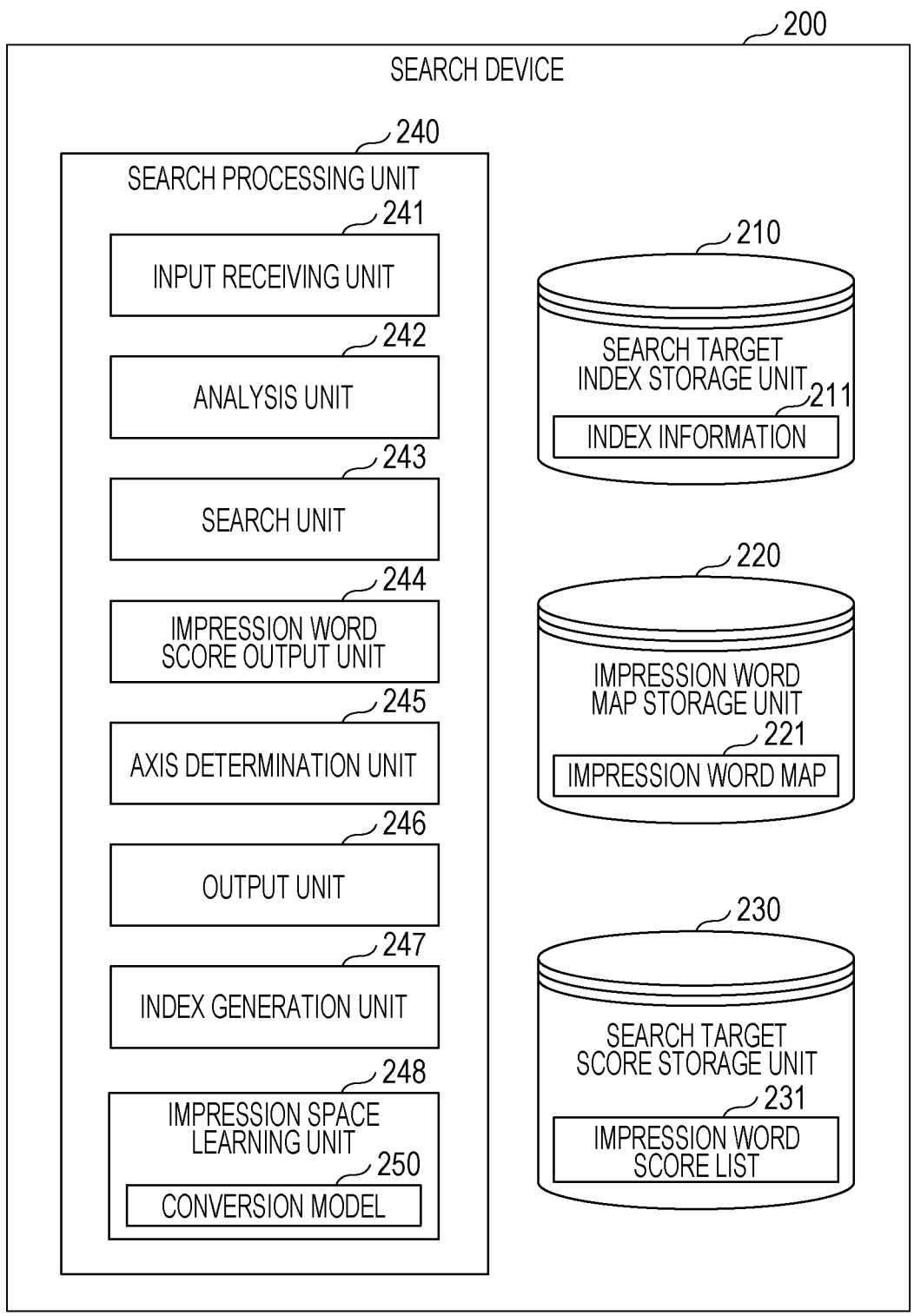
FIG. 3 is a diagram that describes functions of the search device of the first embodiment.

Next, with reference to FIG. 3, the functions of the search device 200 of the present embodiment will be described. FIG. 3 is a diagram that describes the functions of the search device of the first embodiment.

The search device 200 of the present embodiment includes the search target index storage unit 210, the impression word map storage unit 220, the search target score storage unit 230, and the search processing unit 240.

Index information 211 is stored in the search target index storage unit 210. The index information 211 of the present embodiment is created by preliminary processing by an index generation unit 247 described later.

An impression word map 221 is stored in the impression word map storage unit 220. The impression word map 221 of the present embodiment is given in advance by a manager or the like of the search device 200.

An impression word score list 231 is stored in the search target score storage unit 230. The impression word score list 231 is created by processing of the search processing unit 240 described later.

The search processing unit 240 of the present embodiment includes an input receiving unit 241, an analysis unit 242, a search unit 243, an impression word score output unit 244, an axis determination unit 245, an output unit 246, the index generation unit 247, and an impression space learning unit 248. Each unit of the search processing unit 240 is realized by the arithmetic processing device 26 of the search device 200 reading and executing the search program stored in the memory device 25 or the like.

The input receiving unit 241 of the present embodiment receives various inputs to the search device 200. For example, the input receiving unit 241 receives input of the query to the search device 200.

The analysis unit 242 of the present embodiment performs word segmentation, modification analysis, meaning analysis, and the like to keywords and natural sentences. For example, the analysis unit 242 specifies a search word group based on the query, or specifies a word from the document data of the search result acquired from the search target document database 400. For example, the analysis unit 242 of the present embodiment fulfills the function of a specification unit that specifies a search word group from the query.

The search unit 243 of the present embodiment refers to the search target index storage unit 210, specifies the document data including the search word group acquired from the analysis unit 242, and acquires the search result set data from the search target document database 400.

The impression word score output unit 244 converts each word included in the search word group acquired from the query to a vector by a distributed representation. The impression word score output unit 244 outputs a score indicating strength of a relationship between the search word group and the impression words included in the impression word map 221 based on each word converted to a vector and a conversion model 250 described later.

For example, the impression word score output unit 244 outputs the score indicating the strength of the relationship between the word represented in a vector as an input to the conversion model 250 and each impression word included in the impression word map 221.

A method based on the distributed representation of words of the present embodiment is a method that estimates a semantic similarity relationship (similarity) between each word using a large amount of learning data given separately, and represents meaning of the word by a vector by disposing each word in a vector space of a predetermined number of dimensions so as to be consistent with the estimated inter-word similarity. In the following description, the vector representing the meaning of a word converted by the distributed representation of words is referred to as a semantic vector.

The impression word of the present embodiment is a word that reminds impression of the search result such as an adjective, an adjective verb, and an adverb.

The axis determination unit 245 determines the impression words as the axes of the radar chart to display the search result according to the score of each word output by the impression word score output unit 244. The axis of the radar chart is, for example, one of the items to display the search result set data.

The output unit 246 of the present embodiment displays the radar chart of the search result set data using the impression words determined by the axis determination unit 245 as the axes.

For example, the output unit 246 of the present embodiment displays the impression words extracted according to the strength of the relationship with the search word group as the item when displaying the search result set data acquired by search processing by the search word group based on the query.

The index generation unit 247 of the present embodiment creates the index information 211 stored in the search target index storage unit 210 from the search target document database 400.

The impression space learning unit 248 outputs the conversion model 250 based on the search target document data stored in the search target document database 400 and the impression word map 221 stored in the impression word map storage unit 220.

The processing of the index generation unit 247 and the impression space learning unit 248 of the present embodiment may be performed in advance as the preliminary processing of search processing performed after the query is input.

The preliminary processing of this embodiment will be described below. First, generation of the index information 211 by the index generation unit 247 will be described with reference to FIGS. 4 to 58.

Figure 4:
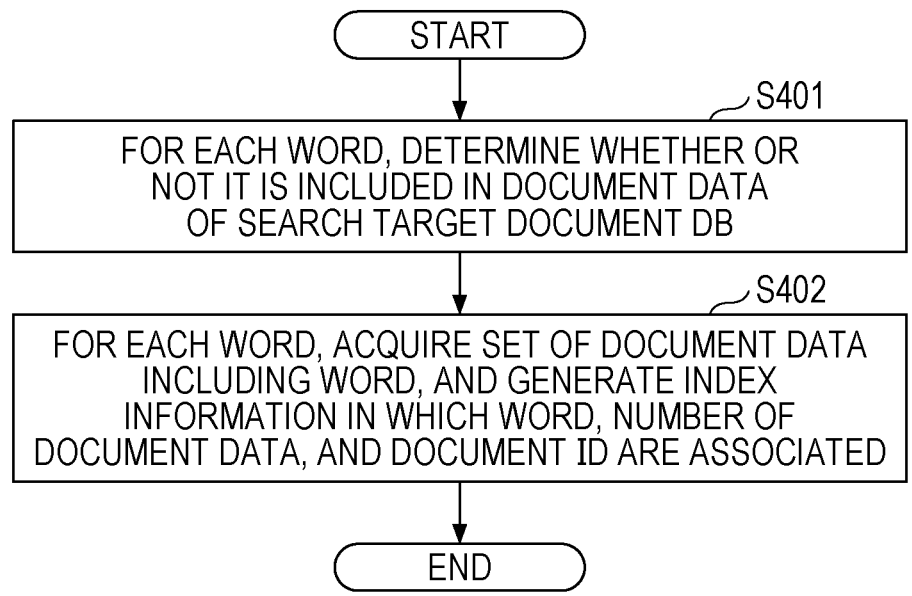
FIG. 4 is a flowchart that describes processing by an index generation unit.

FIG. 4 is a flowchart that describes the processing by an index generation unit.

The index generation unit 247 of the present embodiment refers to the search target document database 400, and determines whether or not a certain word is included in the document data for each document data stored in the search target document database 400 (step S401).

In the present embodiment, a document ID is included in each document data stored in the search target document database 400 as identification information to specify the document data.

The index generation unit 247 acquires a set of document data including the word, generates the index information 211 in which the word, the number of acquired document data pieces, and the document ID as the identification information that specifies the document data are associated with each other for each word (step S402), and ends the processing.

FIGS. 5A and 5B are example tables of index information generated by the index generation unit. FIG. 5A is a table illustrating intermediate data acquired as a result of processing in step S401. FIG. 5B is an example table of the index information 211.

The index generation unit 247 of the present embodiment includes, for example, "this", "pen", and "apple" in the document data.

In this case, the index generation unit 247 determines whether or not each word of "this", "pen", and "apple" is included in the document data for each document data stored in the search target document database 400, and stores intermediate data 205 indicating the determination result.

In the intermediate data 205 illustrated in FIG. 5A, it is found that the word "this" is included in the document data with document ID "1", the document data with document ID "2", and the document data with document ID "N". It is found that the word "pen" is included in the document data with the document ID "1". It is found that the word "apple" is included in the document data with the document ID "2".

Next, the index generation unit 247 generates the index information 211 in which the number of document data pieces including the word is associated with the document ID for each word.

The index information 211 illustrated in FIG. 5B includes keys, the number of match documents, and an array of documents as items of information. The value of the item "key" indicates the word estimated to be included in the document data. The value of the item "number of match documents" indicates the number of document data pieces including words as the keys. The value of the item "array of documents" indicates the document ID of the document data including the words as the keys. The number of the document IDs included in the value of the item "array of documents" is equal to the number as the value of the item "number of match documents".

In the index information 211 of FIG. 5B, the number of document data pieces including the word "this" is 239, and the document ID of the document data including the word "this" is document ID "1", "2", . . . , "N".

As described above, the index generation unit 247 of the present embodiment generates the index information 211, and stores the information in the search target index storage unit 210.

Next, before describing the processing by the impression space learning unit 248, the impression word map 221 stored in the impression word map storage unit 220 of the present embodiment will be described.

FIG. 6 is an example table of an impression word map of the first embodiment. The impression word map 221 of the present embodiment is, for example, created by a manager or the like of the search system 100, and given to the search device 200 in advance. For the impression word map 221, for example, a map that is created based on a result of a questionnaire or the like conducted on a large number of people to answer the strength of the relationship between words and impression words may be given to the search device 200.

In the impression word map 221 of the present embodiment, a score (value) indicating the strength of the relationship between the impression word prepared in advance and each word is associated with each word. The word included in the impression word map 221 may be any word estimated to be included in the document data stored in the search target document database 400.

The score of the present embodiment is, for example, a value from 0 to 10. In a case where the score is "0", it indicates that there is no relationship between the word and the impression word, and the larger the score, the stronger the relationship between the word and the impression word.

In the impression word map 221 illustrated in FIG. 6, "premier", "lively", "hideaway", "quiet", "healthy", and the like are listed as an impression word.

For example, in the impression word map 221, the score indicating the strength of the relationship between a word "date" and the impression word "premier" is "9.21", and the score indicating the strength of the relationship between the word "date" and the impression word "lively" is "3.23".

Therefore, it is found that the word "date" has a stronger relationship with the impression word "premier" than the impression word "lively".

Figure 7:
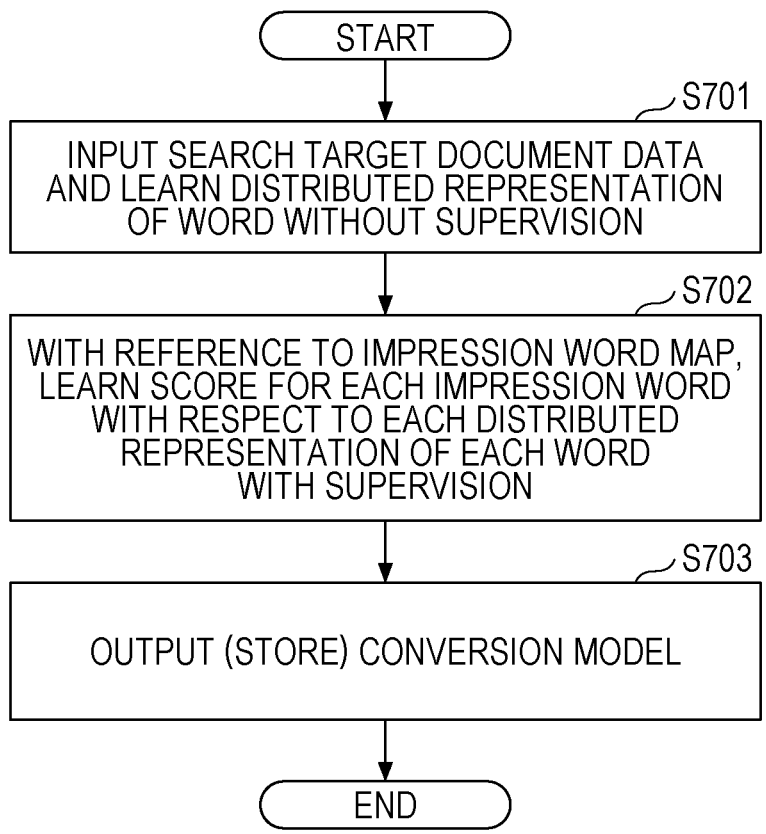
FIG. 7 is a flowchart that describes processing by an impression space learning unit.

Next, the processing of the impression space learning unit 248 of the present embodiment will be described with reference to FIG. 7. FIG. 7 is a flowchart that describes the processing by an impression space learning unit.

The impression space learning unit 248 of the present embodiment refers to the search target document database 400, inputs each document data included in the search target document database 400, and learns the distributed representations of words included in each document data with unsupervised learning (step S701). For example, the impression space learning unit 248 internally stores the semantic vector of words included in each document data.

The impression space learning unit 248 refers to the impression word map 221, and learns the score corresponding to the impression words included in the impression word map 221 with respect to the distributed representation of each word with supervised learning (step S702). For example, the impression space learning unit 248 refers to the impression word map 221 to machine learn the relationship between the semantic vector of each word and the score indicating the strength of the relationship with each impression word associated with the word.

The impression space learning unit 248 outputs and stores the learned result as the conversion model 250 (step S703). For example, the conversion model 250 of the present embodiment is a model in which a semantic vector of a word acquired by the distributed representation is input, and the score for each impression word associated with the word is output.

The described-above is the preliminary processing by the index generation unit 247 and preliminary processing by the impression space learning unit 248.

Next, the impression word score list 231 stored in the search target score storage unit 230 of the present embodiment will be described with reference to FIG. 8.

FIG. 8 is an example table of an impression word score list. The impression word score list 231 of the present embodiment is, for example, a list acquired by processing of the analysis unit 242 and the impression word score output unit 244 of the search processing unit 240. The impression word score list 231 of the present embodiment is referred to when the search result by the search unit 243 is displayed as the radar chart by the output unit 246.

The impression word score list 231 indicates the score indicating the strength of the relationship between the document ID of document data included in the search target document database 400 and each impression word included in the impression word score list 231. The impression words included in the impression word score list 231 are the same as the impression words included in the impression word map 221.

For example, the search processing unit 240 of the present embodiment extracts a word from the document data stored in the search target document database 400 by the analysis unit 242. The search processing unit 240 inputs the extracted word into the conversion model 250 after the extracted word is converted to a semantic vector by the impression word score output unit 244, and acquires the score indicating the strength of the relationship between each impression word and each word.

In the impression word score list 231 of the present embodiment, the score may be a score of each impression word associated with the document ID.

In this way, for example, in a case where a single word is extracted from the document data stored in the search target document database 400, the score indicating the strength of the relationship between the word and each impression word becomes the score indicating the strength of the relationship between the document data and each impression word.

For example, in a case where a plurality of words are extracted from the document data, the score indicating the strength of the relationship between each impression word and each word is output for the plurality of words. Therefore, in the present embodiment, for each impression word, a maximum score or an average score of the plurality of words may be acquired, and the maximum score or the average score of each impression word may be the score indicating the strength of the relationship between the document data and each impression word.

For example, it is assumed that two words "date" and "delicious" are extracted from the document data. In this case, the search processing unit 240 acquires the score indicating the strength of the relationship between the word "date" and each impression word included in the impression word map 221, and the score indicating the strength of the relationship between the word "delicious" and each impression word included in the impression word map 221.

The search processing unit 240 acquires the maximum value of the score corresponding to the word "date" and the score corresponding to the word "delicious" for each impression word. For example, it is assumed that the score indicating the strength of the relationship between the word "date" and the impression word "premier" is 9.21, and the score indicating the strength of the relationship between the word "delicious" and the impression word "premier" is 9.38. In this case, the search processing unit 240 may take the maximum value 9.38 between 9.21 and 9.38 as the score indicating the strength of the relationship between the document data and the impression word "premier".

Figure 9:
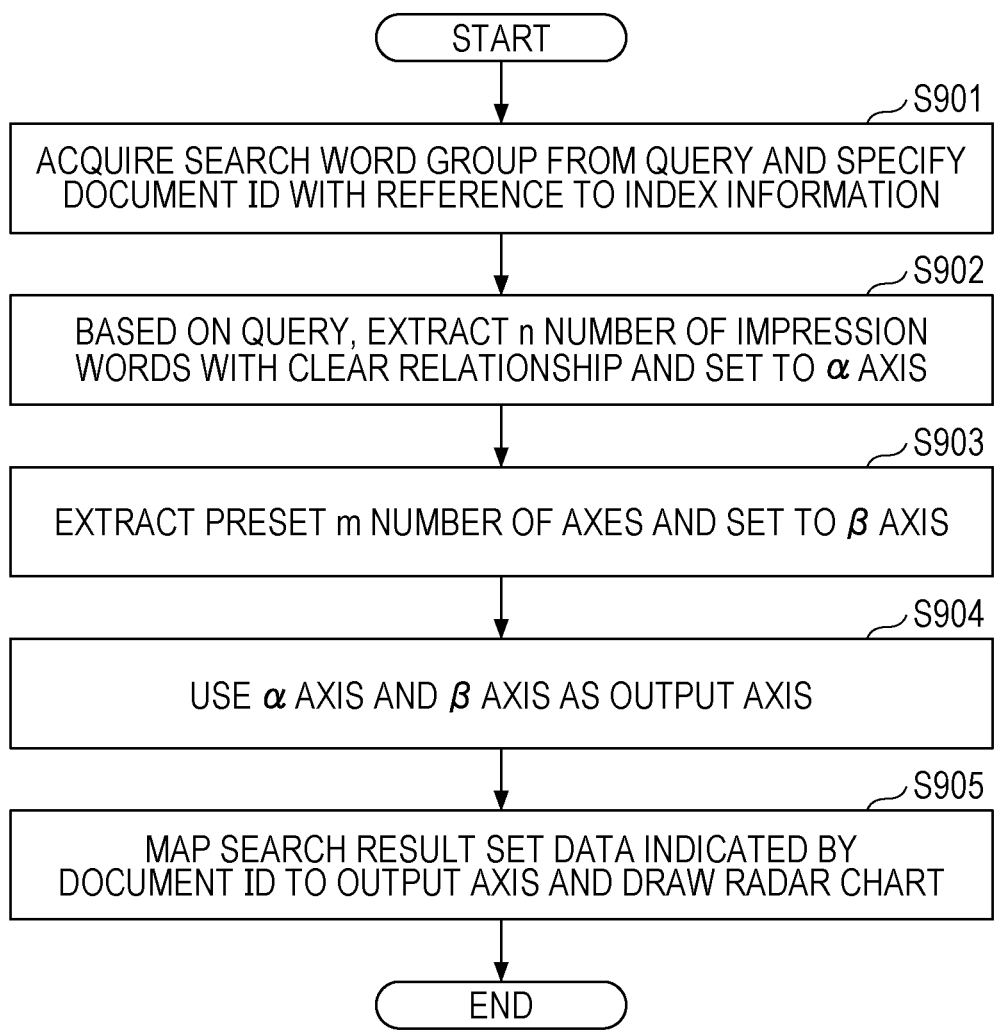
FIG. 9 is a flowchart that describes processing of a search processing unit of the first embodiment.

Next, the processing of the search processing unit 240 of the present embodiment will be described with reference to FIG. 9. FIG. 9 is a flowchart that describes the processing of a search processing unit of the first embodiment.

When the input receiving unit 241 receives an input of a query, the search processing unit 240 of the present embodiment acquires a search word group by morphological analysis or the like from the query by the analysis unit 242, searches the index information 211 with the search word group by the search unit 243, and specifies the document ID corresponding to the search word group (step S901). In the present embodiment, the document data indicated by the document ID specified in step S901 is the search result set data.

The search processing unit 240 extracts the n number of impression words with clear relationship with the query as the axis based on the input query by the impression word score output unit 244, and sets the n number of impression words as an $\alpha$ axis by the axis determination unit 245 (step S902). The axis in step S902 is an axis of the radar chart, and is one of the items to be an attribute of the search result set data. Details of processing of step S902 will be described later. The $\alpha$ axis of the present embodiment is an axis in which an impression word that has a large score indicating the strength of the relationship with the query, has a strong relationship with the query, and the correspondence is clear is set.

The search processing unit 240 extracts the m number of preset words by the axis determination unit 245, and sets them as a $\beta$ axis (step S903). The preset word may be, for example, selected and set from the impression words included in the impression word map 221. The preset word may be selected and set from the words included in the index information 211. For example, the preset word may be a word included in the search result set data.

The $\beta$ axis of the present embodiment indicates an axis other than the $\alpha$ axis among all of the axes in the radar chart. For example, the $\beta$ axis is an axis in which an impression word not strongly related to the query is set compared to the $\alpha$ axis.

The output unit 246 uses the $\alpha$ axis and the $\beta$ axis as an output axis (step S904), draws the search result set data indicated by the document ID acquired by the search unit 243 in step S901 by the output unit 246 on a radar chart (step S905), and ends the processing.

Figure 10:
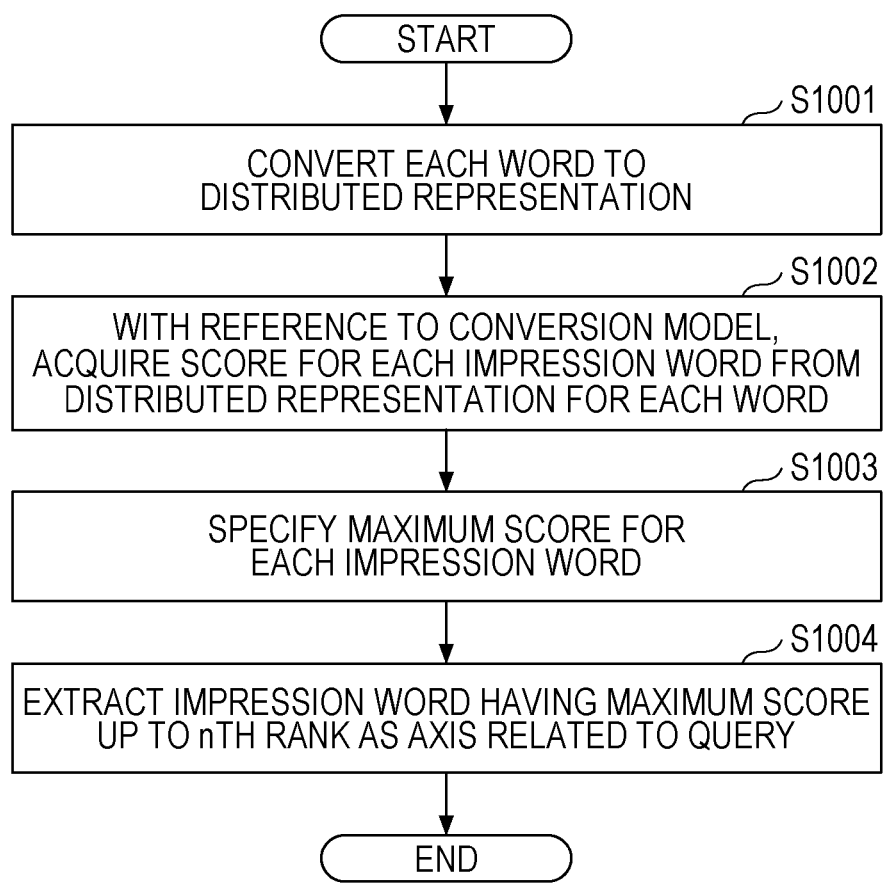
FIG. 10 is a flowchart that describes processing of an impression word score output unit and an axis determination unit of the first embodiment.

Next, the processing of step S902 of FIG. 9 will be described with reference to FIG. 10. FIG. 10 is a flowchart that describes the processing of an impression word score output unit and an axis determination unit of the first embodiment. The processing in FIG. 10 indicates the processing of the impression word score output unit 244 and the axis determination unit 245.

The impression word score output unit 244 of the present embodiment converts each word included in the search word group acquired in step S901 to the distributed representations (step S1001). For example, the impression word score output unit 244 converts each word included in the search word group to a semantic vector by the distributed representation.

The impression word score output unit 244 refers to the conversion model 250, and acquires the score indicating the strength of the relationship between each impression word and each word (step S1002). For example, the impression word score output unit 244 inputs the semantic vector of each word acquired in step S1001 to the conversion model 250, and acquires the score of each impression word for each word output from the conversion model 250.

The axis determination unit 245 acquires the maximum score of each impression word corresponding to each word (step S1003).

The axis determination unit 245 extracts the impression words corresponding to the top n maximum scores of each impression word as the $\alpha$ axis related to the query (step S1004). For example, the axis determination unit 245 extracts the n number of impression words in descending order of the impression words having the maximum score for each impression word, and set the n impression words as the α axis.

Figure 11:
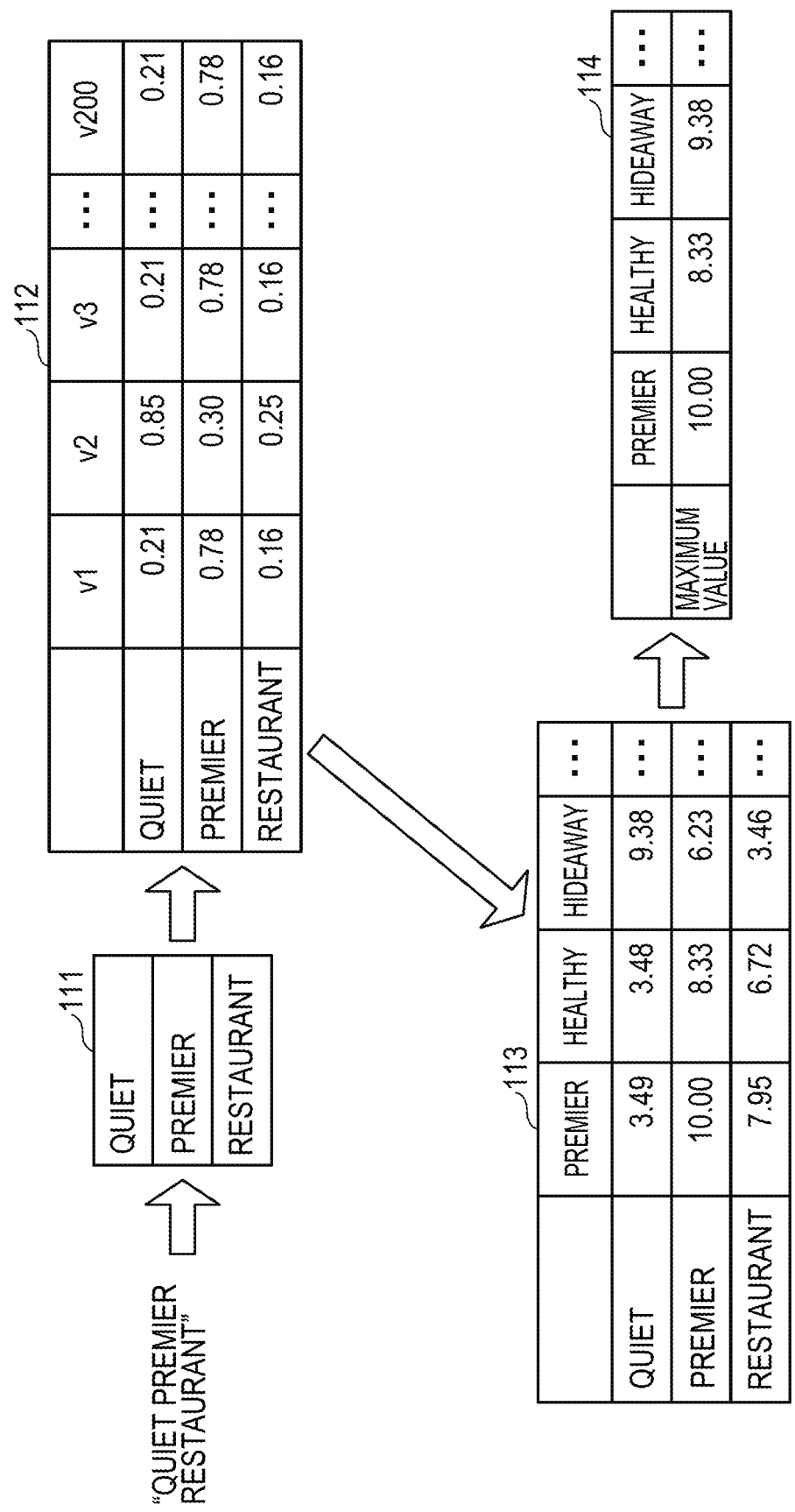
FIG. 11 is a diagram describing processing of the impression word score output unit and the axis determination unit.

Hereinafter, the processing of the impression word score output unit 244 and the axis determination unit 245 of the present embodiment will be described in details with reference to FIG. 11. FIG. 11 is a diagram describing processing of the impression word score output unit and the axis determination unit.

In FIG. 11, the query input by the user will be described as "quiet premier restaurant".

The search processing unit 240 of the present embodiment acquires a search word group 111 by the analysis unit 242 when the input of the query is received. In the search word group, the word "quiet", "premier", are "restaurant" included.

Next, the search processing unit 240 acquires a semantic vector 112 for each word included in the search word group 111 by the impression word score output unit 244.

In the semantic vector 112 illustrated in FIG. 11, each word "quiet", "premier", and "restaurant" are indicated as a vector.

When the semantic vector 112 is acquired, the impression word score output unit 244 inputs the semantic vector 112 to the conversion model 250, and acquires the score of each impression word included in the impression word map 221 for each word. In FIG. 11, the information in which each word included in the search word group is associated with the score of each impression word is referred to as an impression word score 113 for each word.

Next, the axis determination unit 245 acquires the maximum score for each impression word from the impression word score 113 for each word.

For example, in the impression word score 113 for each word, with respect to the impression word "premier", the score indicating the strength of the relationship with the word "quiet" is 3.49, the score indicating the strength of the relationship with the word "premier" is 10.00 (full marks), and the score indicating the strength of the relationship with the word "restaurant" is 7.95.

Therefore, the axis determination unit 245 acquires "10.00" as the maximum score of the impression word "premier".

In the impression word score 113 for each word, with respect to the impression word "healthy", the score indicating the strength of the relationship with the word "quiet" is 3.48, the score indicating the strength of the relationship with the word "premier" is 8.33, and the score indicating the strength of the relationship with the word "restaurant" is 6.72.

Therefore, the axis determination unit 245 acquires "8.33" as the maximum score of the impression word "healthy".

In the impression word score 113 for each word, with respect to the impression word "hideaway", the score indicating the strength of the relationship with the word "quiet" is 9.38, the score indicating the strength of the relationship with the word "premier" is 6.23, and the score indicating the strength of the relationship with the word "restaurant" is 3.46.

Therefore, the axis determination unit 245 acquires "9.38" as the maximum score of the impression word "hideaway".

The axis determination unit 245 of the present embodiment may store the maximum score acquired for each impression word as an impression word score list 114 corresponding to the query. The impression word score list 114 may be referred to, for example, when displaying the radar chart described later.

The axis determination unit 245 extracts the n number of impression words in descending order of the impression words having the maximum score in the impression word score list 114, and set the n impression words as the α axis. In the example of FIG. 11, n is 2.

In the impression word score list 114, the impression word having the maximum score is "premier", and the impression word having the next maximum score is "hideaway".

Therefore, the axis determination unit 245 of the present embodiment determines the impression word "premier" and the impression word "hideaway" as the α axis of the radar chart. For example, the axis determination unit 245 sets the impression word "premier" and the impression word "hideaway" as the items when displaying the search result set data.

In this way, in the present embodiment, the impression word having a strong relationship with the query is extracted based on the search word group acquired from the input query. For example, the impression word extracted here may be a feature word group (hereinafter, also referred to as first feature word group) indicating the feature of the content estimated from the query. Therefore, the axis determination unit 245 of the present embodiment fulfills the function of an extraction unit that extracts the first feature word group from the query.

When the impression word score 113 for each word is acquired, the axis determination unit 245 of the present embodiment determines the impression word as the α axis according to the maximum score for each impression word, but not limited thereto. For example, when the impression word score 113 for each word is acquired, the axis determination unit 245 may extract the n number of impression words in descending order of values obtained by normalizing the score of each impression word. When the impression word score 113 for each word is acquired, the axis determination unit 245 may extract the n number of impression words in descending order of the average score for each impression word.

For example, in the impression word score list 114 of the present embodiment, the value associated with each impression word is not limited to the maximum score for each impression word in the impression word score 113 for each word. In the impression word score list 114, the value associated with each impression word may be a value obtained by normalizing the score of each impression word in the impression word score 113 for each word, or may be an average score of each impression word in the impression word score 113 for each word.

In the present embodiment, the impression word corresponding with the score is extracted as the α axis, but not limited thereto.

The axis determination unit 245 may extract, for example, the word having the maximum score indicating the strength of the relationship with the impression word as the α axis.

For example, the axis determination unit 245 extracts the impression word "premier" and "hideaway" in descending order of the score of each impression word. At this time, the axis determination unit 245 may extract the word "quiet" having the maximum score indicating the strength of the relationship with the impression word "hideaway" as the α axis in the impression word score 113 for each word.

In this way, in the present embodiment, the semantic vector of the word is acquired from the search word group included in the query input by the user, and the semantic vector is input to the conversion model 250. In the present embodiment, the score indicating the strength of the relationship between each of impression words and each word included in the search word group is acquired as an output of the conversion model 250.

Therefore, in the present embodiment, even if a new word other than the words prepared in advance is included in the query, it is possible to acquire the score indicating the strength of the relationship between the new word and the impression words. For this reason, according to the present embodiment, it is possible to display the search result using an impression word (item) that has a strong relationship with the query and the correspondence is clear with respect to any queries input by the user.

Next, the display of the radar chart by the search processing unit 240 of the present embodiment will be described with reference to FIGS. 12 to 14.

FIG. 12 is a first diagram illustrating a display example of a radar chart of the first embodiment. A screen 121 illustrated in FIG. 12 displays a radar chart of "AA restaurant" acquired as the search result set data in a case where the input query is "quiet premier restaurant".

In the example of FIG. 12, only "AA restaurant" is displayed as an example of the search result set data, but not limited thereto. As search result set data, in a case where a plurality of search results are acquired, a radar chart for each search result may be displayed on the screen 121.

In the example of FIG. 12, the search result set data may be document data indicating a description of "AA restaurant" or the like, and the description of "AA restaurant" may be displayed on a search result display field 123.

In the present embodiment, a rank may be given to each search result included in the search result set data. For example, in the present embodiment, total points of scores for each axis of the radar chart or an area of a polygon illustrated as a graph may be calculated as a value indicating the strength of the relationship between the query and the search result set data for each search result set data, and the rank may be given to the search result set data in descending order of the values.

For example, in the present embodiment, the rank is given to the search result set data in the descending order of the strength of the relationship with the query. In the present embodiment, by assigning the rank in this way, it is possible to present the search results in descending order of the strength of the relationship with the query to the user.

The screen 121 of the present embodiment includes a query display field 122, the search result display field 123, and a search result display field 124.

The query input by the user is displayed in the query display field 122. A radar chart 125 that corresponds to the search result included in the search result set data is displayed in the search result display field 123. In the radar chart 125, a graph 126 that indicates the relationship between the search result set data and the axis item of the radar chart 125 are displayed. A bar graph 127 that indicates the value of each axis of the radar chart 125 is displayed in the search result display field 124.

The radar chart 125 of the present embodiment has five axes, an $\alpha1$ axis, an $\alpha2$ axis, a $\beta1$ axis, a $\beta2$ axis, and a $\beta3$ axis. For example, the radar chart 125 displays the search result of "AA restaurant" using five items, two impression words extracted based on the query, and three impression words other than the impression words selected based on the query.

The item corresponding to the $\alpha1$ axis is "hideaway", and the item corresponding to the $\alpha2$ axis is "premier". The item corresponding to the $\beta1$ axis is "calm", the item corresponding to the $\beta2$ axis is "plentiful", and the item corresponding to the $\beta3$ axis is "healthy".

The items corresponding to the $\alpha1$ axis and the $\alpha2$ axis are the impression words extracted in step S902 of FIG. 9. For example, the items corresponding to the $\alpha1$ axis and the $\alpha2$ axis are impression words having clear relationship with the query.

The items corresponding to the $\beta1$ axis, the $\beta2$ axis, and the $\beta3$ axis are the words set in step S903 of FIG. 9. For example, the items corresponding to the $\beta1$ axis, the $\beta2$ axis, and the $\beta3$ axis are preset words.

In the example of FIG. 12, the items corresponding to the $\beta1$ axis, the $\beta2$ axis, and the $\beta3$ axis are impression words selected from the impression word map 221, but not limited thereto.

The items corresponding to the $\beta1$ axis, the $\beta2$ axis, and the $\beta3$ axis may be, for example, a word selected from the index information 211. For example, the items corresponding to the $\beta1$ axis, the $\beta2$ axis, and the $\beta3$ axis may be words extracted from the search result set data. The word extracted from the search result set data may be a feature word group (second feature word group) indicating the feature of the search result set data.

Therefore, in the radar chart 125 of the present embodiment, the search result set data is displayed using the feature word group extracted from the query and the feature word group extracted from the search result set data as items.

The display of the graph 126 by the output unit 246 after the item corresponding to each axis of the radar chart 125 are determined in the search processing unit 240 of the present embodiment will be described.

The output unit 246 of the present embodiment refers to the impression word score list 231 when the item corresponding to each axis of the radar chart 125 is determined.

The output unit 246 acquires the score corresponding to the impression word set as an item among the scores for each impression word corresponding to the document ID of the document data acquired as the search result set data in the impression word score list 231, and sets the score as the value of an item in the radar chart.

For example, it is assumed that the acquired document data as search result set data is document data with document ID "1".

In this case, the output unit 246 refers to the impression word score list 231, acquires score "9.2" corresponding to "hideaway" which is an item corresponding to the $\alpha1$ axis among the scores of each impression word corresponding to the document ID "1", and sets the score as the value of the $\alpha1$ axis of the radar chart 125. The output unit 246 acquires score "9.0" corresponding to "premier" which is an item corresponding to the $\alpha2$ axis among the scores for each impression word corresponding to the document ID "1", and set the score as the value of the $\alpha2$ axis in the radar chart 125.

Similarly, the output unit 246 of the present embodiment acquires the value of the $\beta1$ axis to $\beta3$ axis from the impression word score list 231. The output unit 246 displays the graph 126 based on the value of each axis.

The impression word score list 231 of the present embodiment may be generated by preliminary processing. When the search result set data is acquired from the search by the search unit 243, the impression word score list 231 may acquire the score for each impression word from the search result set data and store the score in the impression word score list 231.

In a case where the score for each impression word is acquired from the search result set data, the search processing unit 240 may perform processing from step S1001 to step S1003 of FIG. 10 after acquiring a word group from the search result set data by the analysis unit 242. The search processing unit 240 may store the score for each impression word which is the result of performing the processing in the impression word score list 231 associated with the document ID indicating the search result set data.

As described above, in the present embodiment, it is possible to allow the user to easily determine that the search result is what the user intended by setting the impression word with a strong relationship with the query extracted based on the query as the axis of the radar chart 125. Therefore, according to the present embodiment, it is possible to provide the user of the search system 100 with satisfaction to the search result.

Hereinafter, a comparative example of a case that the present embodiment is not applied will be described with reference to with reference to FIG. 13. FIG. 13 is a diagram illustrating an example of a radar chart as a comparative example.

Figure 13:
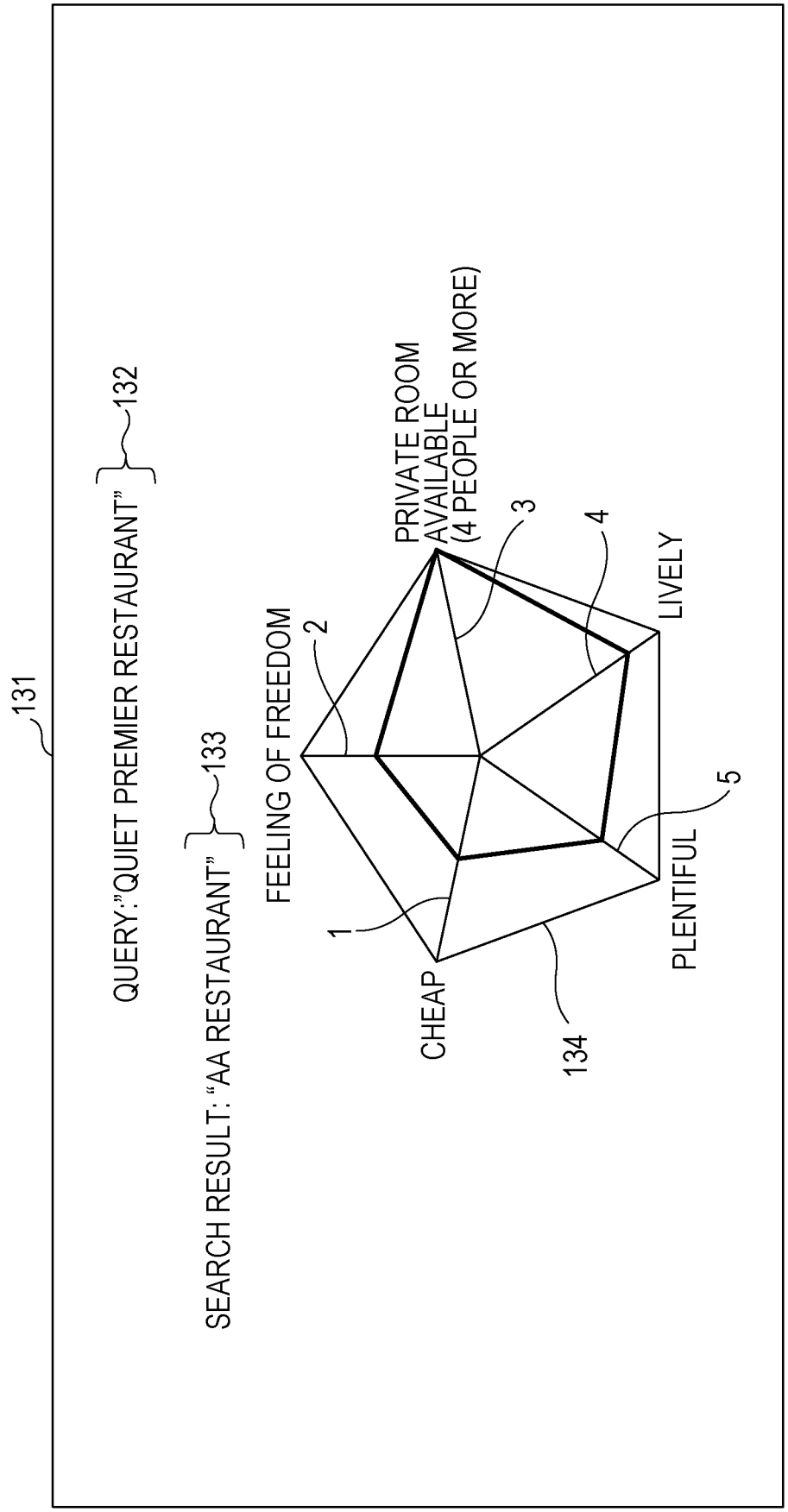
FIG. 13 is a diagram illustrating an example of a radar chart as a comparative example.

A query display field 132 in which an input query is displayed, a search result display field 133 in which the search result is displayed, and a radar chart 134 are displayed on a screen 131 illustrated in FIG. 13.

The items corresponding to the axes 1 to 5 illustrated in the radar chart 134 illustrated in FIG. 13 are words selected from the document data associated with "AA restaurant" acquired as the search result.

For example, the item corresponding to the axis 1 is "cheap", the item corresponding to the axis 2 is "feeling of freedom", the item corresponding to the axis 3 is "private room available", the item corresponding to the axis 4 is "lively", and the item corresponding to the axis 5 is "plentiful".

The query input with respect to the items corresponding to the axes 1 to 5 is "quiet premier restaurant".

For this reason, for example, the item "lively" corresponding to the axis 4 is an item hard to associate from the query, and the correspondence with the query is not clear.

As described above, in the radar chart indicating the search result, in a case where a word hard to associate from the query input by the user is used as an item, it is not easy for the user to determine whether or not the search result meet the intention of the user, and the user may not feel satisfaction with respect to the search result.

On the other hand, in the present embodiment, it is possible to properly evaluate the search result since the search result set data is displayed by the radar chart using the impression word, as the item, with a strong relationship with the query extracted based on the query.

Next, a display example of the radar chart of the present embodiment will be described with reference to FIG. 14. FIG. 14 is a second diagram that illustrates a display example of a radar chart of the first embodiment.

Figure 14:
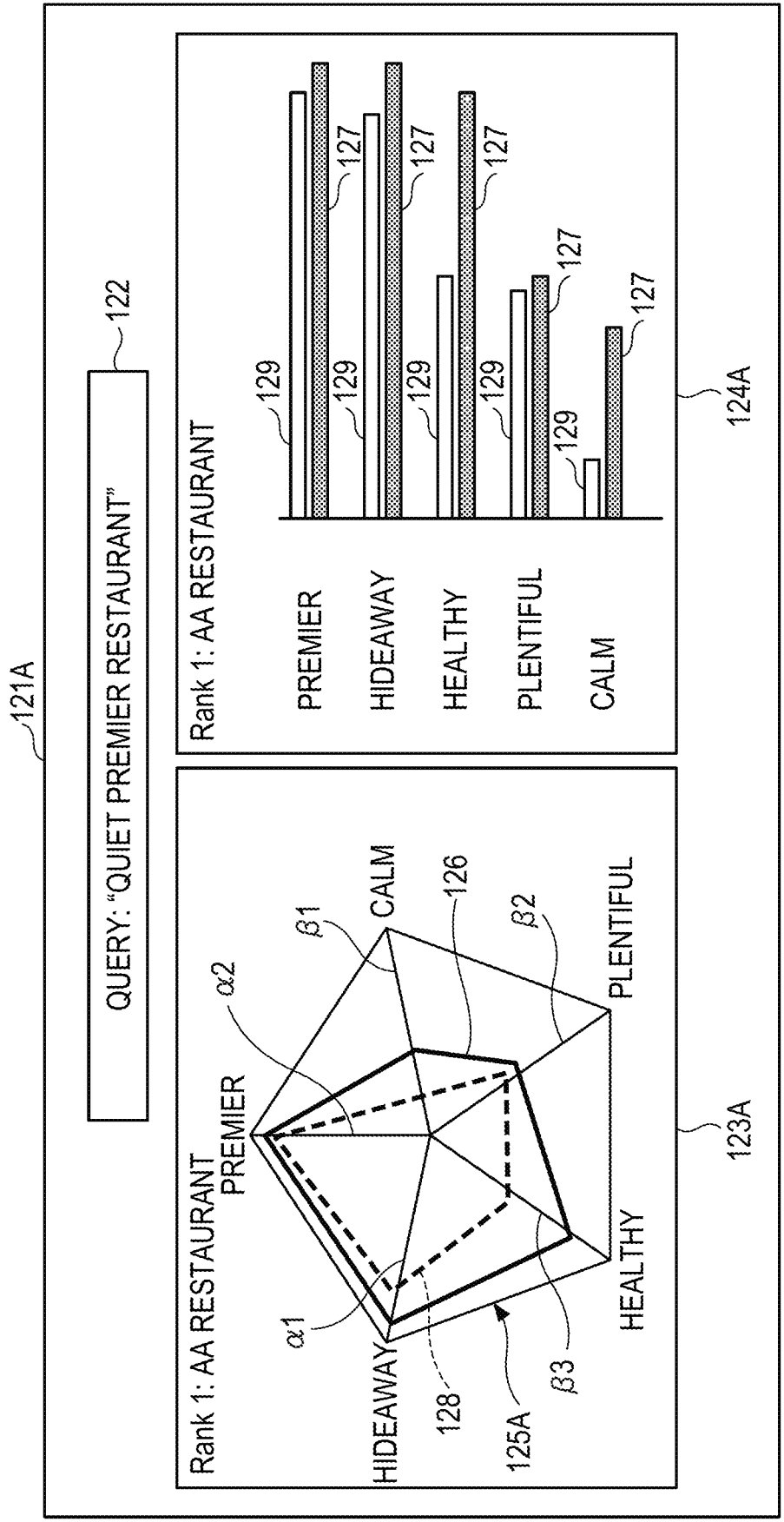
FIG. 14 is a second diagram that illustrates a display example of a radar chart of the first embodiment.

A screen 121A illustrated in FIG. 14 includes a search result display field 123A and a search result display field 124A.

The graph 126 and a graph 128 are displayed in a radar chart 125A displayed in the search result display field 123A.

The graph 128 is a graph indicating the relationship between the query and the axis items. The graph 128 may be displayed, for example, with reference to the impression word score list 114 acquired by the processing that extracts items corresponding to an α1 axis and an α2 axis of the radar chart 125A (see FIG. 11).

For example, the output unit 246 may acquire the score of impression word set as an item corresponding to each of the α1 axis, the α2 axis, a β1 axis, a β2 axis, and a β3 axis in the impression word score list 114, and display the graph 128 using the score as the value of each axis.

In the search result display field 124A of the screen 121A, a bar graph 129 indicating the value of each axis of the query is displayed.

In the present embodiment, as described above, the graph 126 indicating the relationship between the search result set data and the axis items and the graph 128 indicating the relationship between the query and the axis items are displayed in the radar chart 125A. Therefore, according to the present embodiment, it allows the user to easily grasp the degree of relationship between the search result set data and the query.

Second Embodiment

Hereinafter, the second embodiment will be described with reference to the drawings. The second embodiment is different from the first embodiment in that the item corresponding to the axis β is determined based on the query. In the following description of the second embodiment, only the differences from the first embodiment will be described. Those having the same functional configuration as those of the first embodiment are denoted by the same reference numerals as those used in the description of the first embodiment, and descriptions thereof will be omitted.

Figure 15:
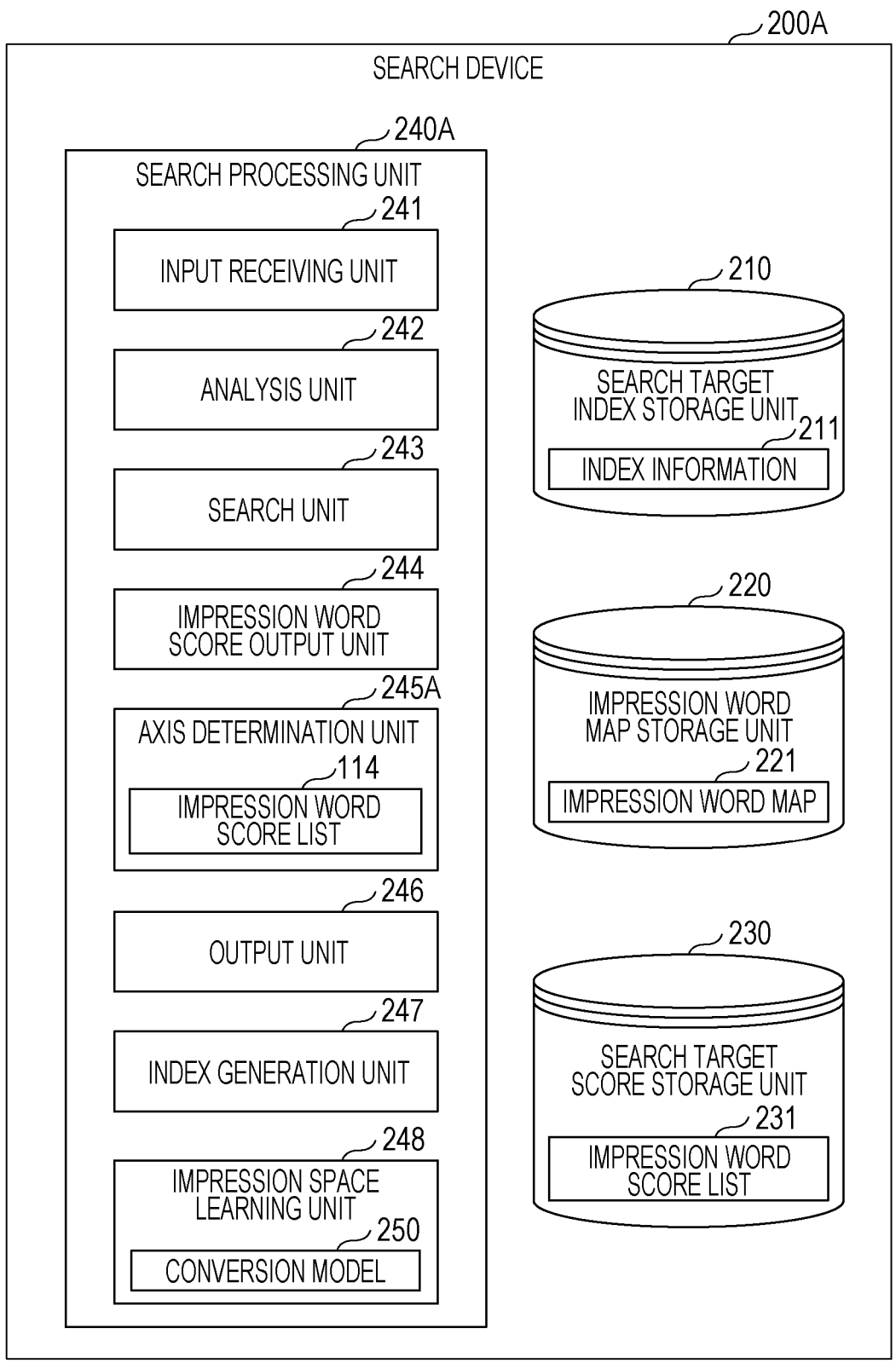
FIG. 15 is a diagram describing functions of a search device of a second embodiment.

FIG. 15 is a diagram describing functions of a search device of a second embodiment. A search device 200A of the present embodiment includes a search processing unit 240A.

The search processing unit 240A of the present embodiment includes the input receiving unit 241, the analysis unit 242, the search unit 243, the impression word score output unit 244, an axis determination unit 245A, the output unit 246, the index generation unit 247, and the impression space learning unit 248.

When the axis determination unit 245A of the present embodiment acquires the impression word score 113 for each word by the impression word score output unit 244, the axis determination unit 245A acquires and stores the impression word score list 114 indicating the maximum score of each impression word included in the impression word score 113 for each word. The axis determination unit 245A of the present embodiment refers to the impression word score list 114, and determines the impression word corresponding to the axis α and axis β of the radar chart.

Figure 16:
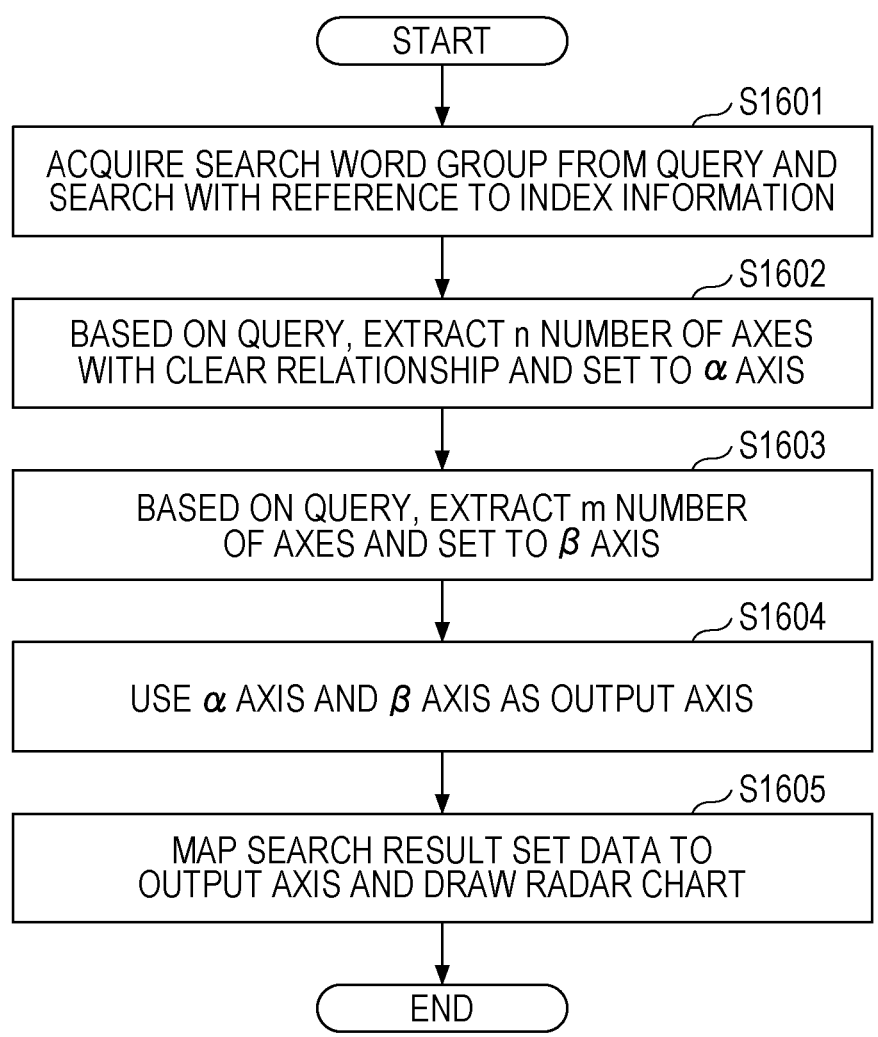
FIG. 16 is a flowchart that describes processing of a search processing unit of the second embodiment.

FIG. 16 is a flowchart that describes the processing of a search processing unit of the second embodiment. Since the processing of step S1601 of FIG. 16 is similar to the processing of step S901 of FIG. 9, description thereof is omitted.

The search processing unit 240A extracts the n number of impression words having a clear relationship with the query as an axis based on the input query by the impression word score output unit 244, generates and stores the impression word score list 114 by the axis determination unit 245A, and set them as the α axis (step S1602).

The axis determination unit 245A refers to the impression word score list 114 generated based on the query, extracts the m number of items corresponding to the β axis, and sets them as the β axis (step S1603). Details of the processing of step S1603 will be described later.

Since the processing of step S1604 and step S1605 of FIG. 16 is similar to the processing of step S904 and step S905 of FIG. 9, description thereof is omitted.

Figure 17:
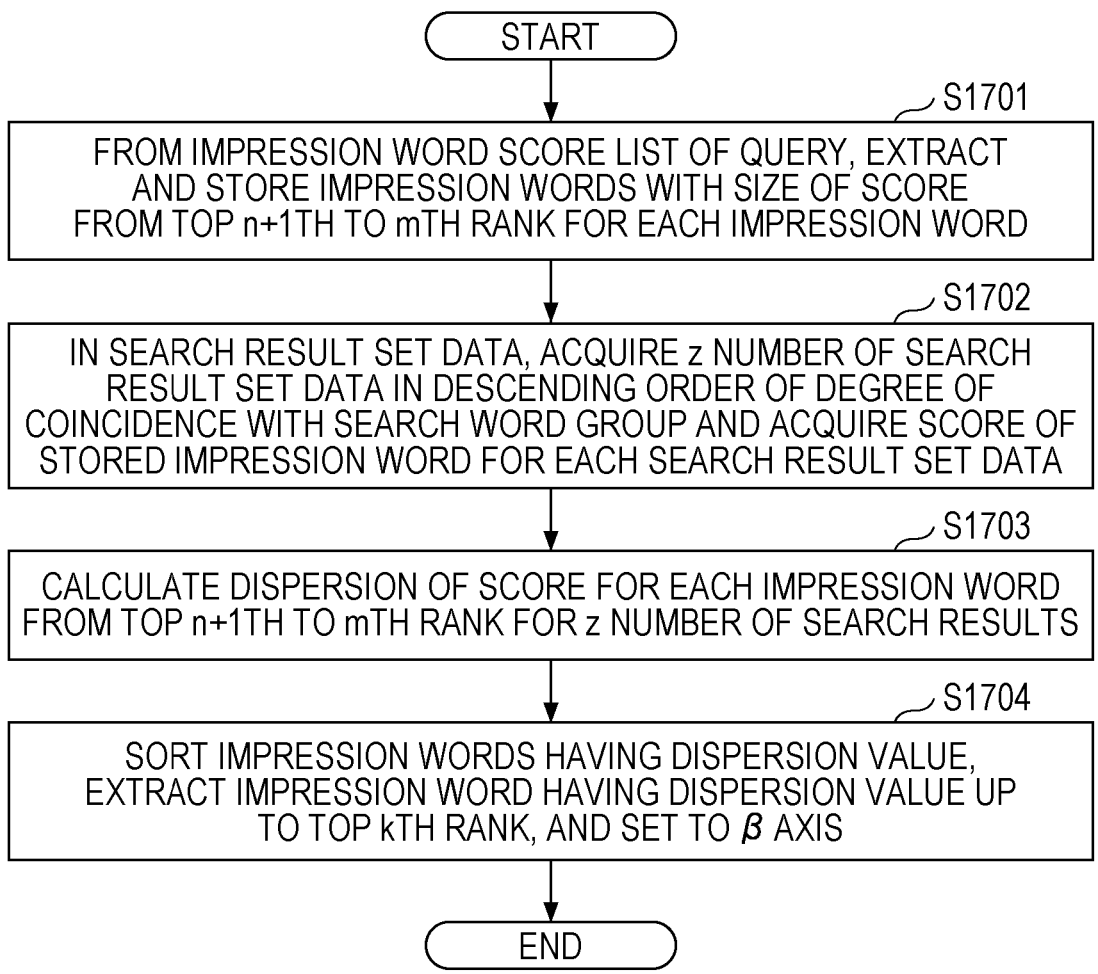
FIG. 17 is a flowchart describing processing of an axis determination unit of the second embodiment.

Next, the processing of the axis determination unit 245A of the present embodiment will be described with reference to FIG. 17. FIG. 17 is a flowchart describing processing of an axis determination unit of the second embodiment. The processing of FIG. 17 indicates the details of the processing of step S1603 of FIG. 16.

When the impression word score list 114 is generated in step S1602, the axis determination unit 245A of the present embodiment extracts and stores each score of size from top n+1th to the mth score and the impression word corresponding to corresponding to each score among the scores associated with each impression word from the impression word score list 114 (step S1701).

The axis determination unit 245A acquires the z number of search result set data pieces in descending order of the degree of coincidence with the search word group from the search result set data, and acquires the score corresponding to the impression word stored in step S1701 with reference to the impression word score list 231 on the z number of search result set data pieces (step S1702).

Hereinafter, the processing of step S1702 will be described. The axis determination unit 245A of the present embodiment acquires the z number of search result set data pieces in descending order of the degree of coincidence with the search word group from the search result set data acquired by the search of the search unit 243 in step S1601. The degree of coincidence with the search word group may be calculated based on the number of search word groups included in the search result set data, the appearance frequency of each word included in the search word group in the search result set data. As the degree of coincidence, the degree of coincidence in the case of performing information search may be used generally.

When the axis determination unit 245A acquires the z number of search result set data pieces, the axis determination unit 245A refers to the impression word score list 231 and acquires the score associated with the impression word stored in step S1701 for each document ID of each search result set data.

For example, it is assumed that impression words stored in step S1701 are "healthy", "quiet", "fancy", "lively", "plentiful", and "calm". It is assumed that the search result set data with document ID "2" is included in the z number of search result set data pieces.

In this case, the axis determination unit 245A refers to the impression word score list 231, and acquires the score 9.53 of impression word "healthy" corresponding to the document ID "2", the score 0.12 of the impression word "quiet", and the score 8.93 of the impression word "fancy" in step S1702 (see FIG. 8). Similarly, the axis determination unit 245A acquires the corresponding score of impression words, "lively", "plentiful", and "calm".

The axis determination unit 245A of the present embodiment acquires and stores the score for each impression word as described above for each of the z number of search result set data pieces.

The axis determination unit 245A calculates the dispersion of the score for each search result set data acquired in step S1702 for each impression word stored in step S1701 (step S1703).

The axis determination unit 245A sorts the impression words extracted in step S1701 by the dispersion value of the score, extracts the k number of impression words in descending order of impression words with large dispersion values, and sets the extracted impression word as the β axes (step S1704). k is the number obtained by subtracting n from the number of axes set in the radar chart, and is equal to the number of the β axes.

As described above, the axis determination unit 245A of the present embodiment extracts the impression word having variations in the strength of the relationship with the search result set data among the impression words with a small score indicating the strength of the relationship with the query compared with the α axis, and set as an item corresponding to the β axis.

In the present embodiment, by setting the item of the β axis in this way, the value of each axis being close to each other, the radar charts of search result set data pieces being similar to each other in the radar chart are suppressed. Therefore, according to the present embodiment, it is possible to display the features of each search result set data easy to understand when the search result is properly evaluated, and the radar chart of each search result set data is displayed.

Third Embodiment

Hereinafter, the third embodiment will be described with reference to the drawings. The third embodiment is different from the first embodiment in that the dispersion obtained when acquiring the score indicating the strength of the relationship between the word and the impression word is used when determining the axis. In the following description of the third embodiment, only the differences from the first embodiment will be described. Those having the same functional configuration as those of the first embodiment are denoted by the same reference numerals as those used in the description of the first embodiment, and descriptions thereof will be omitted.

First, the creation of the impression word map of the present embodiment to be described later will be described with reference to FIGS. 18A and 18B.

The impression word map of the present embodiment is created, for example, based on the result of a questionnaire or the like that is conducted on a large number of people to answer a score indicating the strength of the relationship between words and impression words.

For example, in the present embodiment, the results of the above-described questionnaire or the like are collected and the average, the maximum value, and the like of score indicating the strength of the relationship between the word and the impression word are stored in the impression word maps as the score indicating the relationship between the word the and impression word.

There are some words that have impression words that many people feel strongly related to the word, and impression words that feeling of the strength of the relationship to the word is different by people. In the former impression word, it is presumed that the variation of the score indicating the strength of the relationship with the word becomes small. In the latter impression word, it is presumed that the variation of the score indicating the strength of the relationship between the word and the impression word becomes large. In the present embodiment, attention is paid to the variation of the score of each impression word.

Figure 18A:
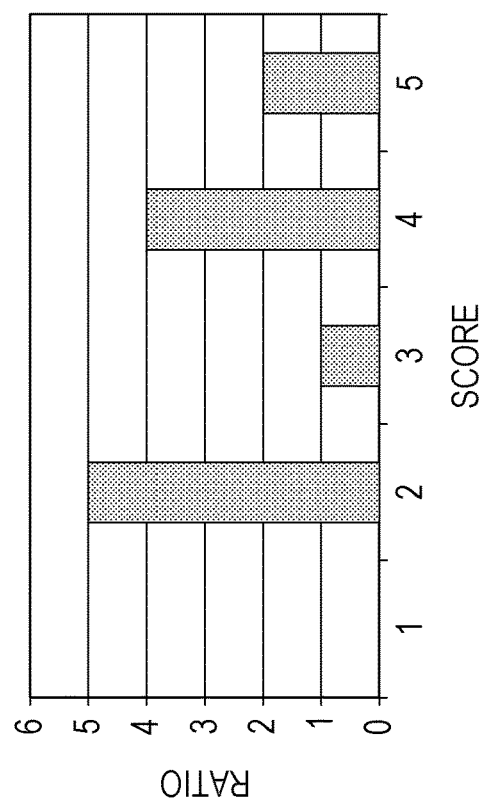
FIGS. 18A and 18B are graphs describing variation in scores in an impression word map of a third embodiment.
Figure 18B:
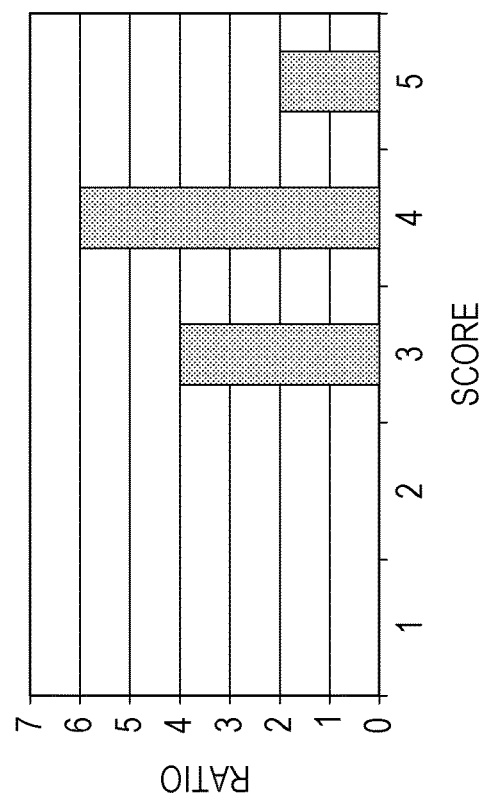

FIGS. 18A and 18B are graphs describing variation in scores in an impression word map of a third embodiment. FIG. 18A is a graph that illustrates the variation of the score indicating the strength of the relationship between the word "natural" and the impression word "delicious". FIG. 18B is a graph that illustrates the variation of the score indicating the strength of the relationship between the word "natural" and the impression word "smell nice".

In FIGS. 18A and 18B, the horizontal axis indicates the value of the score answered in the questionnaire. In the examples of FIGS. 18A and 18B, the score indicating the strength of the relationship between the word and the impression word is answered from 0 to 5. As the score is larger, it is assumed that the strength of the relationship that the respondents of the questionnaire feel between the word and the impression word is stronger.

In FIGS. 18A and 18B, the vertical axis indicates the ratio of the number of responses for each score to the number of all respondents of the questionnaire.

In FIG. 18A, regarding the strength of the relationship between the word "natural" and the impression word "delicious", the number of responses with the score "4" is the largest, and the distribution of score is unimodal. For example, in FIG. 18A, it is found that the variation of the score is small. This indicates that many people feel that word "natural" and the impression word "delicious" has a strong relationship.

In FIG. 18B, regarding the strength of the relationship between the word "natural" and the impression word "smell nice", there are many numbers of responses with the score "2" and score "4", and the distribution of score is bimodal. For example, in FIG. 18B, compared with FIG. 18A, it is found that score variation is large. This indicates that the feeling of the strength of the relationship between word "natural" and the impression word "smell nice" is different by people.

In the present embodiment, considering the variation in the feeling of people, for example, the average of the scores acquired as the result of questionnaire responses is associated with the value indicating the score variation with each combination of the word and the impression word, and are stored in an impression word map.

In the examples of FIGS. 18A and 18B, with the combination of the word "natural" and the impression word "delicious", the average of the score acquired as a response of the questionnaire is 3.8, and a standard deviation indicating the variation is 0.68. Therefore, in the present embodiment, the score "3.8" indicating the strength of the relationship between the word "natural" and the impression word "delicious" and the standard deviation "0.68" are associated with and stored in the impression word map.

In the example of FIGS. 18A and 18B, with the combination of the word "natural" and the impression word "smell nice", the average of the score acquired as a response to the questionnaire is 3.25, and the standard deviation indicating the variation is 1.16. Therefore, in the present embodiment, the score "3.25" and the standard deviation "1.16" indicating the strength of the relationship between the word "natural" and the impression word "smell nice" are associated with each other and stored in the impression word map.

In the present embodiment, in this way, by using the impression word map with which the score and the variation of the score are associated, for example, it is possible to extract another impression word to replace the axis when an impression word having a large standard deviation is used as an axis. For example, in the present embodiment, in a case where an impression word that the feeling of the strength of the relationship with the word is different by people is extracted as an axis, it is possible to extract another impression word to replace the impression word, and present to the user.

Therefore, according to the present embodiment, when displaying the search result set data acquired by the search processing by the search word group based on the query, it is possible to display the impression word that reflects the intention of the user as a candidate of an item (axis).

Figure 19:
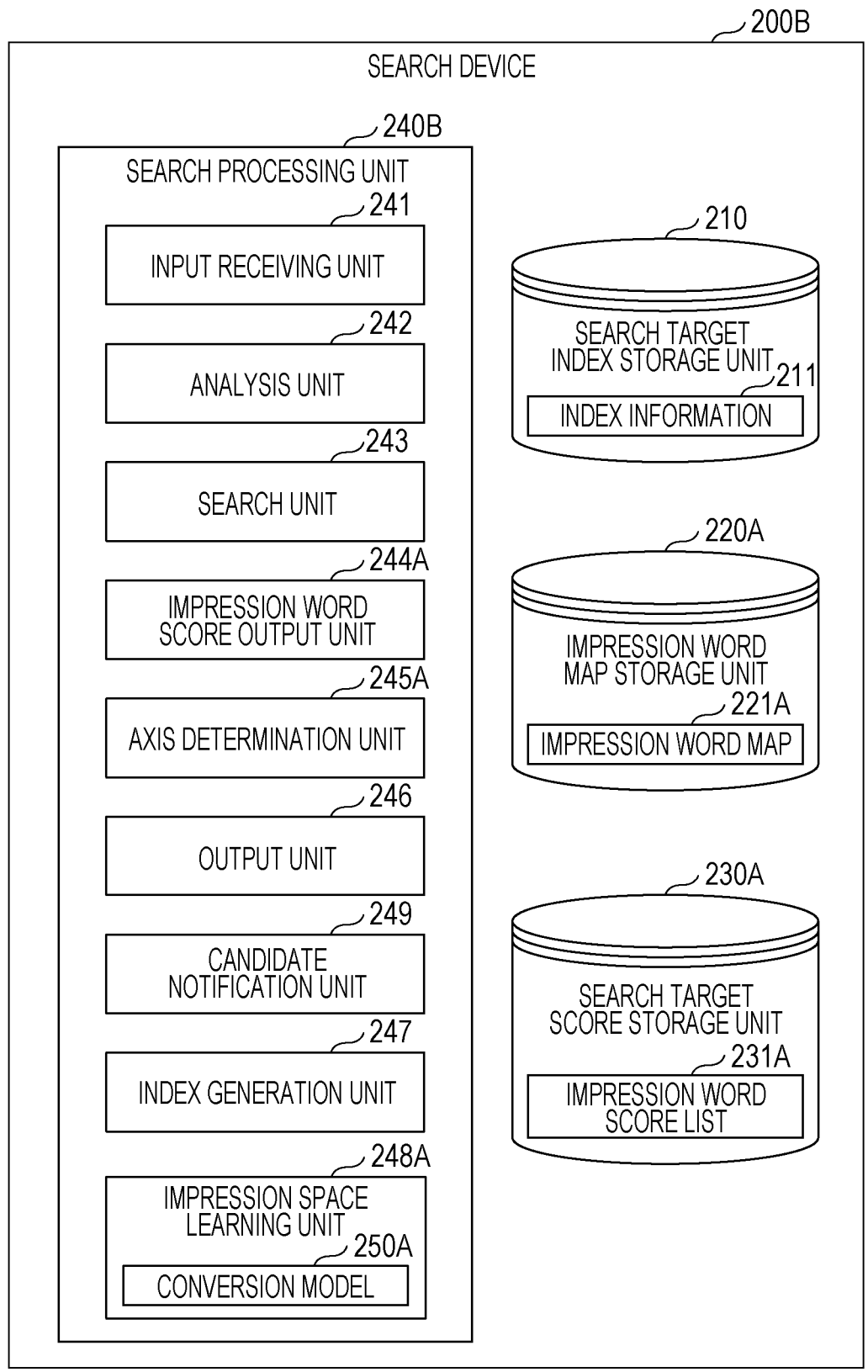
FIG. 19 is a diagram describing functions of a search device of the third embodiment.

Hereinafter, a search device of the present embodiment will be described. FIG. 19 is a diagram describing functions of a search device of the third embodiment. A search device 200B of the present embodiment includes the search target index storage unit 210, an impression word map storage unit 220A, a search target score storage unit 230A, and a search processing unit 240B.

An impression word map 221A is stored in the impression word map storage unit 220A. In the impression word map 221A, a score indicating the relationship between the impression word and the word and the standard deviation acquired when the score is acquired are associated with each other for each impression word. Details of the impression word map 221A will be described later.

An impression word score list 231A is stored in the search target score storage unit 230A. The impression word score list 231A is created by the processing of the search processing unit 240B. Details of the impression word score list 231A will be described later.

The search processing unit 240B of the present embodiment includes the input receiving unit 241, the analysis unit 242, the search unit 243, an impression word score output unit 244A, the axis determination unit 245A, the output unit 246, the index generation unit 247, an impression space learning unit 248A, and a candidate notification unit 249.

The impression word score output unit 244A of the present embodiment outputs the score indicating the strength of the relationship between the word represented by a vector and the impression word and the standard deviation of the score based on the impression word map 221A and a conversion model 250A output by the impression space learning unit 248A described later.

The axis determination unit 245A of the present embodiment outputs an impression word as an axis of a radar chart for displaying the search result and an impression word that is replaceable with the impression word based on the score and the standard deviation for each impression word output by the impression word score output unit 244A. The impression word replaceable with the impression word determined as an axis is referred to as a candidate axis. The impression word as a candidate axis of the present embodiment is, for example, a third feature word group that is a candidate of the feature word group (first feature word group) indicating the feature of the content estimated from the query.

The impression space learning unit 248A of the present embodiment outputs the conversion model 250A based on the document data of the search target stored in the search target document database 400 and the impression word map 221A. The conversion model 250A of the present embodiment is a model that inputs a semantic vector of a word acquired by distributed representation, and outputs the score for an impression word associated with the word and the standard deviation of the scores.

The candidate notification unit 249 of the present embodiment notifies the impression word as the candidate axis output by the axis determination unit 245A.

Hereinafter, the impression word map 221A of the present embodiment will be described with reference to FIG. 20. FIG. 20 is a table illustrating an example of the impression word map of the third embodiment.

The impression word map 221A of the present embodiment is created in advance and given to the search device 200B. In the impression word map 221A of the present embodiment, the score (value) indicating the strength of the relationship with an impression word prepared in advance and the standard deviation indicating the variation of the score are associated with each other for each word.

In FIG. 20, for example, the score indicating the strength of the relationship between the word "restaurant" and the impression word "lively" is 1.6, and the standard deviation σ thereof is 0.5. The score indicating the strength of the relationship between the word "restaurant" and the impression word "stuffed" is 3.1, and the standard deviation σ thereof is 1.7. Therefore, between the impression word "lively" and the impression word "stuffed", many people feel that the impression word "lively" has a higher strength of the relationship than that of the word "restaurant".

In the present embodiment, a value indicating the variation of the score indicating the strength of the relationship between the word and the impression word as the standard deviation, but not limited thereto. The value indicating the variation of the score indicating the strength of the relationship between the word and the impression word may be held as dispersion.

Next, the impression word score list 231A of the present embodiment will be described with reference to FIG. 21.

FIG. 21 is an example table of an impression word score list of the third embodiment. In FIG. 21, an example of the impression word score list 231A acquired from the document data related to restaurants and the like in the search target document database 400 is illustrated. The impression word score list 231A may be created in advance and given to the search device 200B.

In the impression word score list 231A, a document ID that specifies the document data, a name of the store indicated by the document data, text data indicating the content of the document data, and a score indicating the strength of the relationship with each impression word included in the impression word score list 231A are associated with one another. The impression words included in the impression word score list 231A are the same as the impression word included in the impression word map 221A.

Figure 22:
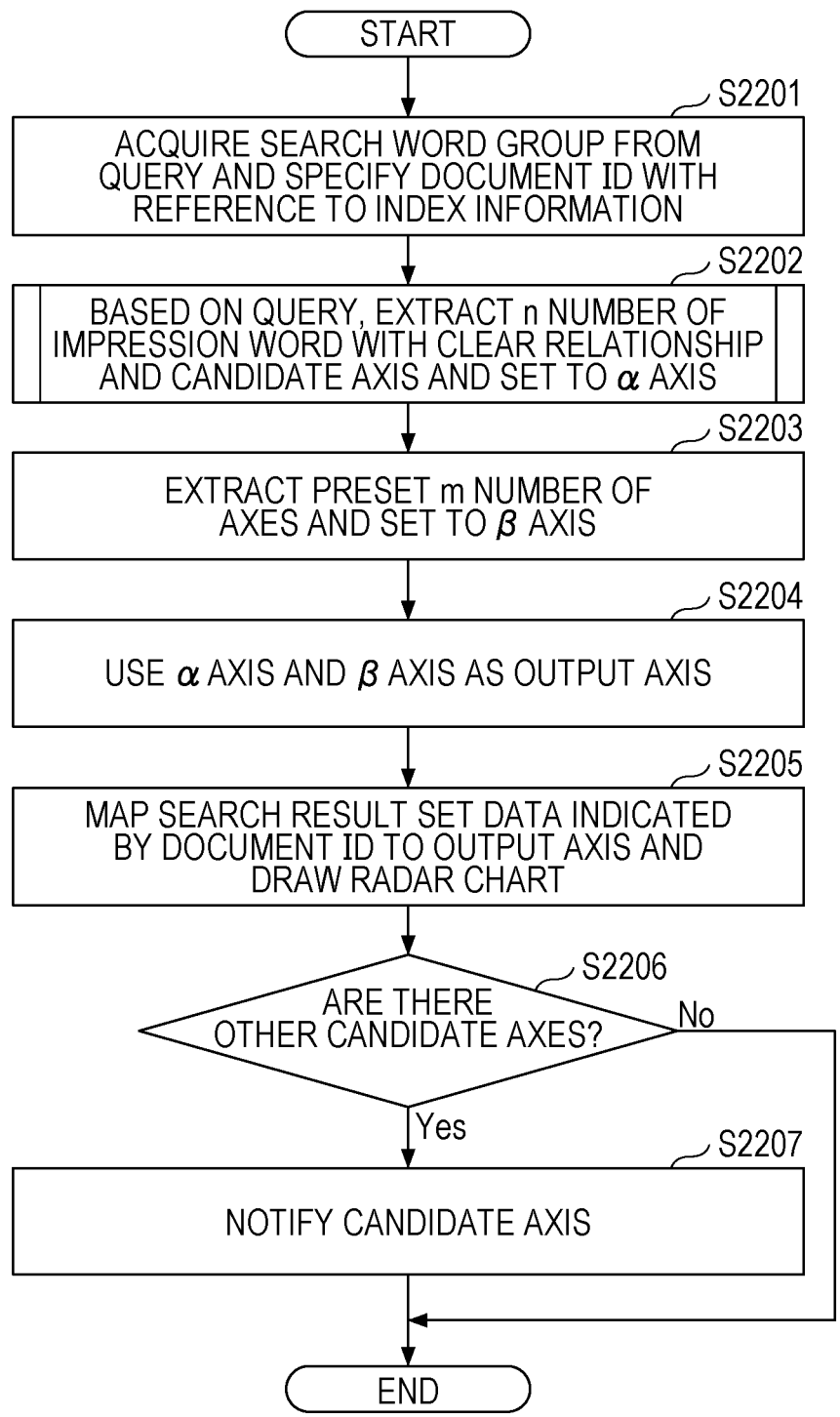
FIG. 22 is a flowchart describing processing of a search processing unit of the third embodiment.

Next, the processing of the search processing unit 240B of the present embodiment will be described with reference to FIG. 22. FIG. 22 is a flowchart describing processing of a search processing unit of the third embodiment.

The search processing unit 240B of the present embodiment acquires the search word group by morphological analysis or the like from the query by the analysis unit 242, searches the index information 211 with the search word group by the search unit 243, and specifies the document ID corresponding to the search word group (step S2201).

The search processing unit 240B extracts the n number of impression words that are assumed to have a strong relationship with the query as axes and set the impression words as a axes based on the query input by the impression word score output unit 244A, and extract the impression word as a candidate axis (step S2202). Details of the processing of step S2202 will be described later.

Since the processing from step S2203 to step S2205 of FIG. 22 is similar to the processing from step S903 to step S905 of FIG. 9, description thereof is omitted.

When the output unit 246 draws a radar chart in step S2205, the search processing unit 240B determines whether or not the impression word as a candidate axis is extracted by the candidate notification unit 249 in step S2202 (step S2206). In step S2206, in a case where the impression word is not extracted, the search processing unit 240B ends the processing.

In step S2206, in a case where the impression word is extracted, the candidate notification unit 249 outputs the impression word extracted as a candidate axis in step S2202 on a screen that a radar chart is displayed, notifies that it is possible to replace the axis of radar chart with a candidate axis (step S2207), and ends the processing.

Figure 23:
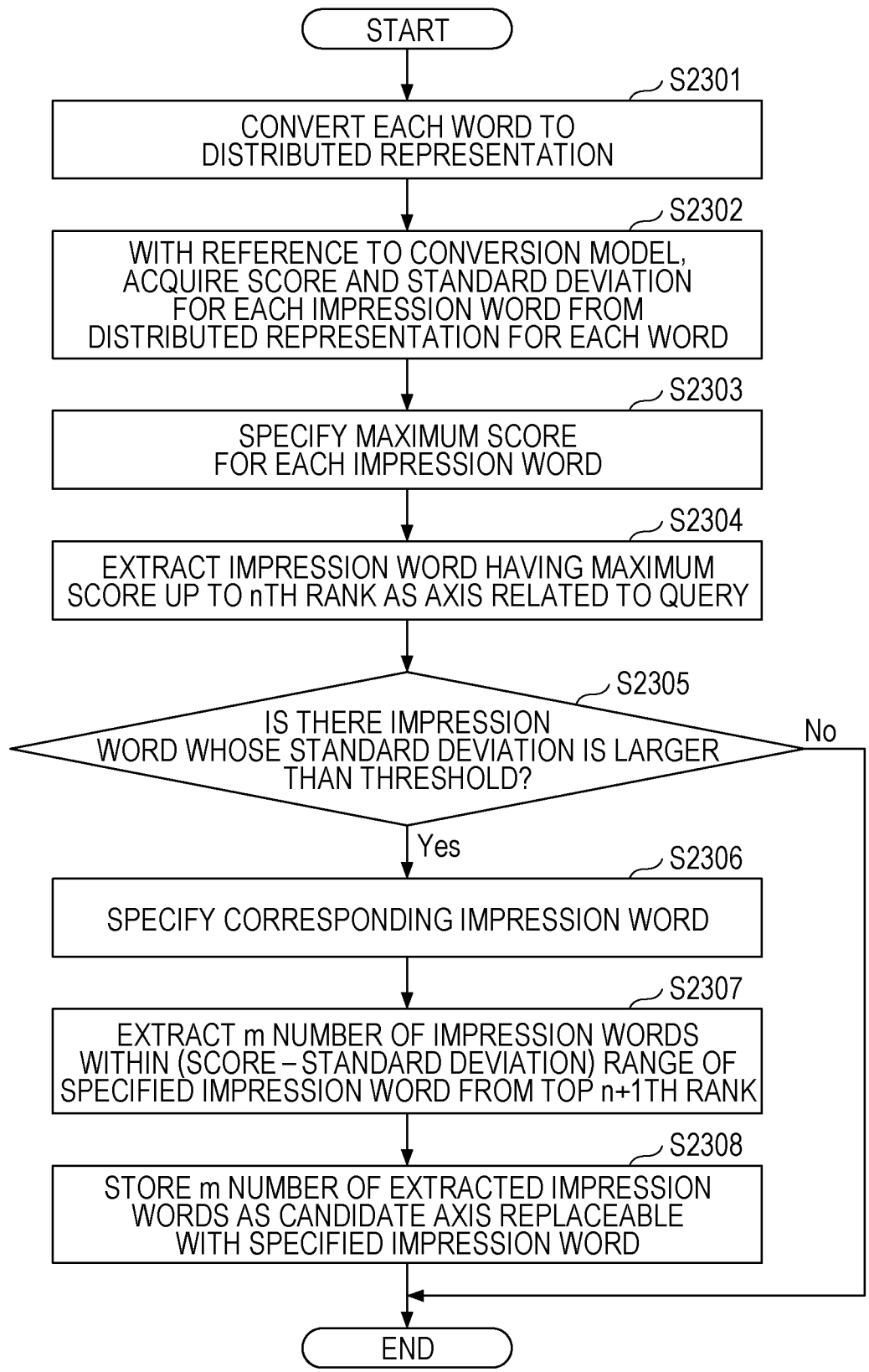
FIG. 23 is a flowchart describing processing of an impression word score output unit and an axis determination unit of the third embodiment.

Next, details on the processing of step S2202 of FIG. 22 will be described with reference to FIG. 23. FIG. 23 is a flowchart describing processing of an impression word score output unit and an axis determination unit of the third embodiment.

The impression word score output unit 244A of the present embodiment converts each word included in the search word group acquired in step S2201 to the distributed representation (step S2301).

The impression word score output unit 244A refers to the conversion model 250A, acquires the score that indicates the strength of the relationship between each word and each impression word and the standard deviation for each word (step S2302), and proceeds to step S2303. For example, the impression word score output unit 244 inputs the semantic vector for each word acquired in step S2301 with respect to the conversion model 250A, and acquires the score of each impression word and the standard deviation for each word output from the conversion model 250A.

Since the processing of step S2303 and step S2304 are similar to the processing of step S1003 and step S1004 of FIG. 10, the description thereof is omitted.

Following step S2304, the search processing unit 240B determines whether or not there is an impression word that has the standard deviation value larger than a threshold among the standard deviations of the extracted impression words in step S2304 by the axis determination unit 245A (step S2305).

In step S2305, in a case where there is no corresponding impression word, the search processing unit 240B ends the processing and proceeds to step S2203.

In step S2305, in a case where there is a corresponding impression word, the axis determination unit 245A specifies the impression word that has the standard deviation larger than the threshold from the extracted impression words (step S2306).

The axis determination unit 245A extracts the m number of impression words that has the maximum score of n+1th rank or lower from top, and the maximum score is larger than the value obtained by subtracting the standard deviation from the maximum score of the impression word specified in step S2306 (step S2307).

The axis determination unit 245A stores the m number of extracted impression words as candidate axes replaceable with the impression word specified in step S2306 (step S2308), and proceeds to step S2203.

Figure 24:
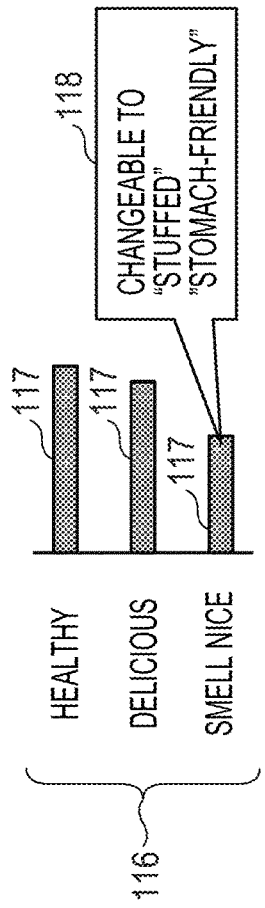
FIG. 24 is a diagram describing extraction of a candidate axis by the search processing unit of the third embodiment.

Hereinafter, the extraction of a candidate axis by the search processing unit 240B of the present embodiment will be described in details with reference to FIG. 24. FIG. 24 is a diagram describing extraction of a candidate axis by the search processing unit of the third embodiment.

In FIG. 24, a case that a query "restaurant using natural materials and vegetables" is input, and "natural", "material", "vegetable", "restaurant" are extracted by the analysis unit 242 as a search word group 111A is illustrated.

The search processing unit 240B acquires the semantic vector of each word included in the search word group 111A and input as the conversion model 250A by the impression word score output unit 244A, and acquires the score and the standard deviation for each impression word included in the impression word map 221A for each word.

In FIG. 24, information in which each word included in the search word group 111A is associated with the score and the standard deviation for each impression word is referred to as an impression word score 113A for each word.

Next, the axis determination unit 245A acquires the maximum score for each impression word from the impression word score 113A for each word.

In the impression word score 113A for each word of FIG. 24, the score indicating the strength of the relationship between the impression word "delicious" and the word "restaurant" and the standard deviation are 3.4 and 0.2, and the score indicating the strength of the relationship between the impression word "delicious" and the word "vegetable" and the standard deviation are 3.7 and 0.3. The score indicating the strength of the relationship between the impression word "delicious" and the word "natural" and the standard deviation are 3.8 and 0.7, and the score indicating the strength of the relationship between the impression word "delicious" and the word "material" and standard are 3.2 and 0.5.

Therefore, the axis determination unit 245A acquires "3.8" as the maximum value of the score of the impression word "delicious" and acquires "0.7" as the standard deviation of the impression word "delicious".

In the impression word score 113A for each word, the score indicating the strength of the relationship between the impression word "healthy" and the word "restaurant" and the standard deviation are 3.0 and 0.5, and the score indicating the strength of the relationship between the impression word "healthy" and the word "vegetable" and the standard deviation are 4.2 and 0.3. The score indicating the strength of the relationship between the impression word "healthy" and the word "natural" and the standard deviation are 3.1 and 1.2, and the score indicating the strength of the relationship between the impression word "healthy" and the word "material" and the standard deviation are 3.0 and 0.7.

Therefore, the axis determination unit 245A acquires "4.2" as the maximum score of the impression word "healthy" and "0.3" as the standard deviation of the impression word "healthy".

The axis determination unit 245A of the present embodiment stores the maximum value of the score and the standard deviation for each impression word acquired in this manner as an impression word score list 114A.

The axis determination unit 245A extracts the n number of impression words in descending order of the impression words having the maximum score in the impression word score list 114A, and set them as the α axis. In the example of FIG. 24, n is 3.

In the impression word score list 114A, the impression word having the maximum score is "healthy", the impression word having the next maximum score is "delicious", and the impression word having the next maximum score is "smell nice".

Therefore, the axis determination unit 245A of the present embodiment determines the impression word "healthy", the impression word "delicious", and the impression word "smell nice" as the α axis. For example, the axis determination unit 245A uses the impression word "healthy", the impression word "delicious", and the impression word "smell nice" as an item when displaying the search result set data.

The axis determination unit 245A of the present embodiment refers to the impression word score list 114A, and determines whether or not the standard deviation of each of the impression word "healthy", the impression word "delicious", and the impression word "smell nice" determined as the α axis is larger than a predetermined threshold.

The predetermined threshold of the standard deviation will be described as 1.0. Any value may be set as the predetermined threshold.

In the impression word score list 114A, the standard deviation of the impression word "healthy" is 0.3, the standard deviation of the impression word "delicious" is 0.7, and both values are equal to or less than the predetermined threshold.

On the other hand, the standard deviation of the impression word "smell nice" is 1.2, which is larger than the predetermined threshold. This indicates that the feeling of the strength of the relationship between the impression word "smell nice" and the word included in the search word group 111A is different depending on the people.

In the present embodiment, with reference to the impression word score list 114A, the m number of impression words that have the score of n+1th rank or lower from top, and the score is the value obtained by subtracting the standard deviation 1.2 from the score 3.2 of the impression word "smell nice" is equal to or higher than 2.0 are extracted in descending order of the score as a candidate axis.

In the example of FIG. 24, m is 2. Therefore, the axis determination unit 245A extracts two impression words that have a score 4th ranked or lower from the top in the impression word score list 114A in descending order of the score, and 2.0 or higher.

In FIG. 24, the impression word "stuffed" with the score of 3.1 and the impression word "stomach-friendly" with the score of 2.8 are extracted as a candidate axis.

The output unit 246 of the search processing unit 240B displays the impression word "healthy", the impression word "delicious", and the impression word "smell nice" as an item (axis) 116 that indicates the search result set data on a screen 115 that displays the search result set data. The output unit 246 displays a bar graph 117 indicating the value of each item (axis) on the screen 115. In the example of FIG. 24, an example in which "Kyoto cuisine BB" is extracted as the search result set data is displayed.

At this time, the candidate notification unit 249 displays a notification field 118 indicating that, in association with the impression word "smell nice", the impression word is changeable with the impression word "stuffed" or the impression word "stomach-friendly" extracted as a candidate axis.

In the present embodiment, by displaying the notification field 118 as described above, for example, in a case where the user feels that the relationship between the search word group 111A and the impression word "smell nice" displayed as an item is weak, the user may change the item to another impression word. In the present embodiment, by displaying the notification field 118, it is possible to inform the user who thinks that the relationship between the search word group 111A and the impression word "smell nice" is weak, that it is possible to reflect the intention (feeling) of the user.

Figure 25:
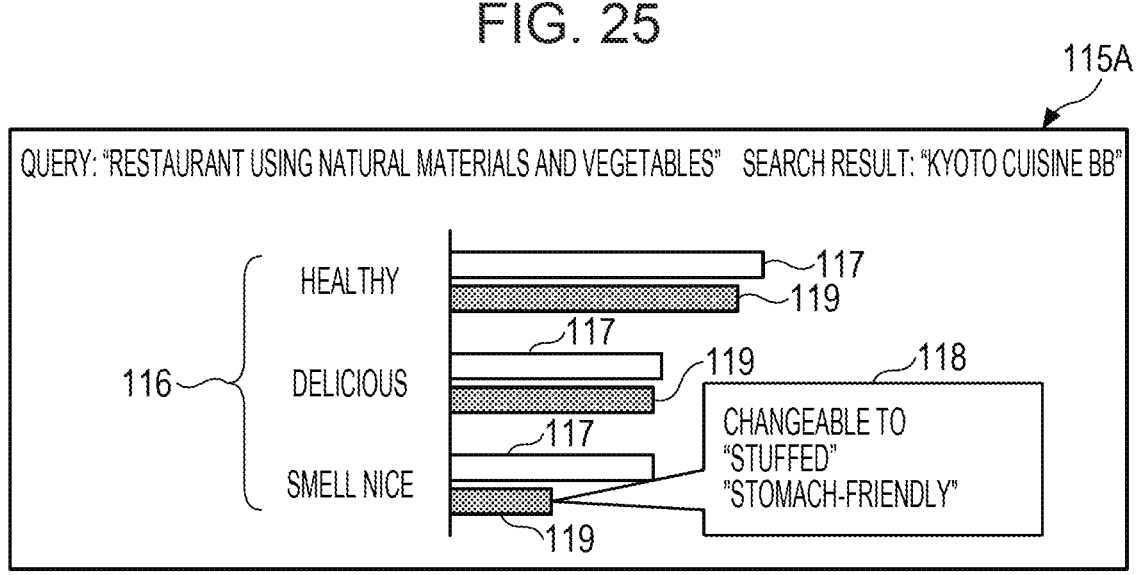
FIG. 25 is a first diagram illustrating a display example of the third embodiment.

Hereinafter, a display example of the present embodiment will be described with reference to FIGS. 25 and 26. FIG. 25 is a first diagram illustrating a display example of the third embodiment.

On a screen 115A illustrated in FIG. 25, a bar graph 119 indicating the value of each axis of the query is displayed in addition to the item (axis) 116 indicating the search result set data, the bar graph 117 indicating the value of each axis (item), and the notification field 118 of a candidate axis replaceable with the impression word "smell nice".

Figure 26:
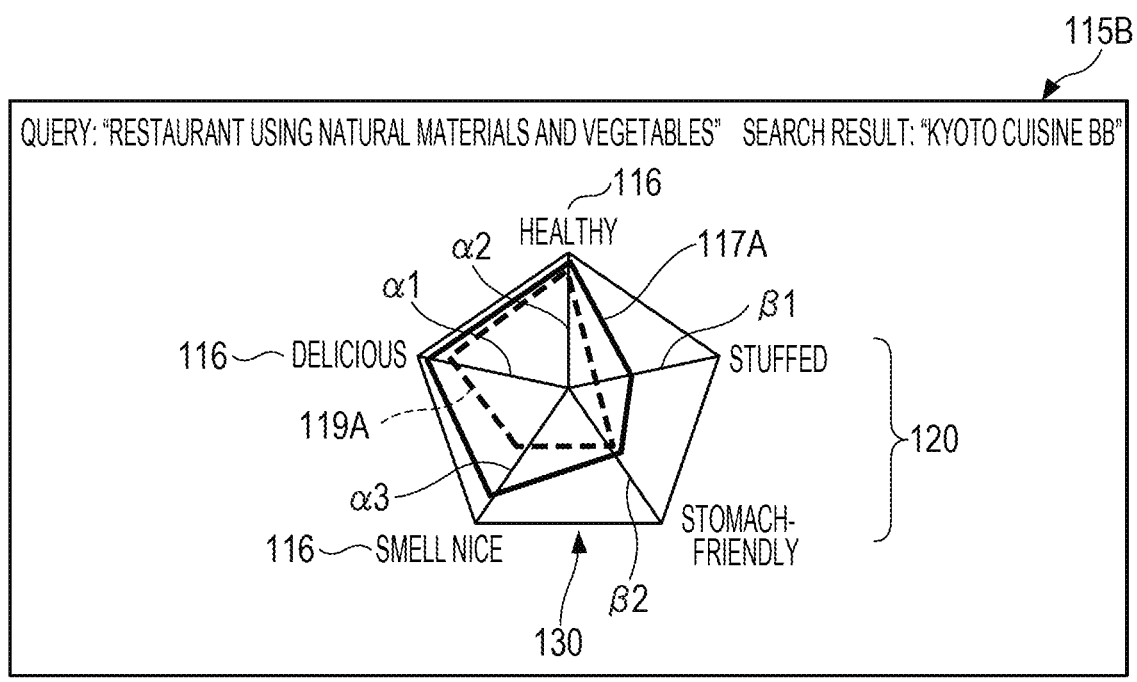
FIG. 26 is a second diagram illustrating a display example of the third embodiment.

FIG. 26 is a second diagram illustrating a display example of the third embodiment.

In a screen 115B illustrated in FIG. 26, the search result set data is displayed by a radar chart 130.

In the radar chart 130, a graph 117A and a graph 119A are displayed. The graph 117A indicates the relationship between the search result set data and the item as an axis, and the graph 119A indicates the relationship between the query and the item as an axis.

In the radar chart 130, an α1 axis is "healthy", an α2 axis is "delicious", and an α3 axis is "smell nice", and the impression words "stuffed" and "stomach-friendly" extracted as candidate axis are set as a β1 axis and a β2 axis respectively.

As described above, in the present embodiment, when displaying the radar chart, the impression word extracted as a candidate axis may be the β axis. In the present embodiment, when displaying the radar chart, the β axis is determined based on the same method in the first and second embodiment, and another candidate axis associated with the impression word having the standard deviation larger than the predetermined threshold among the impression words as the α axis may be notified.

In the screen 115B of FIG. 26, for example, the β axis of the radar chart 130 is, for example, the word extracted from the search word group 111A extracted from the query, and the notification field 118 is displayed in association with the α3 axis.

As described above, in the present embodiment, in a case where there is a certain variation or more in the score of the impression word as an axis, it is possible to display the search result in which the intention of the user is reflected by notifying the user about another impression word may be used as an axis.

Fourth Embodiment

Hereinafter, the fourth embodiment will be described with reference to the drawings. The fourth embodiment is different from the third embodiment in that the axes are changed after receiving the selection of the impression word displayed as a candidate axis. In the description of the fourth embodiment below, only the differences from the third embodiment will be described. Those having the same functional configuration as those of the third embodiment are denoted by the same reference numerals as those used in the description of the third embodiment, and descriptions thereof will be omitted.

Figure 27:
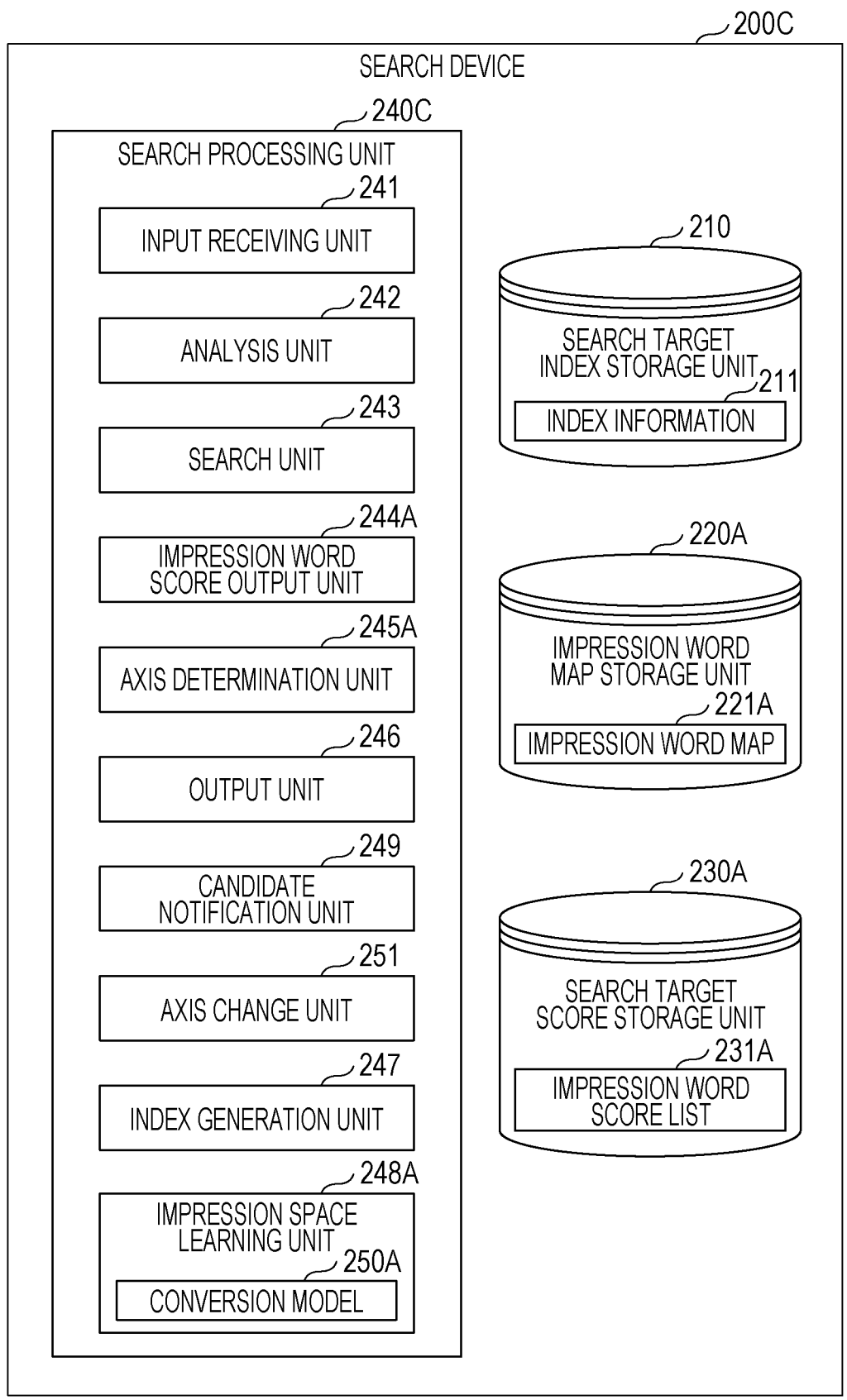
FIG. 27 is a diagram describing functions of a search device of a fourth embodiment.

FIG. 27 is a diagram describing functions of a search device of a fourth embodiment. A search device 200C of the present embodiment includes a search processing unit 240C.

The search processing unit 240C of the present embodiment includes an axis change unit 251 in addition to each unit of the search processing unit 240B.

When the selection of the candidate axis displayed in association with the axis is received in the terminal device 300 and the like, for example, the axis change unit 251 of the present embodiment displays the graph in which the axis is changed according to the selection with respect to the output unit 246. In a case where an axis is specified by the user, the axis change unit 251 of the present embodiment receives the selection of the candidate axis, and changes the impression word having the minimum value among the impression words with axis other than the specified axes with the impression word as the selected axis.

Hereinafter, the processing of the axis change unit 251 of the search processing unit 240C of the present embodiment will be described with reference to FIG. 28.

Figure 28:
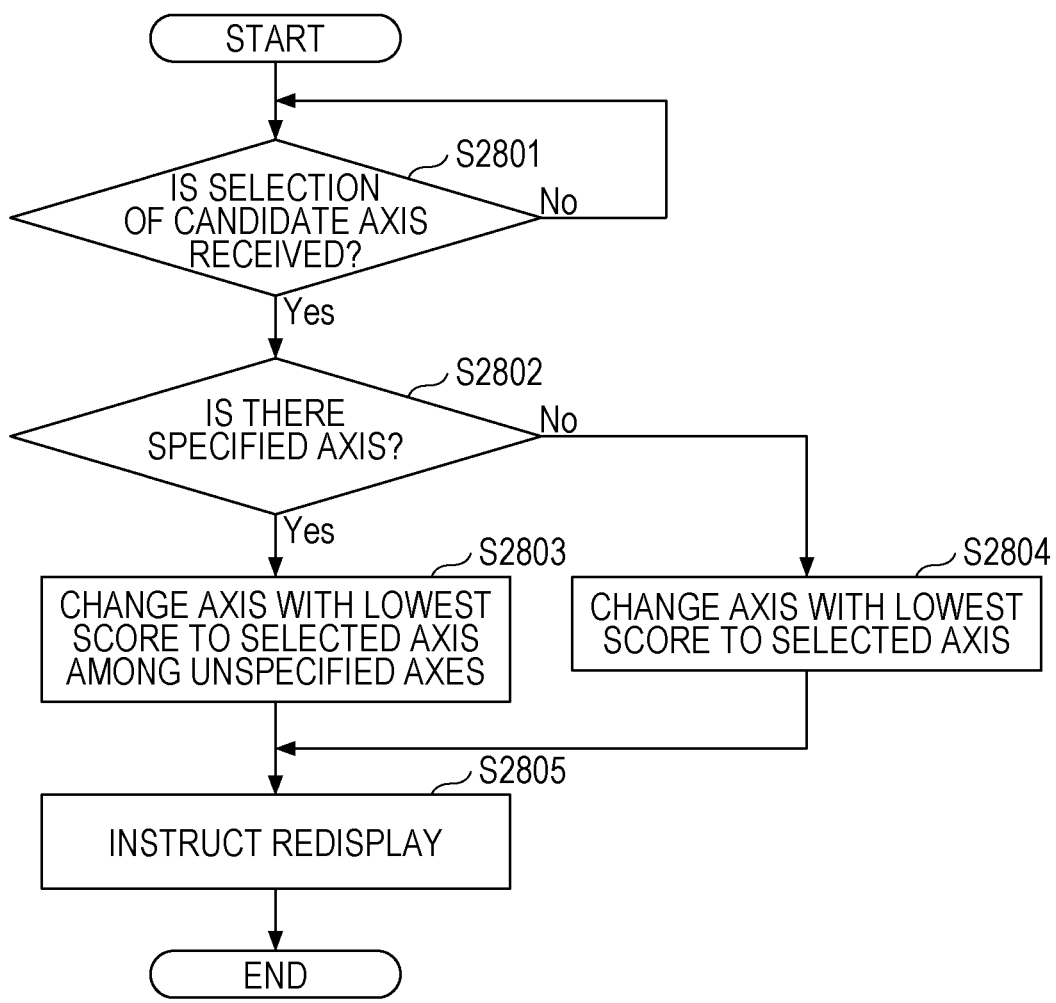
FIG. 28 is a flowchart describing axis change processing in the fourth embodiment.

FIG. 28 is a flowchart describing axis change processing in the fourth embodiment. In the search processing unit 240C of the present embodiment, the axis change unit 251 determines whether or not to receive the selection of the candidate axis in the notification of the candidate axis (step S2801). In step S2801, in a case where the selection is not received, the axis change unit 251 waits until the selection is received.

In step S2801, in a case where the selection of the axis is received, the axis change unit 251 determines whether or not there is the axis specified by the user (step S2802). "specified" is the specification for maintaining the display. Therefore, in the present embodiment, the display of the specified axis is maintained.

In step S2802, in a case where there is a specified axis, the axis change unit 251 changes the axis with the smallest maximum score to the selected candidate axis among the axes (impression word) that are not specified by the user (step S2803).

In step S2802, in a case where there is no specified axis, the axis change unit 251 changes the axis with the lowest score to the selected candidate axis among the displayed axes of the graph (step S2804).

Following steps S2803 and S2804, the axis change unit 251 instructs the display of the graph in which the axis is changed to the output unit 246 (step S2805), and ends the processing.

Figure 29A:
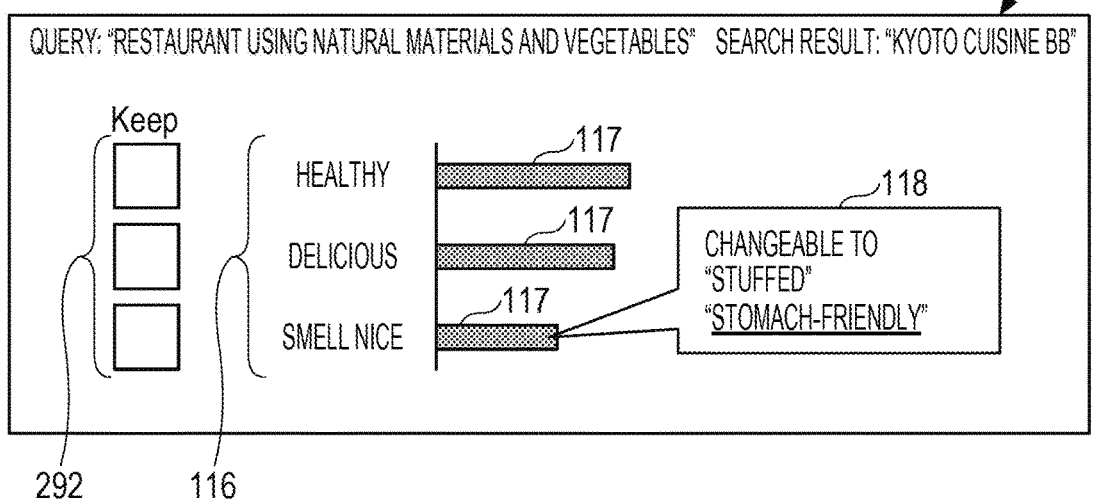
FIGS. 29A to 29C are diagrams describing change of axis.
Figure 29B:
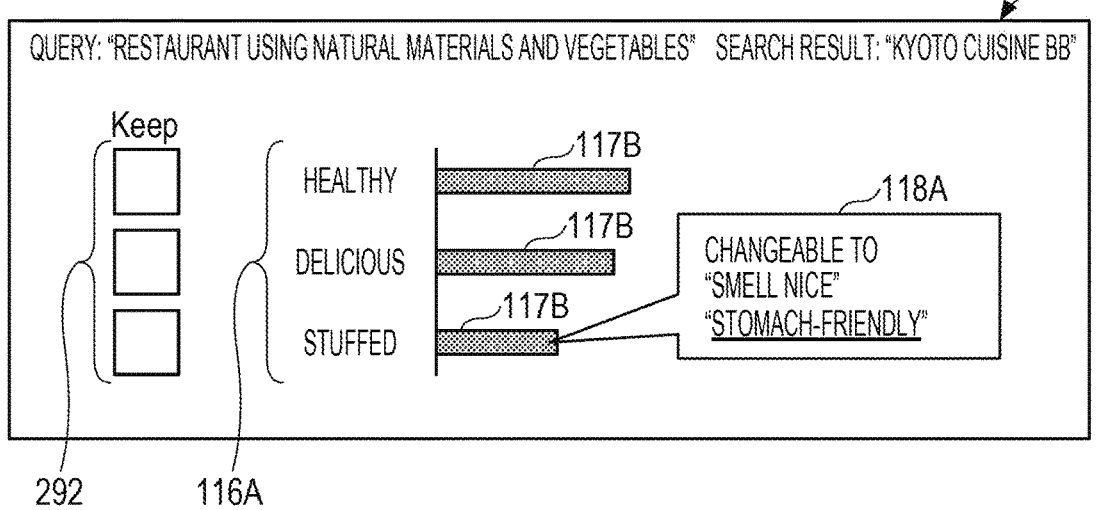
Figure 29C:
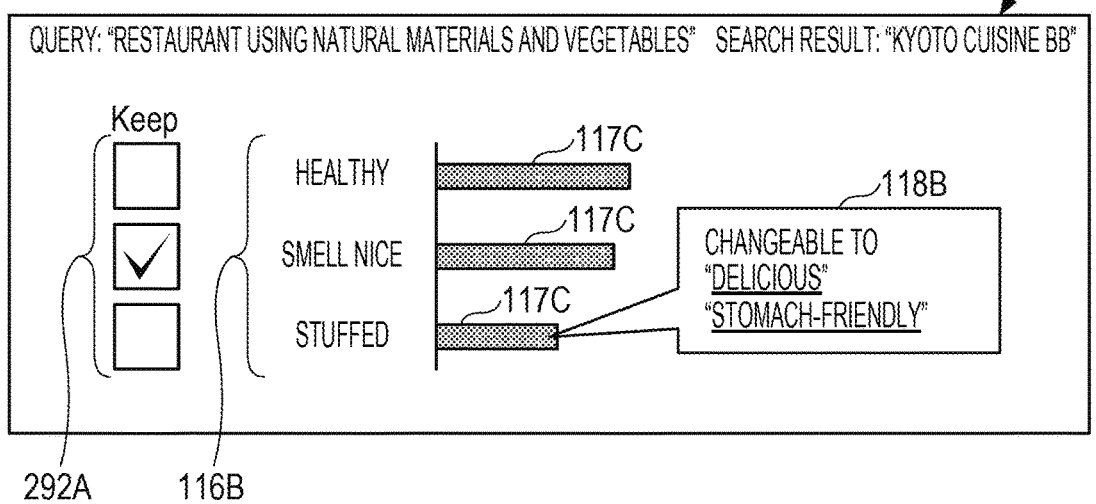

Hereinafter, the change of the axis will be described in details with reference to FIGS. 29A to 29C. FIGS. 29A to 29C are diagrams describing the change of axis.

In FIG. 29A, a screen 291 in which a specification field 292 to specify the impression word extracted as the α axis is displayed in the screen 115 that the displays search result set data.

A screen 291A illustrated in FIG. 29B is an example screen transitioning from the screen 291 in a case where the specification of an axis in the specification field 292 is not performed, and the candidate axis "stuffed" displayed in the notification field 118 is selected.

In the screen 291, the impression words extracted as the axes 116 are "healthy", "delicious", and "smell nice". In the notification field 118, when "stuffed" is selected, since there is no specification of the specification field 292, the axis change unit 251 changes the impression word having the smallest maximum score to the impression word "stuffed" among the impression words "healthy", "delicious", "smell nice" (see FIG. 24).

Among the axes 116, the impression word having the smallest maximum score is "smell nice". Therefore, in the screen 291A, axes 116A in which the impression word "smell nice" is changed to the impression word "stuffed" is displayed. In the screen 291A, a bar graph 117A matched with the axes 116A is displayed.

In the present embodiment, the changed impression word "smell nice" and the impression word "stomach-friendly" set as a candidate axis in the notification field 118 are displayed in a notification field 118A as a candidate axis replaceable with the impression word "stuffed" in the screen 291A.

In the present embodiment, as described above, since the changed axis is notified as a candidate axis, in a case of displaying the graph before the change, the changed axis "smell nice" displayed in the notification field 118A may be selected and it is possible to easily return to the display before changing the axis.

A screen 291B illustrated in FIG. 29C is an example screen transitioning from the screen 291 in a case where the impression word "stuffed" is selected as a candidate axis in the specification field 292 of the screen 291 in a state that the impression word "smell nice" as an axis is specified.

In a specification field 292A of the screen 291B, a check mark that specifies the impression word "smell nice" is displayed. In the screen 291B, the display of the impression word "smell nice" as an axis is maintained.

Among the axes 116, the impression word having the smallest maximum score and the impression word other than the impression word "smell nice" is "delicious". Therefore, on the screen 291B, axes 116B in which the impression word "delicious" is changed to the impression word "stuffed" are displayed. In the screen 291B, a bar graph 117B matched to the axes 116A is displayed.

In the screen 291B, the changed impression word "delicious" and the impression word "stomach-friendly" specified as the candidate axis in the notification field 118 are displayed in a notification field 118B as a candidate axis replaceable with the impression word "stuffed".

As described above, according to the present embodiment, in the case of changing axis, it is possible to maintain the axis specified by the user.

In FIGS. 29A to 29C, an example of a bar graph is described, but is possible to maintain the axis similarly specified as the change axis on the screen in which a radar chart is displayed.

Fifth Embodiment

Hereinafter, the fifth embodiment will be described with reference to the drawings. The fifth embodiment is different from the fourth embodiment in that in a case where the axis is changed, the score of the impression word map is corrected in response to the change. In the description of the fifth embodiment below, only the differences from the fourth embodiment will be described. Those having the same functional configuration as those of the fourth embodiment are denoted by the same reference numerals as those used in the description of the fourth embodiment, and descriptions thereof will be omitted.

Figure 30:
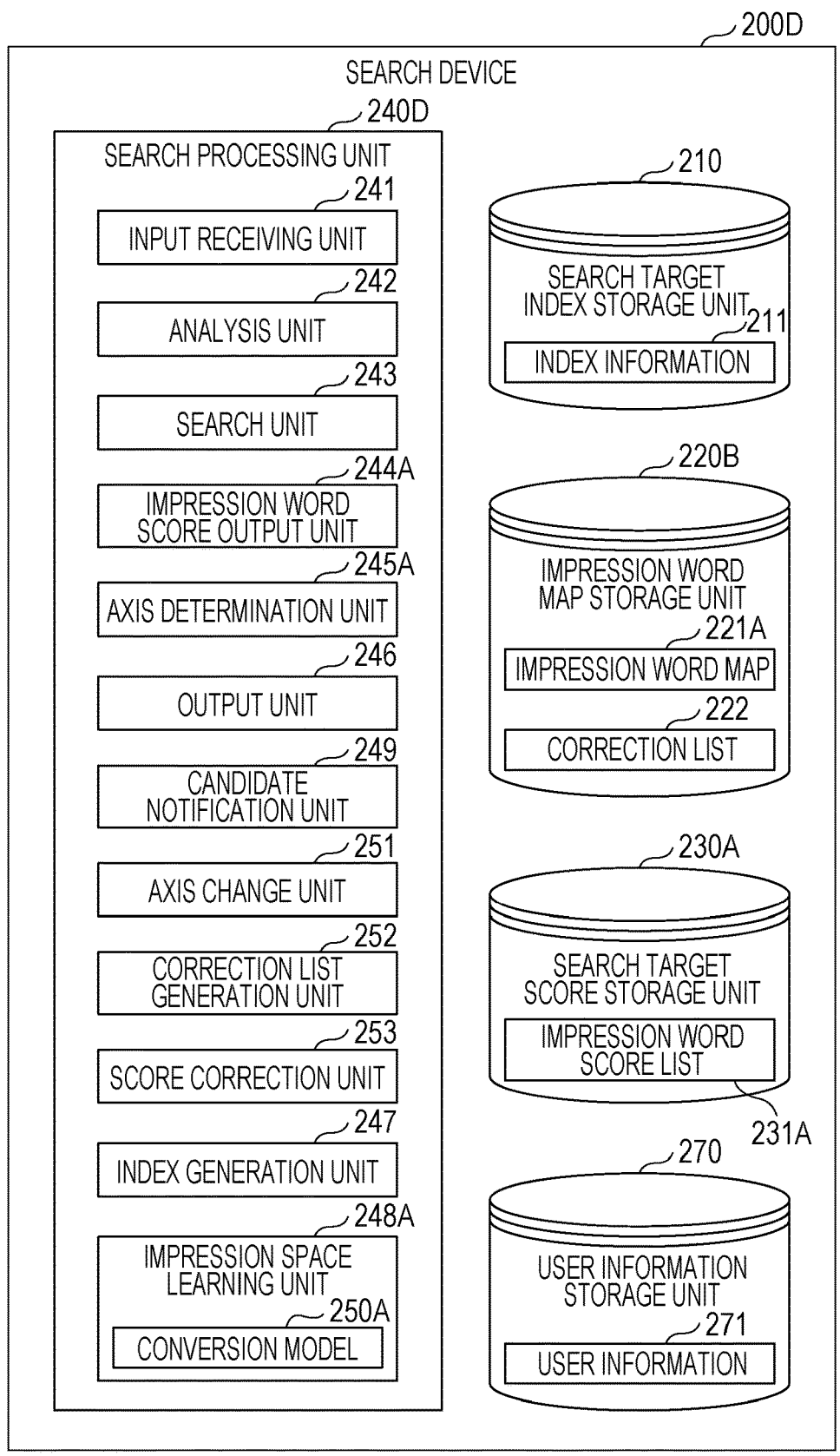
FIG. 30 is a diagram describing functions of a search device of a fifth embodiment.

FIG. 30 is a diagram describing functions of a search device of a fifth embodiment. A search device 200D of the present embodiment includes the search target index storage unit 210, an impression word map storage unit 220B, the search target score storage unit 230A, a search processing unit 240D, and a user information storage unit 270.

The impression word map storage unit 220B of the present embodiment stores the impression word map 221A and a correction list 222. The impression word score output unit 244A refers to the correction list 222 when correcting the acquired score.

The search processing unit 240D of the present embodiment includes a correction list generation unit 252 and a score correction unit 253 in addition to the search processing unit 240C of the fourth embodiment.

In a case where the axis is changed by the axis change unit 251, the correction list generation unit 252 updates the correction list 222 to correct the score output from the impression word score output unit 244A according to the change of axis or the maintenance of the display. Details of the correction list 222 will be described later.

The score correction unit 253 corrects the score output from the impression word score output unit 244A based on the correction list 222.

The user information storage unit 270 of the present embodiment stores a user information 271. The user information 271 is information for identification of the user using a search system including the search device 200D. For example, the user information 271 is a user ID for identifying the user, a password, and the like. The user information 271 of the present embodiment may be given to the search device 200D in advance.

Figure 31:
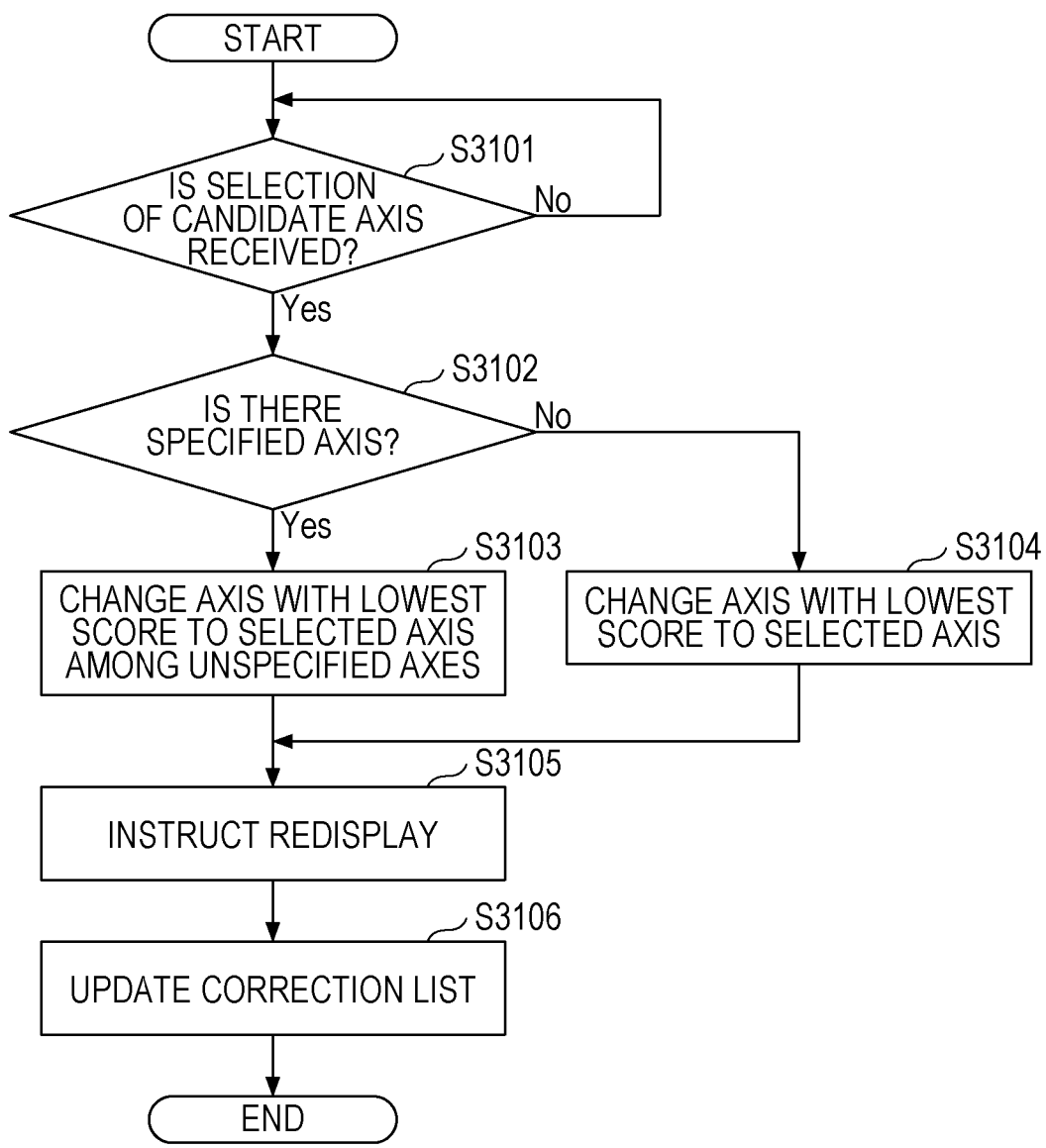
FIG. 31 is a flowchart describing processing of a correction list generation unit of the fifth embodiment.

Next, the processing of the correction list generation unit 252 of the present embodiment will be described with reference to FIG. 31. FIG. 31 is a flowchart describing processing of a correction list generation unit of the fifth embodiment.

Since the processing from step S3101 to step S3105 of FIG. 31 is similar to the processing from step S2801 to step S2805 of FIG. 28, the description thereof is omitted.

When the candidate axis is changed, the search processing unit 240D updates the correction list 222 according to the user information of the user who made the change and the change of axis or the specification of the axis by the correction list generation unit 252 (step S3106), and ends the processing.

Hereinafter, the processing of step S3106 will be further explained. First, the case in which the specification of the axis by the user is not performed when changing the axis will be described.

In this case, the correction list generation unit 252 stores the impression word indicating the axis to be changed, the value to be subtracted from the score of the impression word, the search word group acquired from the query, and the user information in association with each other in the correction list 222. The impression word indicating the axis to be changed is the impression word having the smallest maximum score among the impression words extracted by the impression word score output unit 244A as the axis.

Next, a case where the specification of the axis is performed by the user when changing the axis will be described. In this case, the correction list generation unit 252 stores the impression word indicating the axis specified by the user, the value added to the score of the impression word, the search word group acquired from the query, and the user information in association with each other in the correction list 222.

Hereinafter, the correction list 222 of the present embodiment will be described with reference to FIG. 32. FIG. 32 is a diagram illustrating an example of a correction list of the fifth embodiment.

The correction list 222 of the present embodiment includes the user ID, the search word group, and the change point as an information item in association with each other. The value of the item "user ID" indicates the user ID that identifies the user. The value of the item "search word group" indicates the search word group acquired from the input query. The value of the item "change point" indicates the changed impression word and the value to be subtracted from the score of the impression word, or the impression word specified by the user as an axis that maintains the display and the value to be added to the score of the impression word.

In the following description, in the correction list 222, information including the value of the item "user ID" and the other values is referred to as correction information. In the description below, the value (first correction value) to be added to the score of the impression word or the value (second correction value) to be subtracted from the score of the impression word is referred to as a score correction value. The score correction value may be set in advance and stored in the correction list generation unit 252.

In the example of FIG. 32, in correction information 222-1 including user ID "0001", the values of the item "search word group" are "natural", "material", "vegetable", and "restaurant", and the value of the item "change point" is "smell nice" and "−0.1".

When the user of the user ID "0001" displays the search result set data searched with the search word group "natural", "material", "vegetable", and "restaurant" acquired from the input query, the correction information 222-1 indicates that impression word "smell nice" set as an axis is changed to another impression word. At this time, the correction information 222-1 indicates that there is no impression word set by the user to maintain the display in the axes, and the score correction value of "0.1" is subtracted from the impression word "smell nice".

In correction information 222-2 of FIG. 32, when the user of the user ID "0002" displays the search result set data searched with the search word group "plentiful" and "Chinese" acquired from the input query, it is indicated that the display of the impression word "stuffed" is maintained among the axes by the user. The correction information 222-2 indicates that the score correction value of "0.1" is added to the score of the impression word "stuffed".

Figure 33:
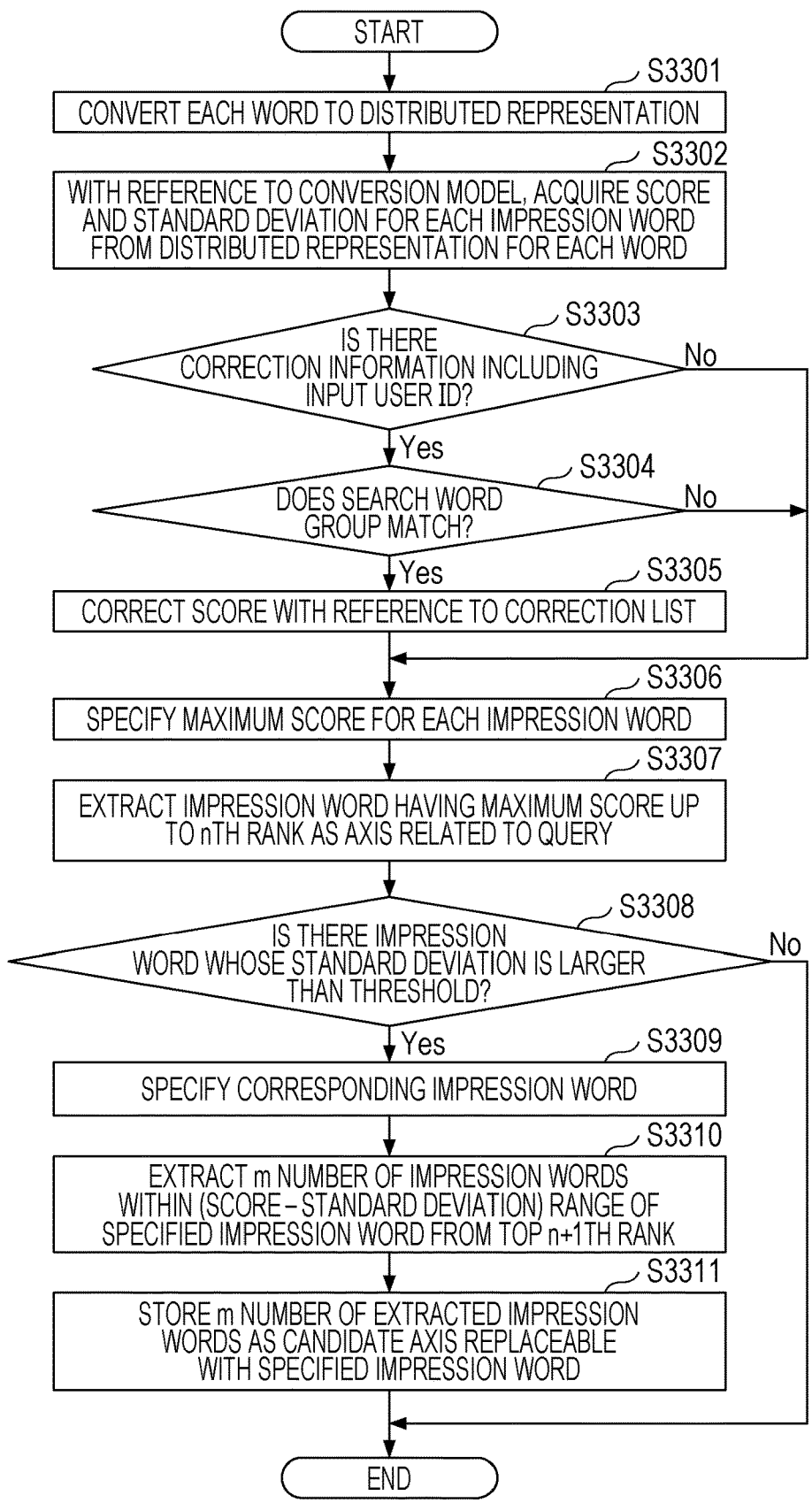
FIG. 33 is a flowchart describing processing of an impression word score output unit, an axis determination unit, and a score correction unit of the fifth embodiment.

Next, the processing of the impression word score output unit 244A, the axis determination unit 245A, and the score correction unit 253 of the present embodiment will be described with reference to FIG. 33. FIG. 33 is a flowchart describing processing of an impression word score output unit, an axis determination unit, and a score correction unit of the fifth embodiment.

In the search device 200D of the present embodiment, the input of the user information is received and the login processing is performed before the user inputs the query.

Since the processing from step S3301 to step S3302 of FIG. 33 is similar to the processing from step S2301 to step S2302 of FIG. 23, the description thereof is omitted.

In step S3302, when the score and the standard deviation for each impression word are acquired, the score correction unit 253 determines whether or not there is the correction information including the input user ID in the correction list 222 (step S3303). In step S3303, in a case where there is no corresponding correction information, the search processing unit 240D proceeds to step S3306 described later.

In step S3303, in a case where there is corresponding correction information, the score correction unit 253 determines whether or not there is search word group acquired from the input query and correction information that matches with the search word group in the corresponding correction information (step S3307). In step S3307, in a case where there is no corresponding correction information, the search processing unit 240D proceeds to step S3306 described later.

In step S3307, in a case where there is corresponding correction information, the score correction unit 253 refers to the value of the item "change point" of the correction information, corrects the score for each impression word acquired in step S3302 (step S3305), and proceeds to step S3306.

Since the processing from step S3306 to step S3311 is similar to the processing from step S2303 to step S2308 of FIG. 23, the description thereof is omitted.

Hereinafter, the processing of FIG. 33 will be described in details with reference to FIG. 24. For example, a case in which the user of the user ID "0001" inputs a query of "restaurant using natural materials and vegetables" and the search word group 111A is acquired will be described.

In this case, the search processing unit 240D acquires the impression word score 113A for each word by the impression word score output unit 244A. At this time, the score correction unit 253 refers to the correction list 222, and determines whether or not there is correction information including the user ID "0001".

In the correction list 222, there is the correction information 222-1 that includes user ID "0001" (see FIG. 32). Therefore, the score correction unit 253 determines whether or not the value of the item "search word group" of the correction information 222-1 and the search word group 111A acquired from the input query matches.

Since they match, the score correction unit 253 refers to item "change point" of the correction information 222-1, and performs a correction of subtracting 0.1 from the score corresponding to the impression word "smell nice" of the impression word score 113A for each word.

As described above, in the present embodiment, in a case where the user changes the impression word as the axis once, or specified the impression word to maintain the display, the operation history is stored for each user as the correction information. In the present embodiment, in a case where the search word group acquired from the query matches, it is possible to reflect the intention of the user on the item when displaying the search result set data by correcting the score of the impression word using the correction information.

Sixth Embodiment

Hereinafter, the sixth embodiment will be described with reference to the drawings. The sixth embodiment is different from the first embodiment in that the appropriate number of search result set data pieces is displayed when the operation to change the score of the impression word is received on the output axis. In the following description of the sixth embodiment, only the differences from the first embodiment will be described. Those having the same functional configuration as those of the first embodiment are denoted by the same reference numerals as those used in the description of the first embodiment, and descriptions thereof will be omitted.

Figure 34:
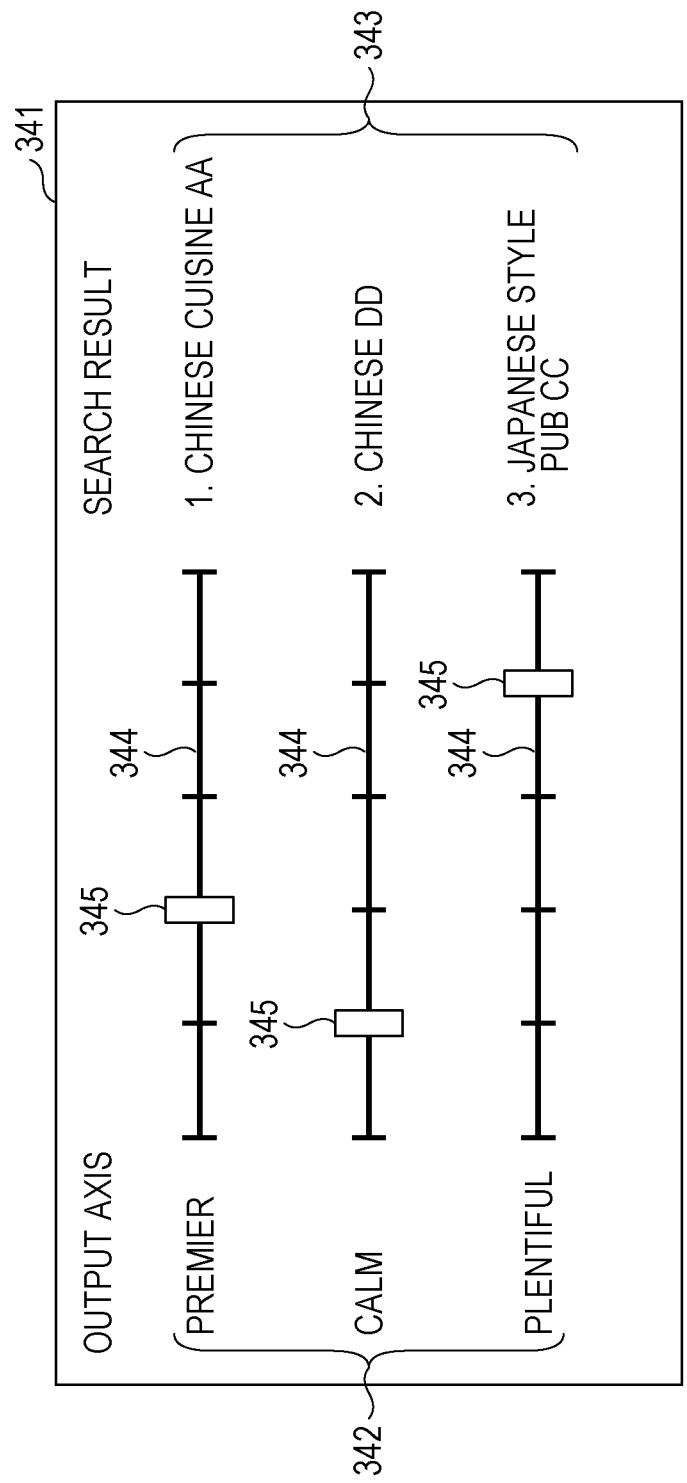
FIG. 34 is a diagram describing an outline of a sixth embodiment.

FIG. 34 is a diagram describing a display example of the sixth embodiment. On a screen 341 illustrated in FIG. 34, a plurality of output axes 342 and search result set data pieces 343 are displayed.

In the screen 341, the output axes 342 indicates the impression word with a strong relationship with the search word group based on the input query.

On the screen 341, a scale 344 and a slider 345 to change the score of the impression word for each impression word as the output axes 342 are displayed. In the present embodiment, when the slider 345 is moved on the scale 344 and the slider 345 stops on a graduation on the scale 344 set in advance, the score of the impression word is changed to the value corresponding to the position where the slider 345 is stopped. When the score of the impression word is changed, the search result set data 343 becomes the search result using the score after the change.

In the description below, the slider on the scale stops on the graduation, and the graduation marked on the scale is referred to as a slider stop position. In the description below, the value (graduation) indicated by the slider stop position on the scale may be represented as a slider value.

The search result set data 343 is document data indicated by the document ID specified by the search processing. In the screen 341, it is displayed as the score of each output axis "premier", "calm", and "plentiful" and other document data extracted as search result set data pieces in the document data with highest degree of match with the query.

The display of the search result set data in a case where the score of the impression word is changed will be described. The number of search results (search result set data pieces) corresponding to the score of the impression word is different depending on the distribution of the score in the plurality of extracted search result set data. In a case where the value of the score is changed by moving the slider on the scale, a large number of search result set data pieces may be extracted, or only a small number of search result set data pieces may be extracted.

Figure 35A:
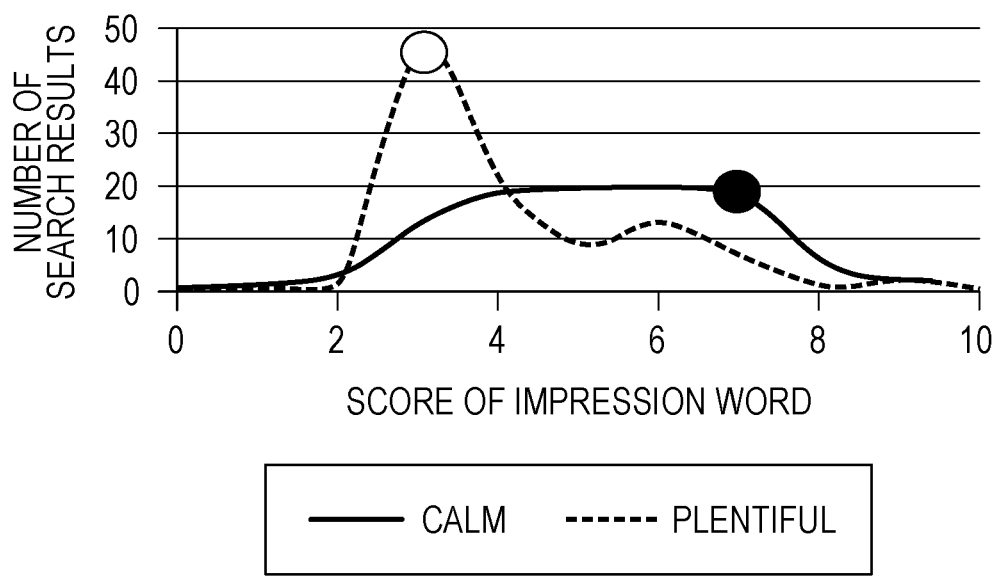
FIGS. 35A and 35B are diagrams describing change in score of impression words.
Figure 35B:
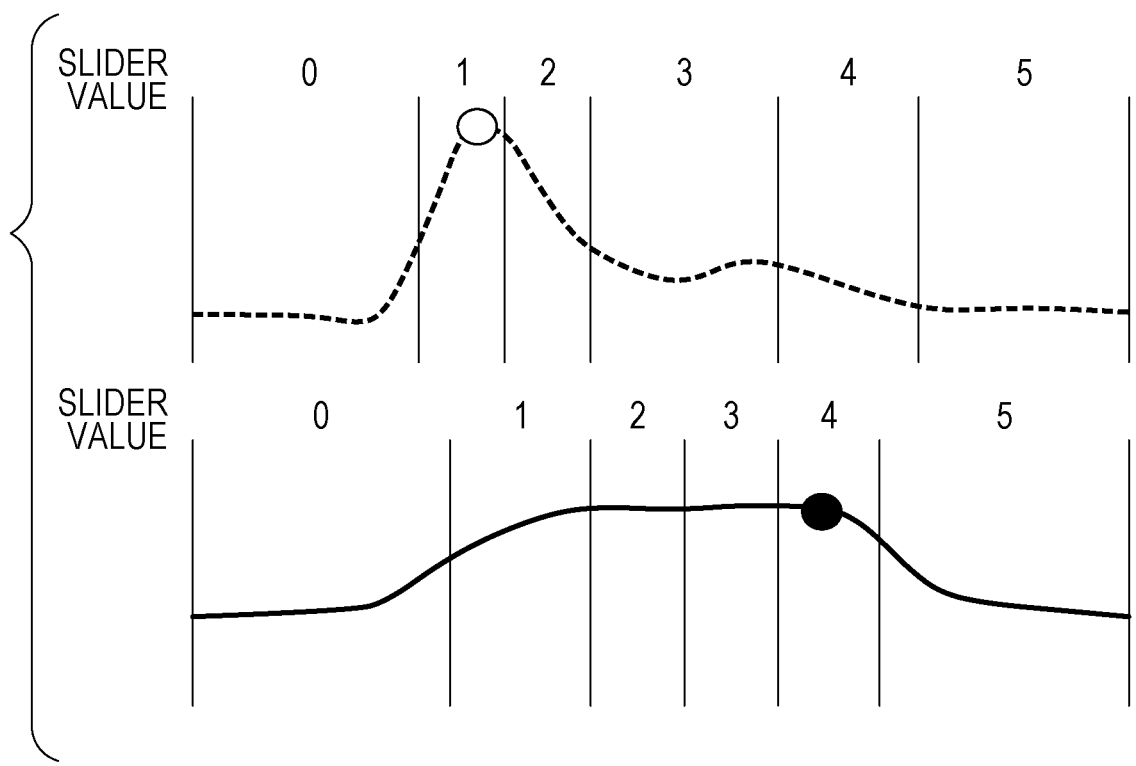

FIGS. 35A and 35B are diagrams describing change in score of impression words. FIG. 35A is a graph indicating the distribution of each score of the impression words "calm" and "plentiful" as an output axis. FIG. 35B is a diagram illustrating the relationship between the score indicated by the slider and the search result set data.

As illustrated in FIG. 35A, the impression word "calm" has a small deviation of score with respect to the search result set data, and the impression word "plentiful" has a large deviation of score with respect to the search result set data.

As illustrated in FIG. 35B, for example, a case where five slider stop positions (slider value "1" to "5") are at equal interval are provided between the slider stop position (slider value "0") as a start of the scale and the slider stop position (slider value "6") at the end point of the scale, and the score is changed by moving the slider to each slider stop position is considered.

In this case, since the impression word "calm" has a small deviation of score, regardless of the slider stop position of the slider, a certain number of search result set data pieces is output.

On the other hand, since the impression word "plentiful" has a large deviation of score, depending on the slider stop position, the search result set data may not be output, or a lot of search result set data may be output. For example, in a case where the score of the impression word "plentiful" is changed by moving the slider on the scale, the search result set data may not be output properly.

In the present embodiment, the distribution of the impression word as the output axis is calculated, and the slider stop position on the scale is associated with the variation range of the score according to the score distribution. For example, according to the present embodiment, each slider stop position on the scale and the variation range of the score in association with each other is displayed so that the number of search result set data pieces displayed corresponding to the variation range of the score to be a predetermined number for each output axis. The predetermined number may be a fixed number or a number within a predetermined range. For example, the number of search result set data pieces displayed corresponding to the variation range of the score may be 10, or 8 to 12.

In the present embodiment, by performing the association, a certain number of search result set data pieces may be displayed when the slider is moved on the scale.

According to the present embodiment, the score of the output axes (impression words) is changed, and the search result set data corresponding to the changed score is presented to the user. Therefore, according to the present embodiment, for example, in a case where information desired by the user is not acquired from the score estimated from the query, new search result in which the score of the impression word is changed may be provided to the user.

Figure 36:
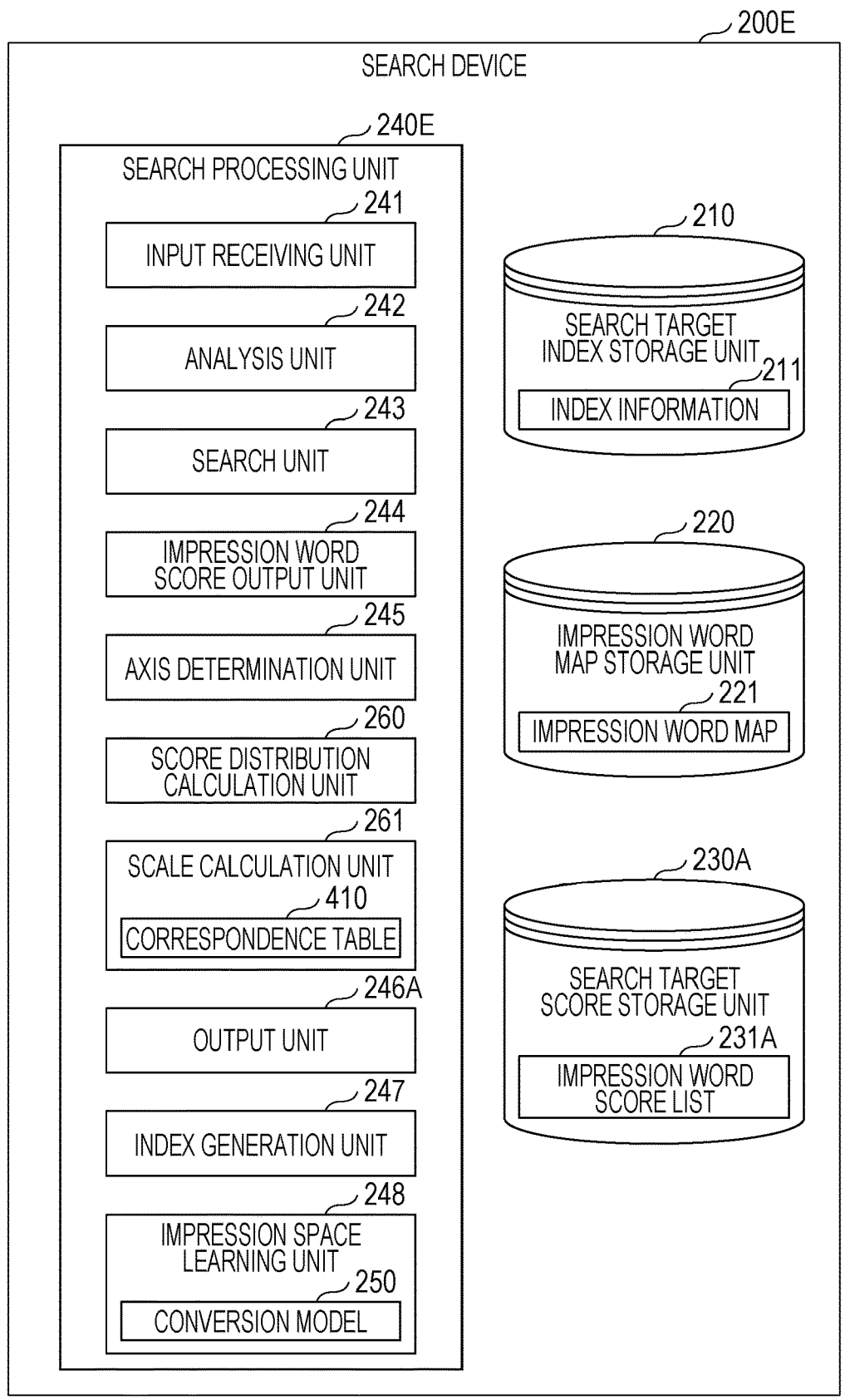
FIG. 36 is a diagram describing functions of a search device of the sixth embodiment.

Hereinafter, the functions of a search device 200E of the present embodiment will be described with reference to FIG. 36. FIG. 36 is a diagram describing functions of a search device of the sixth embodiment.

The search device 200E of the present embodiment includes the search target index storage unit 210, the impression word map storage unit 220, the search target score storage unit 230A, and a search processing unit 240E.

The search processing unit 240E of the present embodiment includes the input receiving unit 241, the analysis unit 242, the search unit 243, the impression word score output unit 244, the axis determination unit 245, an output unit 246A, the index generation unit 247, the impression space learning unit 248, a score distribution calculation unit 260, and a scale calculation unit 261.

The score distribution calculation unit 260 of the present embodiment calculates the score distribution for each impression word determined as the output axis by the axis determination unit 245. For example, the score distribution calculation unit 260 generates a histogram indicating the score distribution in the impression word score list 231A for each impression word determined as the output axis by the axis determination unit 245.

The scale calculation unit 261 of the present embodiment calculates the variation range of the score corresponding to the slider stop position attached on the scale indicating the score of the impression word based on the distribution of the score calculated by the score distribution calculation unit 260. For example, the scale calculation unit 261 creates and stores a correspondence table 410 in which the slider value is associated with the variation range of the score.

Details of the processing of the score distribution calculation unit 260 and the scale calculation unit 261 and the correspondence table 410 will be described later.

The output unit 246A of the present embodiment refers to the correspondence table 410, and displays a radar chart of the search result set data.

Figure 37:
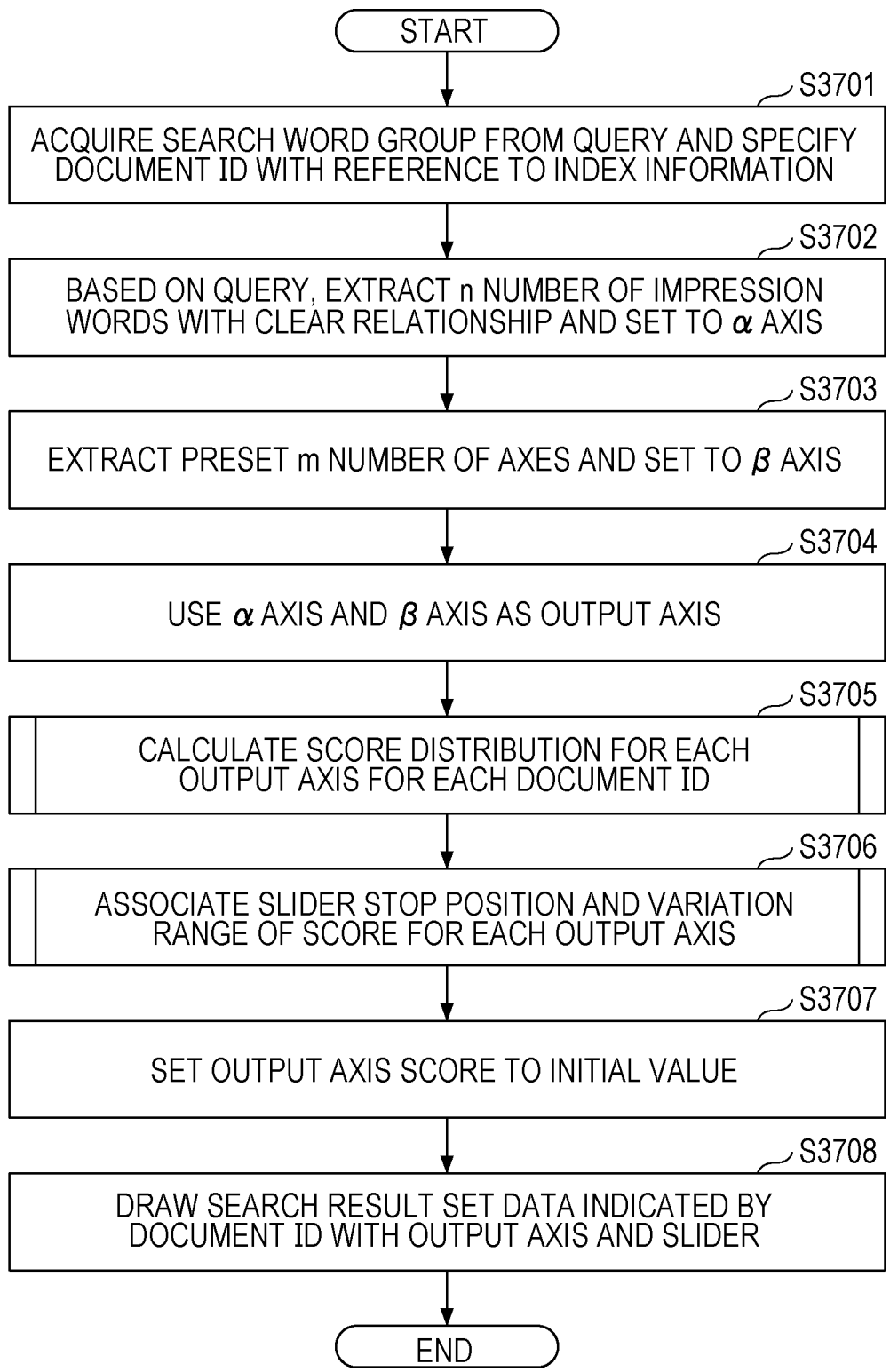
FIG. 37 is a first flowchart describing processing of a search processing unit of the sixth embodiment.

Hereinafter, the processing of the search processing unit 240E of the present embodiment will be described with reference to FIG. 37. FIG. 37 is a first flowchart describing processing of a search processing unit of the sixth embodiment.

Since the processing from step S3701 to step S3704 of FIG. 37 is similar to the processing from step S901 to step S904 of FIG. 9, the description thereof is omitted.

In step S3704, when the n number of impression words that has a clear relationship with the query are extracted and set as a axes by the axis determination unit 245, the search processing unit 240E calculates the score distribution for each output axis (a axis) in search result set data pieces specified in step S3701 by the score distribution calculation unit 260 (step S3705).

The search processing unit 240E associates the slider stop position with the variation range of the score for each output axis by the scale calculation unit 261 (step S3706).

The search processing unit 240E sets the score of the impression word when the α axis is set as an initial value on the scale by the output unit 246A (step S3707).

The output unit 246A draws the search result set data with the slider and the scale that correspond with the impression word as the output axis (step S3708), and ends the processing.

Figure 38:
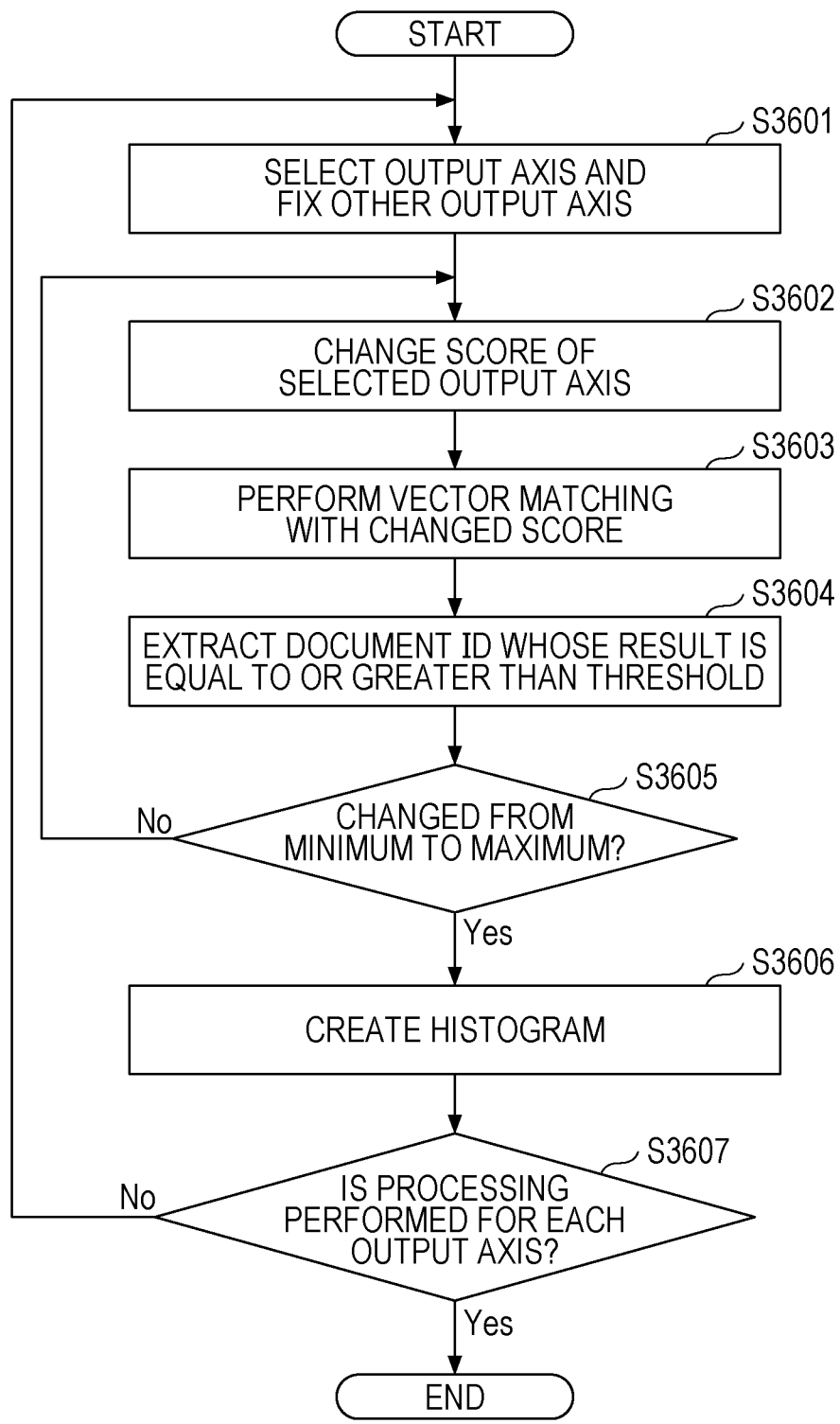
FIG. 38 is a second flowchart describing processing of the search processing unit of the sixth embodiment.

Next, the processing of the score distribution calculation unit 260 of the present embodiment will be described with reference to FIG. 38. FIG. 38 is a second flowchart describing processing of the search processing unit of the sixth embodiment. In FIG. 38, the details of the processing of step S3705 of FIG. 37 is illustrated.

The score distribution calculation unit 260 of the present embodiment selects one axis among the output axes determined by the axis determination unit 245, and fixes the score of the other output axes (step S3601). The score distribution calculation unit 260 changes the score of the selected output axis (step S3602). The score of the selected output axis may be increased or decreased for each predetermined interval. For example, in a case where the minimum value of the score of the output axis is 0, and the maximum value is 10, the score is changed to 0, 1, 2, . . . , 10, and so on.

The score distribution calculation unit 260 performs vector matching between the score of each output axis and the score of each impression word corresponding to the document data extracted as the search result set data in a state that the score of the selected output axis is changed (step S3603). For example, the score distribution calculation unit 260 may perform vector matching based on cosine similarity. It is assumed that a plurality of document data are extracted as the search result set data.

The score distribution calculation unit 260 specifies the document ID in which the result of the vector matching is equal to or greater than the predetermined threshold, and acquires the number of specified document IDs (step S3604).

The score distribution calculation unit 260 determines whether or not the score of the selected output axis is changed from the minimum value to the maximum value (step S3605). For example, the score distribution calculation unit 260 determines whether or not the vector matching is performed for each predetermined interval from the minimum value to the maximum score.

In step S3605, in a case where the vector matching is not performed for each predetermined interval from the minimum score to the maximum score, the score distribution calculation unit 260 returns to step S3602.

In step S3605, in a case where the vector matching is performed for each predetermined interval from the minimum score to the maximum score, the score distribution calculation unit 260 generates a histogram from the number of document IDs of each predetermined interval (step S3606).

The score distribution calculation unit 260 determines whether or not the processing from step S3601 to step S3606 is performed for every output axes (step S3607). The score distribution calculation unit 260 may determine whether or not the processing from step S3601 to step S3606 is performed for the α axis among the output axes.

In step S3607, in a case where processing is not performed for all output axes, the score distribution calculation unit 260 returns to step S3601. In step S3607, when the processing is performed for all output axes, the score distribution calculation unit 260 ends the processing.

Figure 39:
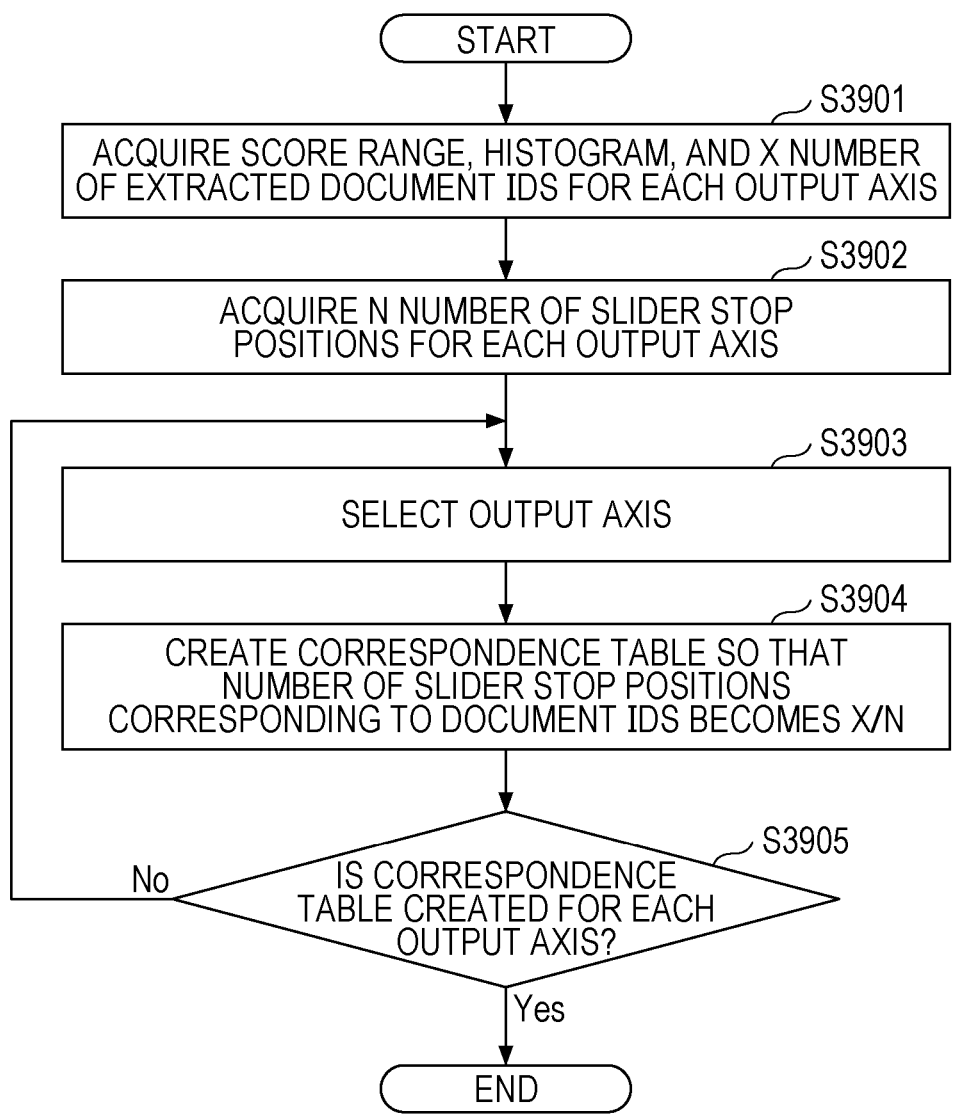
FIG. 39 is a third flowchart describing processing of the search processing unit of the sixth embodiment.

Next, the processing of the scale calculation unit 261 of the present embodiment will be described with reference to FIG. 39. FIG. 39 is a third flowchart describing processing of the search processing unit of the sixth embodiment. In FIG. 38, details of the processing of step S3706 in FIG. 37 is illustrated.

The scale calculation unit 261 of the present embodiment acquires a score range (from minimum score to maximum score), a histogram, and the X number of document IDs acquired when generating the histogram for each output axis (step S3901).

The scale calculation unit 261 acquires the N number of slider values (graduation) on the scale for each output axis (step S3902).

The scale calculation unit 261 selects an output axis (step S3903), and creates a correspondence table so that the number of document IDs corresponding the number of slider values is set to be X/N (step S3904).

The scale calculation unit 261 determines whether or not the correspondence table is created for all output axes (step S3905). In step S3905, in a case where the correspondence table is not created for all output axes, the scale calculation unit 261 returns to step S3903.

In step S3905, in a case where the correspondence table is created for all output axis, the scale calculation unit 261 ends the processing.

Figure 40:
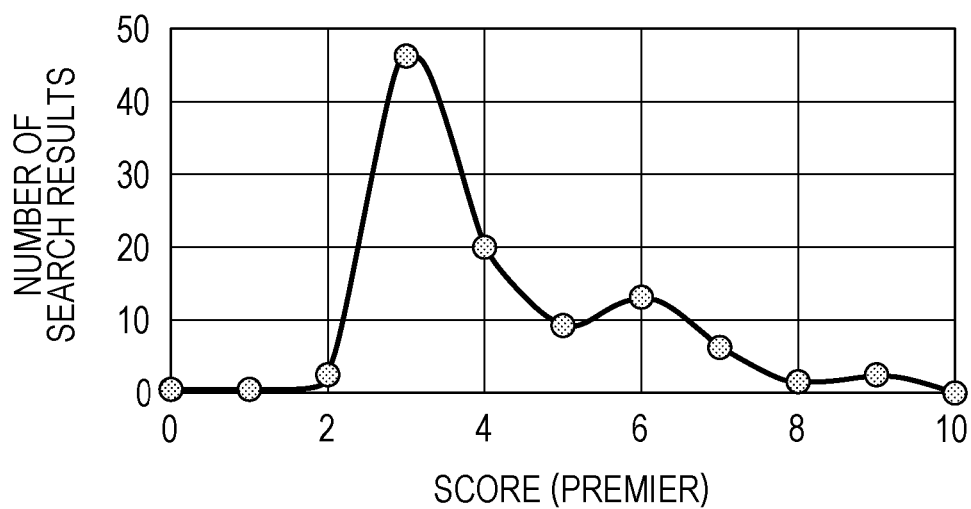
FIGS. 40A and 40B are diagrams describing correspondence between a score and a slider value of the sixth embodiment.

The processing of the score distribution calculation unit 260 and the scale calculation unit 261 of the present embodiment will be described in details with reference to FIGS. 40A and 40B. FIGS. 40A and 40B are diagrams describing correspondence between a score and a slider value of the sixth embodiment. FIG. 40A is an example histogram, and FIG. 40B is an example table illustrating the association between the score and the slider value.

In FIG. 40A, the horizontal axis indicates the score of the output axis "premier", and the vertical axis indicates the number of document IDs that the result of vector matching is equal to or greater than the threshold value.

In the output axis "premier", as is known from FIG. 40A, the score range is from 0 to 10. While the score is 2 to 5, there are many numbers of corresponding search result set data, but in a case where the score is 8 or higher or less than 2, there is almost no corresponding search result set data.

Therefore, in the present embodiment, in a case where the output axis "premier" is displayed as scale, the slider value (graduation) and the number of document IDs are associated with each other.

FIG. 40B is an example of a correspondence table related to the output axis "premier". In this case, the slider value "0" and the score "0 to 3.5", the slider value "1" and the score "3.5 to 3.8", and the slider value "2" and the score "3.8 to 4.6" are associated with each other.

For example, in the scale of the output axis "premier", in a case where the slider is at the position of the slider value "0", document data corresponding to the document ID in which the score of the impression word "premier" is 0 to 3.5 among the extracted search result set data is displayed. In the scale of the output axis "premier", when the slider is at a position of the slider value "1", document data corresponding to the document ID in which the score of the impression word "premier" is 3.5 to 3.8 among the extracted search result set data is displayed.

As described above, in the present embodiment, by associating the slider value attached on the scale of the output axis and the variation range of the score, regardless of which slider value the slider is stopped on the scale, it is possible to equalize the number of output search result set data pieces. In the present embodiment, the association is performed for every output axes, and stored as the correspondence table 410.

FIG. 41 is an example correspondence table of the sixth embodiment. In the correspondence table 410 illustrated in FIG. 41, the slider value and the variation range of the score are associated with each other for each output axis "premier", "hideaway", and "healthy".

In the correspondence table 410, with respect to the slider value "0", the output axis "premier" is associated with the score "0 to 3.5", the output axis "hideaway" is associated with the score "0 to 2.8", and the output axis "healthy" is associated with the score "0 to 2.9".

In the correspondence table 410, with respect to the slider value "1", the output axis "premier" is associated with the score "3.5 to 3.8", the output axis "hideaway" is associated with the score "2.8 to 3.6", and the output axis "healthy" is associated with the score "2.9 to 3.2".

Figure 42:
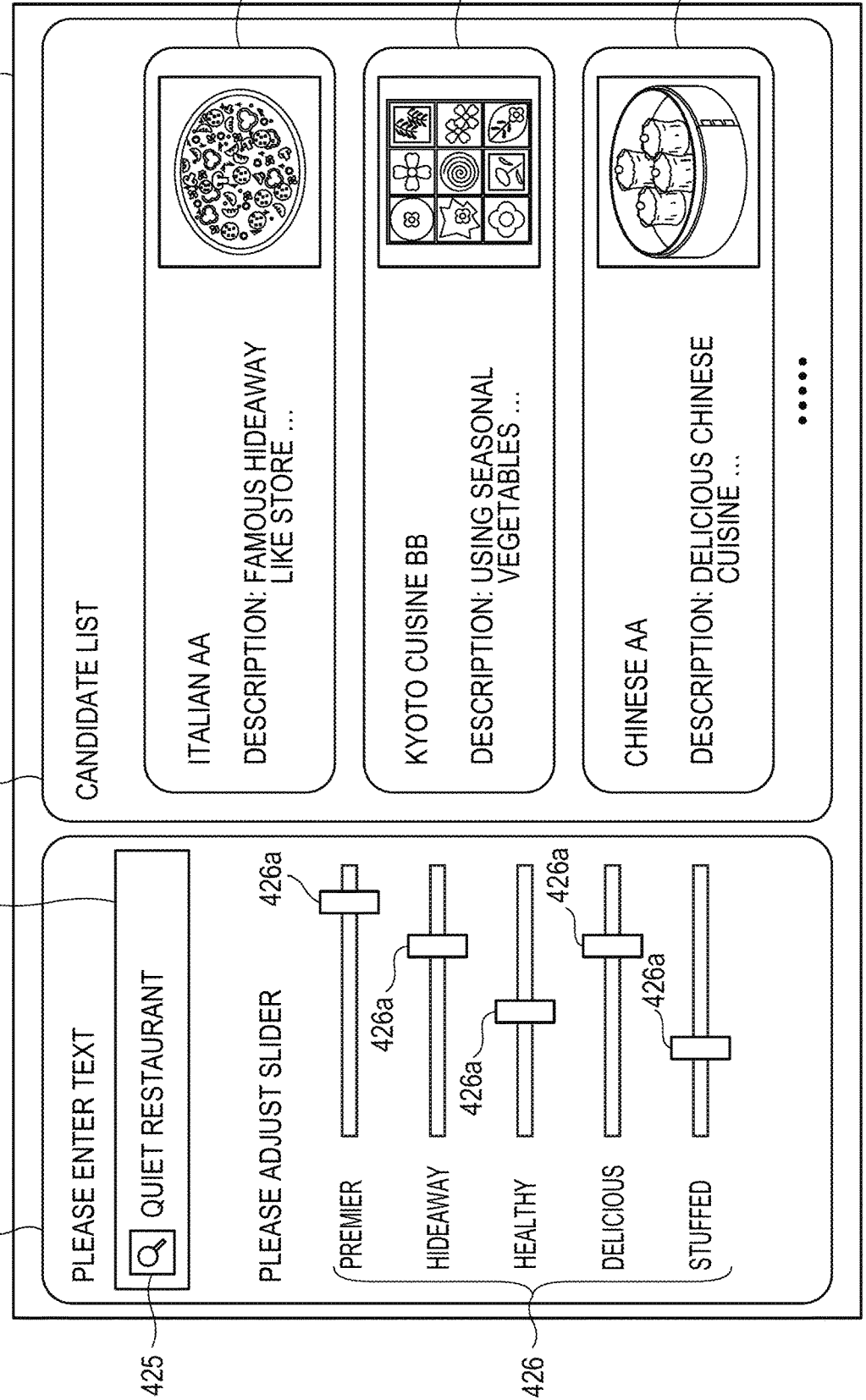
FIG. 42 is a diagram illustrating a display example of the sixth embodiment.

FIG. 42 is a diagram illustrating a display example of the sixth embodiment. A screen 421 illustrated in FIG. 42 is displayed in, for example, the terminal device 300 and the like.

On the screen 421, an input field 422 and a result display field 423 are displayed. In the input field 422, a query input field 424 to input the query, a search button 425 that performs search request, and a plurality of scales 426 associated with each output axis are displayed. On the plurality of scales 426, a slider 426a is displayed respectively, and the score of the corresponding output axis is changed by moving the slider on the scale.

In the result display field 423, the document data specified based on the input query in the query input field 424 is displayed as the search result set data. In the example of FIG. 42, search result set data 427, 428, and 429 is displayed as the search result.

In the present embodiment, on at least one of the plurality of scales 426, when the slider 426a is operated and the score is changed, the search result set data displayed in the result display field 423 changes as the score changes.

As described above, in the present embodiment, when changing the score of the impression word estimated from the search word group based on the query and performing the search, it is possible to display the appropriate number of search result set data pieces according to the change in the score of the impression word.

In the present embodiment, as a display mode for changing the score of the impression word, a mode in which the score is changed on the scale to which the slider value is attached is described, but the display mode is not limited this. In the present embodiment, as long as it is a mode that receives the change in score, and displays the search result set data corresponding to the changed score, any display mode may be used. For example, it may be a mode that an input field to input score is provided, and the change in the score of the impression word is received by input of the score with respect to the input field.

In the present embodiment, in a case where there is a deviation in the score distribution, the range selected by the slider may be limited, or the display mode of the scale may be displayed in a hue matching with the score distribution.

Figure 43A:
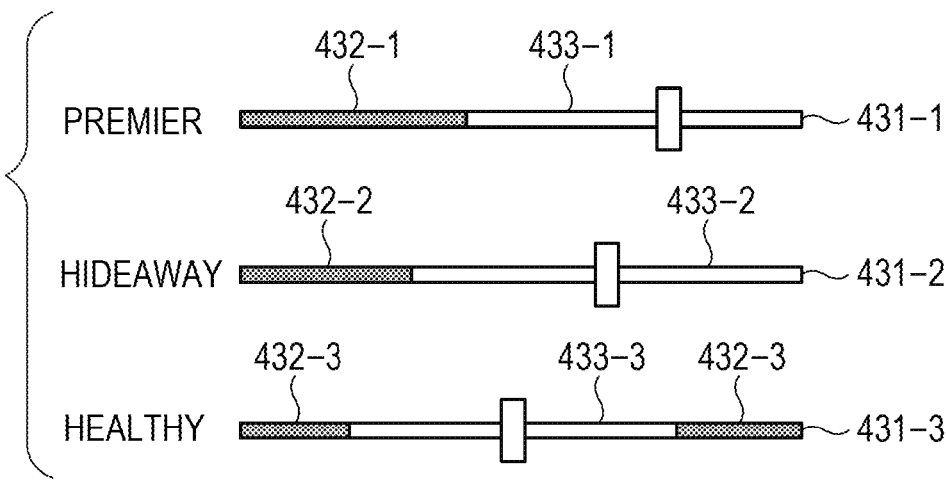
FIGS. 43A and 43B are diagrams illustrating another display example of the sixth embodiment.
Figure 43B:
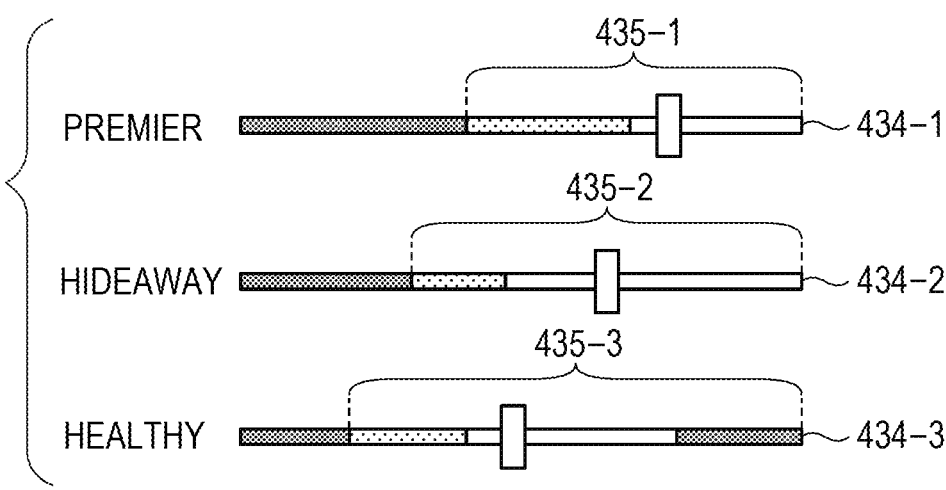

FIGS. 43A and 43B are diagrams illustrating another display example of the sixth embodiment. In FIG. 43A, a display example of the slider in which the range in which the score is selected by the slider is limited is illustrated, and FIG. 43B is a display example in a case where the scale is displayed in a hue matching with the score distribution.

In FIG. 43A, a scale 431-1 corresponding to the output axis "premier", a scale 431-2 corresponding to the output axis "hideaway", and a scale 431-3 corresponding to the output axis "healthy" are displayed.

The scale 431-1 includes an unselectable area 432-1 that is not selectable by the slider, and a selectable area 433-1 that is selectable by the slider. In this case, the scale 431-1 indicates that there is no search result set data in the score range indicated by the unselectable area 432-1, and the search result set data is distributed in the score range indicated by the selectable area 433-1.

In this case, even if any position of the selectable area 433-1 is selected by the slider, the scale calculation unit 261 may set the number of output search result set data pieces to be the same, or substantially the same.

Similarly, the scale 431-2 includes an unselectable area 432-2 and a selectable area 433-2, and the scale 431-3 includes an unselectable area 432-3 and a selectable area 433-3.

In the scales 431-1, 431-2, and 431-3, the unselectable areas 432-1, 432-2, and 432-3 may be displayed in a different manner from the selectable areas 433-1, 433-2, and 433-3.

In the present embodiment, as described in FIG. 43A, it is possible to make the user to visually recognize that the range in which the score is selected by the slider is limited depending on the display mode of the scale.

In FIG. 43B, a scale 434-1 corresponding to the output axis "premier", a scale 434-2 corresponding to the output axis "hideaway", and a scale 434-3 corresponding to the output axis "healthy" are displayed.

In the example of FIG. 43B, the selectable areas 435-1, 435-2, and 435-3 in each scale are displayed with red density being increased in order from an area where the number of search result set data pieces is high.

In the present embodiment, by displaying the scale in this way, it is possible to make the user to visually recognize the score range where the number of the search result set data pieces is large. In this case, the user may select the dark red area with the slider in a case where the user desires to display other search result set data.

As described above, according to the present embodiment, even in a case where the impression word as an item displaying the search result set data, and the score indicating the strength of the relationship with the query are changed, it is possible to output the appropriate number of search result set data pieces.

Seventh Embodiment

Hereinafter, the seventh embodiment will be described with reference to the drawings. The seventh embodiment is different from the sixth embodiment in that the range of the score associated with the slider value is limited. In the description of the seventh embodiment below, only the differences from the sixth embodiment will be described. Those having the same functional configuration as those of the sixth embodiment are denoted by the same reference numerals as those used in the description of the sixth embodiment, and descriptions thereof will be omitted.

Figure 44:
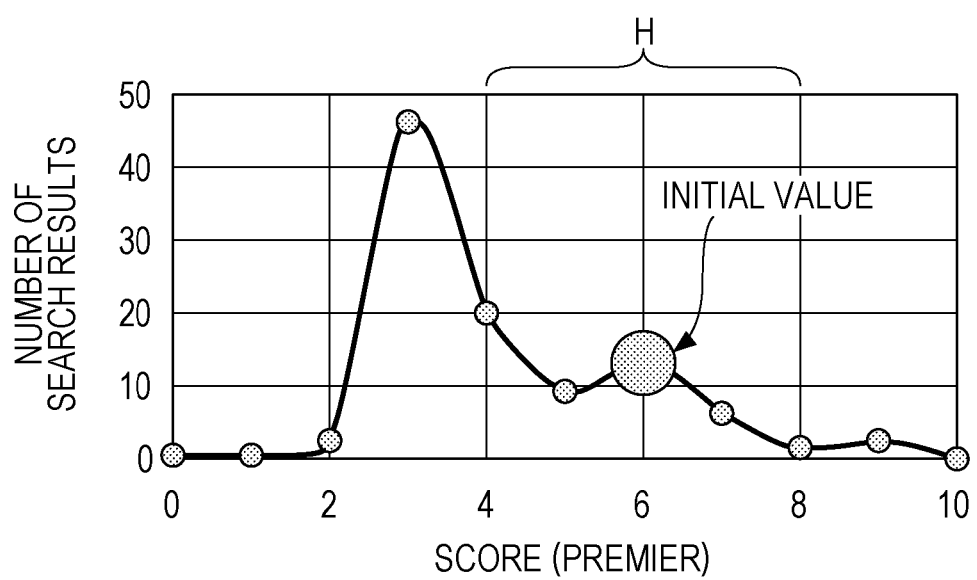
FIG. 44 is a graph describing correspondence between a score and a slider value of a seventh embodiment.

FIG. 44 is a graph describing correspondence between a score and a slider value of a seventh embodiment.

In FIG. 44, the horizontal axis indicates the score of the output axis "premier", and the vertical axis indicates the number of document IDs where the result of vector matching is equal to or greater than the threshold value. In the example of FIG. 44, the initial value of the score of the output axis "premier" is "6". The initial value is the score of the impression word "premier" corresponding with the document ID with the strongest relationship with the query.

In the example of FIG. 44, the slider value and the variation range of the score are associated with each other within a predetermined range H centered on the initial value as the score range. The predetermined range H may be set in advance.

For example, in the present embodiment, the range of the score "4 to 8" is expressed on the scale with the minimum value of the score being "4" and the maximum value being "8"

Figure 45:
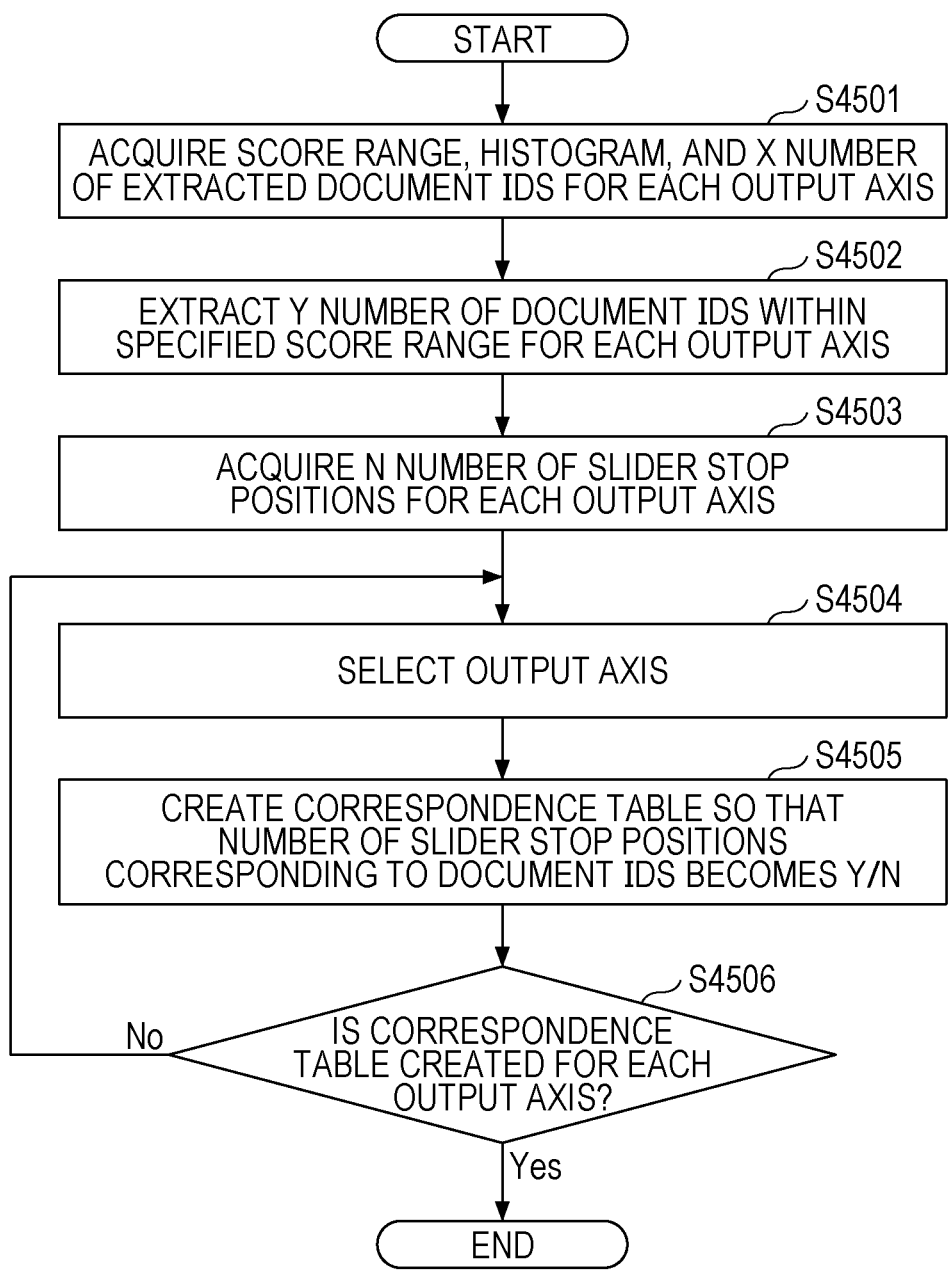
FIG. 45 is a flowchart describing processing of a search processing unit of the seventh embodiment.

FIG. 45 is a flowchart describing processing of a search processing unit of the seventh embodiment. The scale calculation unit 261 of the present embodiment acquires the score range (from minimum score to maximum score), the histogram, and the X number of document IDs acquired when the histogram is generated for each output axis (step S4501).

The scale calculation unit 261 acquires the Y number of search result set data pieces corresponding to the predetermined score range set in advance for each output axis (step S4502).

Since the processing of step S4503 and step S4504 of FIG. 45 are similar to the processing of step S3902 and step S3903 of FIG. 39, description thereof is omitted.

The scale calculation unit 261 creates a correspondence table so that the number of document IDs corresponding to the slider value is set to be Y/N for the selected output axis (step S4505).

Since the processing of step S4506 of FIG. 45 is similar to the processing of step S3905 of FIG. 39, description thereof is omitted.

Figure 46:
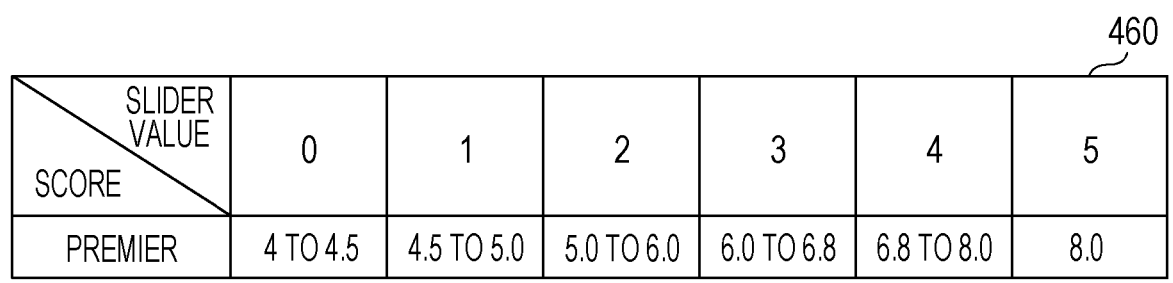
FIG. 46 is an example correspondence table of the seventh embodiment.

FIG. 46 is an example correspondence table of the seventh embodiment. In a correspondence table 460 illustrated in FIG. 46, the score 4 to 8 is associated with the slider value 0 to 5.

In the present embodiment, in the scale of the output axis "premier", the search result set data with score 4 or less or 8 or higher is not output even if the slider value is moved from 0 to 5.

In the present embodiment, as described above, by limiting the range of the score associated with the slider value, the output of the search result set data with a low relationship with the input query may be suppressed.

In the disclosed technology, a mode such as that described below may be considered.

The present embodiments are not limited to the specifically disclosed embodiments, and various modifications and changes may be made without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A search method by a computer, comprising:
specifying a search word group based on a query;
acquiring search result set data using the search word group from search target data;
extracting a first feature word group based on the query;
displaying the search result set data using the first feature word group as an item;
acquiring, for each word included in the search word group, a value indicating a strength of a relationship between each impression word included in an impression word group and the word, and a value indicating a variation of the value indicating the strength of the relationship;
notifying a third feature word group as a candidate of the first feature word group in a case where the impression word having the value indicating the variation larger than a threshold is included in the first feature word group; and
displaying the impression word having the value indicating the variation larger than the threshold and the third feature word group in association with each other.

2. The search method according to claim 1, further comprising:
extracting a second feature word group from the search result set data; and
displaying the search result set data using the first feature word group and the second feature word group as the item.

3. The search method according to claim 1, further comprising:
converting a word included in the search word group to a vector by a distributed representation;
acquiring a value indicating a strength of a relationship between each impression word and each word included in the search word group by a conversion model that outputs an impression word group and the value indicating the strength of the relationship between each impression word included in the impression word group and the word when the vector is input; and
extracting the first feature word group according to the value indicating the strength of the relationship with each word, from the impression word group.

4. The search method according to claim 3,
wherein the first feature word group has a predetermined number of impression words extracted in descending order of the impression words having a maximum value of the value indicating the strength of the relationship with each word among impression words included in the impression word group.

5. The search method according to claim 3, further comprising
extracting the second feature word group other than the first feature word group from the impression word group, and displaying the search result set data using the first feature word group and the second feature word group as the item.

6. The search method according to claim 5, further comprising:
extracting the impression word having a smaller maximum value of the value indicating the strength of the relationship with each word than the impression word extracted as the first feature word group among the impression words included in the impression word group; and
using the predetermined number of impression words extracted in descending order of the impression words having maximum dispersion of the value indicating the strength of the relationship with each word among the extracted impression words as the second feature word group.

7. The search method according to claim 3, further comprising:
specifying a word group included in document data for each document data of the search target data;
acquiring the value indicating the strength of the relationship between each impression word and each word, based on the vector converted from the word included in the word group and the conversion model;

acquiring a value indicating a strength of a relationship between the document data and each impression word from the value indicating the strength of the relationship between each impression word and each word; and when the document data is acquired as the search result set data, referring to the value indicating the strength of the relationship between the document data and each impression word, and displaying the value indicating the strength of the relationship between the document data and the impression word as the first feature word group, as a value of the item.

8. The search method according to claim 7, wherein a value indicating the variation is a standard deviation of the value indicating the strength of the relationship, and wherein the third feature word group has impression words other than the first feature word group among the impression word group, and has the impression words in which the value indicating the strength of the relationship is a value larger than a value obtained by subtracting the standard deviation from the value indicating the strength of the relationship with the impression word having the standard deviation larger than a predetermined threshold.

9. The search method according to claim 8, further comprising:

receiving a selection of the impression word included in the third feature word group; and displaying the search result set data using an impression word having the standard deviation equal to or less than the predetermined threshold among the first feature word group, and the impression word selected from the third feature word group as the item.

10. The search method according to claim 9, wherein, in the first feature word group, in a case where there is an impression word specified to maintain display, the specified impression word and the impression word selected from the third feature word group are included in the item.

11. The search method according to claim 10, further comprising:

receiving an operation that specifies the impression word for which display is maintained, and storing the impression word for which the display is maintained and a first correction value that corrects a value indicating the strength of the relationship with each word in a storage unit in association with each other; and receiving an operation that selects the impression word from the third feature word group, and storing the impression word selected from the third feature word group and a second correction value that corrects the value indicating the strength of the relationship with each word in the storage unit in association with each other.

12. The search method according to claim 3, further comprising:

for each impression word extracted as the first feature word group, calculating distribution of the value indicating the strength of the relationship between the search result set data and the impression word with respect to search result set data pieces; and displaying a scale indicating the strength of the relationship with the impression word based on the distribution so that the number of the search result set data pieces corresponding to a variation range of the value indicating the strength of the relationship with the impression word is a predetermined number.

13. The search method according to claim 12, wherein, on the scale, a slider that receives a change in the value indicating the strength of the relationship with the impression word is displayed with the scale, and wherein a position where the slider stops and the variation range of the value indicating the strength of the relationship with the impression word are associated with each other on the scale.

14. The search method according to claim 13, further comprising:

setting a maximum value of the value indicating the strength of the relationship with each word as an initial value; and displaying the slider at a position corresponding with the initial value on the scale.

15. The search method according to claim 12, further comprising based on the distribution, associating a part of a range of the value indicating the strength of the relationship with the impression word with the number of the search result set data pieces.

16. An apparatus comprising:

a memory; and a processor coupled to the memory and configured to:
specify a search word group based on a query,
acquire search result set data using the search word group from search target data,
extract a first feature word group based on the query,
display the search result set data using the first feature word group as an item,
acquire, for each word included in the search word group, a value indicating a strength of a relationship between each impression word included in an impression word group and the word, and a value indicating a variation of the value indicating the strength of the relationship;
notify a third feature word group as a candidate of the first feature word group in a case where the impression word having the value indicating the variation larger than a threshold is included in the first feature word group; and
display the impression word having the value indicating the variation larger than the threshold and the third feature word group in association with each other.

17. A computer-implemented search method, comprising:

receiving, via an input device, query input data including a word or a phrase;

acquiring search result set data using the query input data;

acquiring, for a value indicating a strength of a relationship between each impression word included in an impression word group and each word included in the query input data;

extracting the first feature word group according to the value indicating the strength of the relationship with each word, from the impression word group;

displaying the search result set data using the first feature word group as an item, acquiring, for each word included in the search word group, a value indicating a strength of a relationship between each impression word included in an impression word group and the word, and a value indicating a variation of the value indicating the strength of the relationship;

notifying a third feature word group as a candidate of the first feature word group in a case where the impression word having the value indicating the variation larger than a threshold is included in the first feature word group; and displaying the impression word having the value indicating the variation larger than the threshold and the third feature word group in association with each other.

18. The computer-implemented search method according to claim 17, further comprising:

acquiring a value indicating a variation of the value indicating the strength of the relationship; and notifying a second feature word group as a candidate of the first feature word group when the impression word having the value indicating the variation larger than a threshold is included in the first feature word group.

19. The computer-implemented search method according to claim 18, further comprising:

displaying the impression word having the value indicating the variation larger than the threshold and the second feature word group in association with each other.

\* \* \* \* \*